US012568200B2

(12) United States Patent
Furuta et al.

(10) Patent No.: US 12,568,200 B2
(45) Date of Patent: Mar. 3, 2026

(54) HANDHELD BLUR EVALUATING APPARATUS, HANDHELD BLUR EVALUATING METHOD, MANUFACTURING METHOD OF IMAGING UNIT, AND STORAGE MEDIUM

(71) Applicant: CANON KABUSHIKI KAISHA, Tokyo (JP)

(72) Inventors: Minami Furuta, Tokyo (JP); Naoki Nomura, Kanagawa (JP); Tamaki Negishi, Tokyo (JP); Koichi Washisu, Tokyo (JP); Kosuke Kiyamura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 286 days.

(21) Appl. No.: 18/354,790

(22) Filed: Jul. 19, 2023

(65) Prior Publication Data

US 2024/0022707 A1     Jan. 18, 2024

Related U.S. Application Data

(63) Continuation of application No. PCT/JP2021/047057, filed on Dec. 20, 2021.

(30) Foreign Application Priority Data

Jan. 22, 2021     (JP) ................................. 2021-008831

(51) Int. Cl.
H04N 23/68          (2023.01)
H04N 17/00          (2006.01)
(Continued)

(52) U.S. Cl.
CPC ....... H04N 17/002 (2013.01); H04N 23/6811 (2023.01); H04N 23/682 (2023.01); H04N 23/81 (2023.01); H04N 23/84 (2023.01)

(58) Field of Classification Search
CPC .................................................... H04N 23/682
See application file for complete search history.

(56) References Cited

U.S. PATENT DOCUMENTS

2014/0331774 A1* 11/2014 Ohara .................... G03B 43/00
73/662

FOREIGN PATENT DOCUMENTS

CN          104853179 A      8/2015
CN          110620919 A      12/2019
(Continued)

OTHER PUBLICATIONS

PCT/IB/338 (PCT Notification of Transmittal of Translation of the International Preliminary Report on Patentability); PCT/IB/373 (PCT International Preliminary Report on Patentability); PCT/ISA/ 237 (PCT Written Opinion of the International Searching Authority).

(Continued)

*Primary Examiner* — Michael H Hong
(74) *Attorney, Agent, or Firm* — Cowan, Liebowitz & Latman, P.C.

(57) ABSTRACT

A handheld blur evaluating apparatus is configured to evaluate a handheld blur of an imaging unit. The handheld blur evaluating apparatus includes an excitation unit configured to excite the imaging unit configured to image an object, a detector configured to detect disturbance in a change amount in measurement data of an image imaged by changing an imaging condition relating to exposure time or luminance, and a driving state indicating that the excitation unit is in a stationary state or in an excitation state, and a corrector configured to correct the disturbance.

23 Claims, 44 Drawing Sheets

(51) Int. Cl.
H04N 23/81 (2023.01)
H04N 23/84 (2023.01)

(56) References Cited

FOREIGN PATENT DOCUMENTS

| CN | 116896626 | A  | 10/2023 |
|----|-----------|----|---------|
| JP | 2004-205799 | A | 7/2004 |
| JP | 2008-289122 | A | 11/2008 |
| JP | 2011-164413 | A | 8/2011 |
| JP | 2018-205645 | A | 12/2018 |
| WO | 2008/078537 | A1 | 4/2010 |
| WO | 2010-061627 | A1 | 4/2012 |
| WO | 2013/076964 | A1 | 5/2013 |

OTHER PUBLICATIONS

Japanese Office Action that issued on Nov. 12, 2024, which is enclosed, with a machine translation, that issued in the corresponding Japanese Patent Application No. 2021-008831.
The International Search Report dated Mar. 8, 2022 of International Application No. PCT/JP2021/047057, which is enclosed.

* cited by examiner

FIG. 43A          FIG. 43B

CHART IMAGE I

CAPTURED IMAGE O CAPTURED BY REFERENCE CAMERA

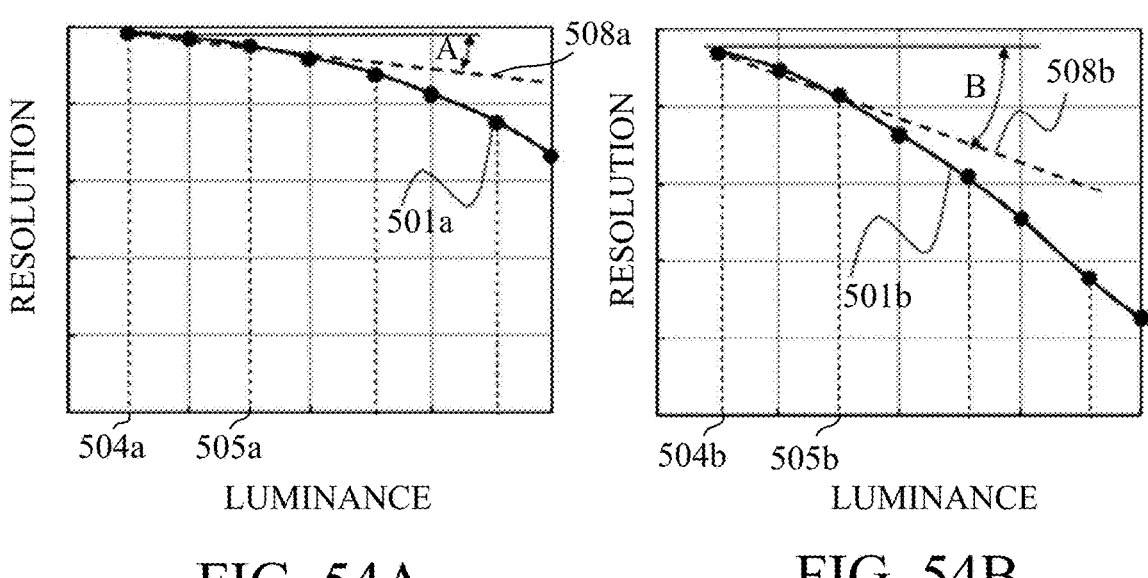
FIG. 54A
FIG. 54B
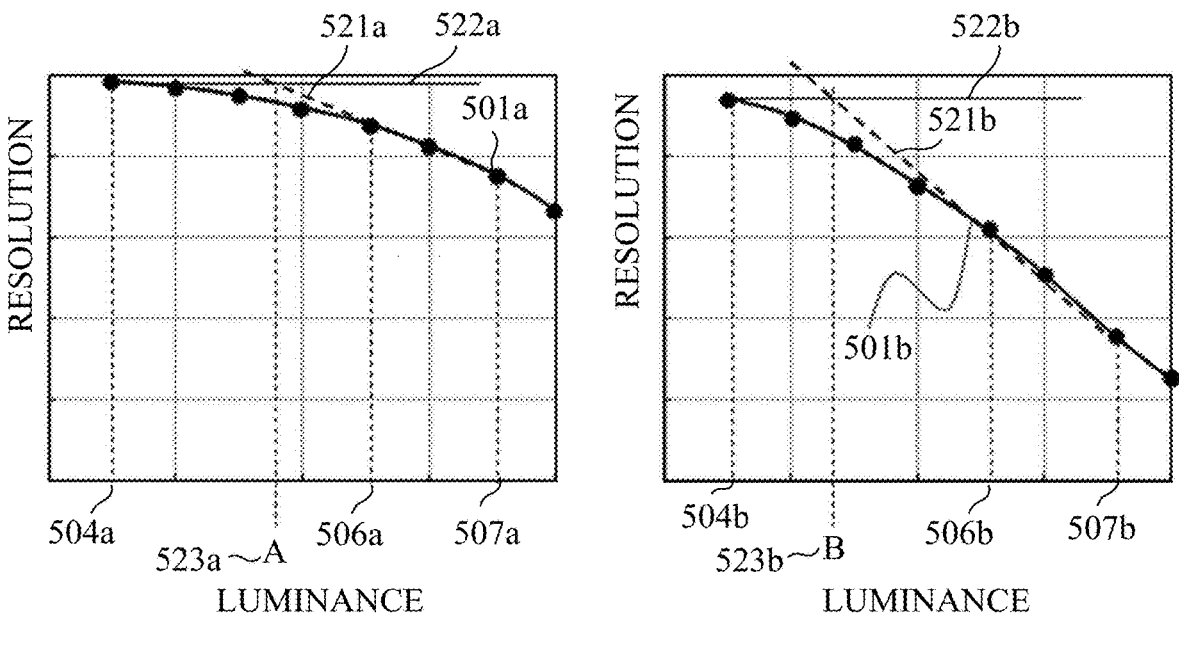
FIG. 55A
FIG. 55B

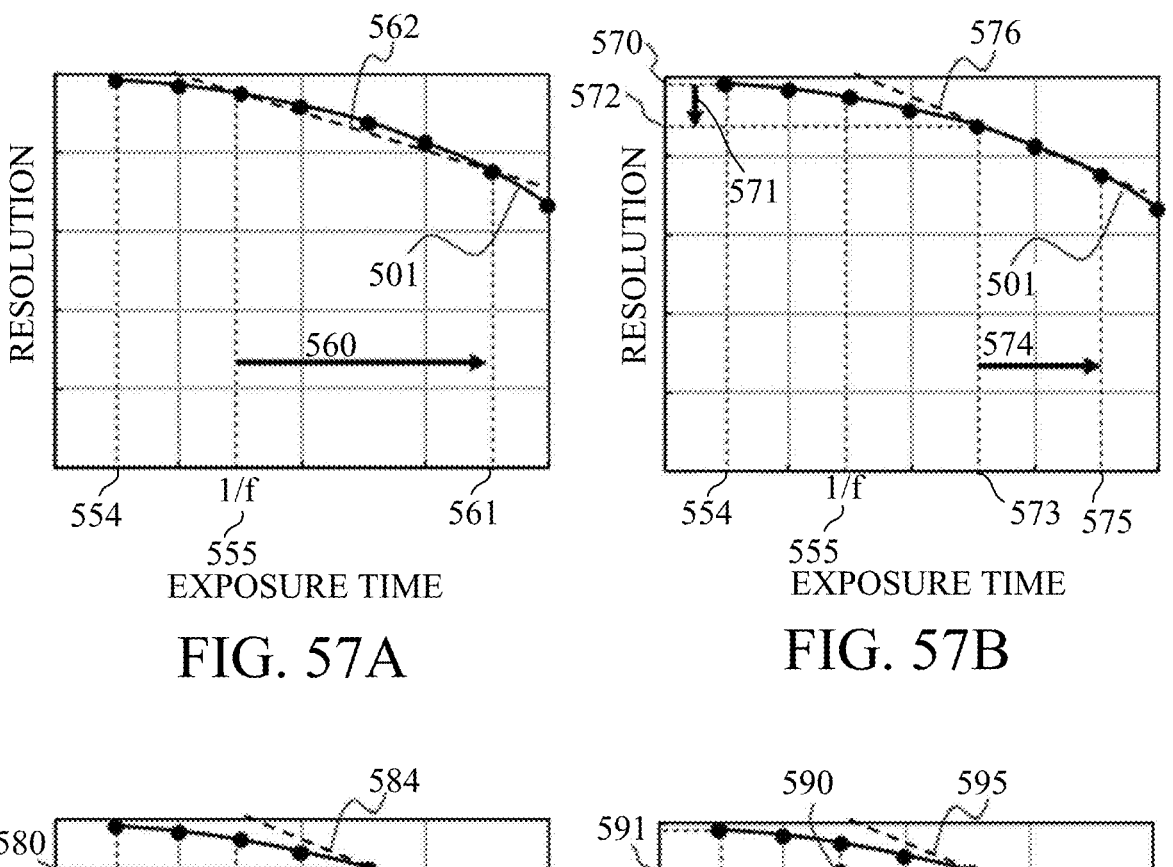
FIG. 57A
FIG. 57B
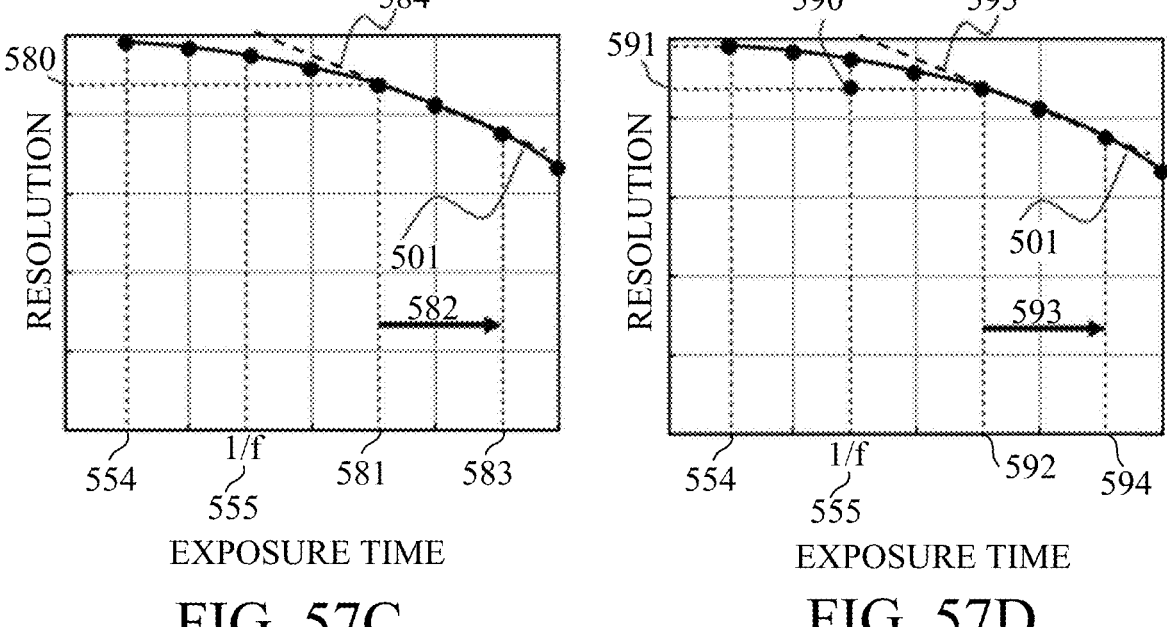
FIG. 57C
FIG. 57D

1

HANDHELD BLUR EVALUATING APPARATUS, HANDHELD BLUR EVALUATING METHOD, MANUFACTURING METHOD OF IMAGING UNIT, AND STORAGE MEDIUM

CROSS-REFERENCE TO RELATED APPLICATIONS

This application is a Continuation of International Patent Application No. PCT/JP2021/047057, filed on Dec. 20, 2021, which claims the benefit of Japanese Patent Application No. 2021-008831, filed on Jan. 22, 2021, both of which are hereby incorporated by reference herein in their entirety.

BACKGROUND

Technical Field

One of the aspects of the embodiments relates to a handheld blur (blur) evaluating apparatus configured to evaluate the handheld blur in an imaging unit.

Description of Related Art

PCT International Publication No. WO 2013/076964 discloses a measuring apparatus for measuring an effect of an image stabilizing function of a target camera (imaging unit) by imaging a chart by the target camera that is fixed to a (vibration) excitation table of a (vibration) excitation apparatus, and by analyzing the resultant image using a computer.

However, the measuring apparatus disclosed in WO 2013/076964 cannot evaluate the handheld blur in the imaging unit with high accuracy.

SUMMARY

A handheld blur evaluating apparatus according to one aspect of the embodiment is configured to evaluate a handheld blur of an imaging unit. The handheld blur evaluating apparatus includes an excitation unit configured to excite the imaging unit configured to image an object, a detector configured to detect disturbance in a change amount in measurement data of an image imaged by changing an imaging condition relating to exposure time or luminance, and a driving state indicating that the excitation unit is in a stationary state or in an excitation state, and a corrector configured to correct the disturbance.

A handheld blur evaluating method corresponding to each of the handheld blur evaluating apparatuses also constitutes another aspect of the disclosure. A non-transitory computer-readable storage medium storing a program that causes a computer to execute the above handheld blur evaluating method also constitutes another aspect of the disclosure.

Further features of the disclosure will become apparent from the following description of embodiments with reference to the attached drawings.

2

Figure 4:
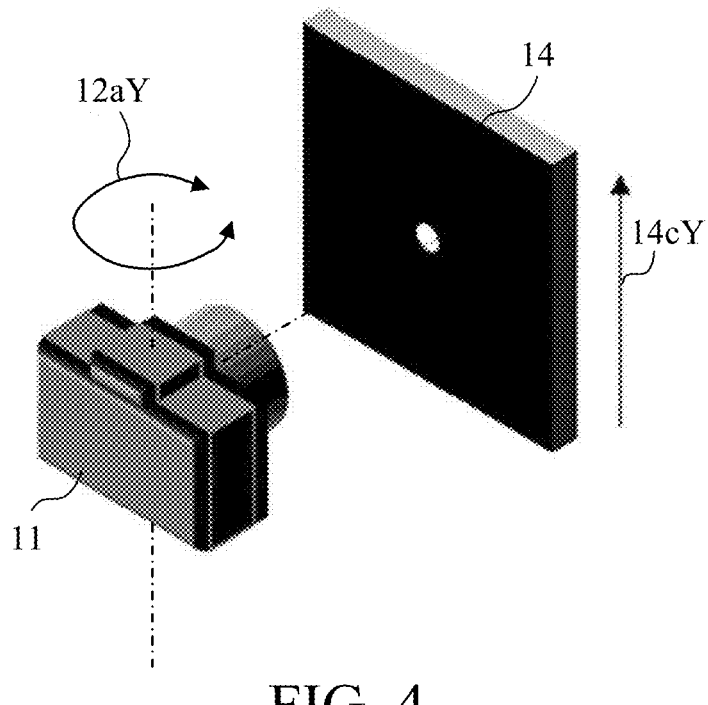

FIG. 4 is a perspective view of the handheld blur evaluating apparatus according to the first embodiment.

Figure 5:
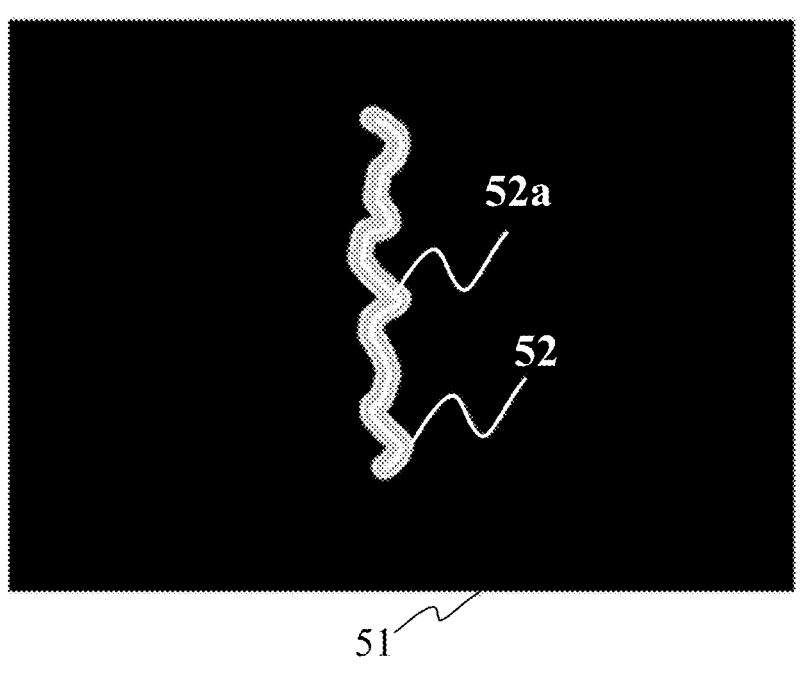

FIG. 5 illustrates a locus image in the first embodiment.

Figure 6:
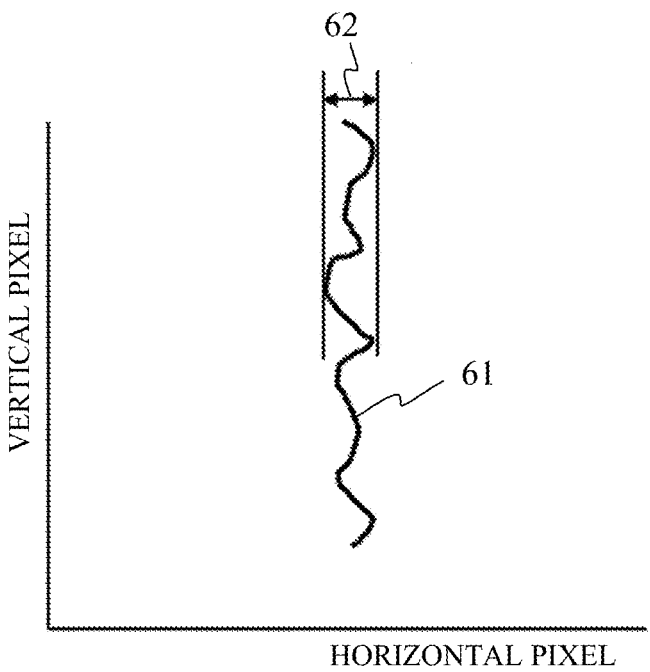

FIG. 6 is an extraction graph of the locus of the center of gravity of the point image in the first embodiment.

Figure 7:
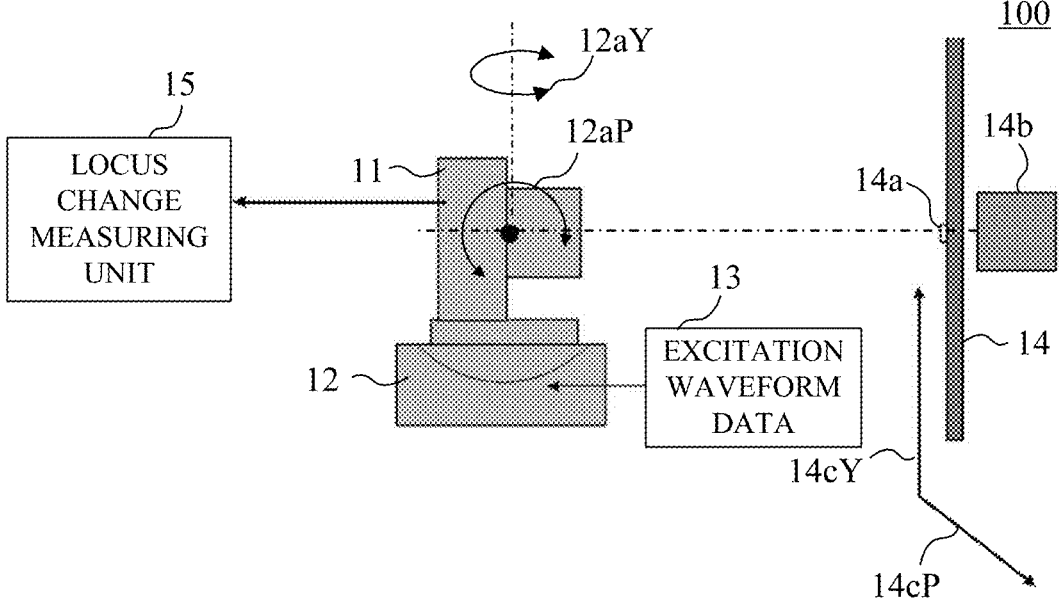

FIG. 7 is a side view of the handheld blur evaluating apparatus according to the first embodiment.

Figure 8:
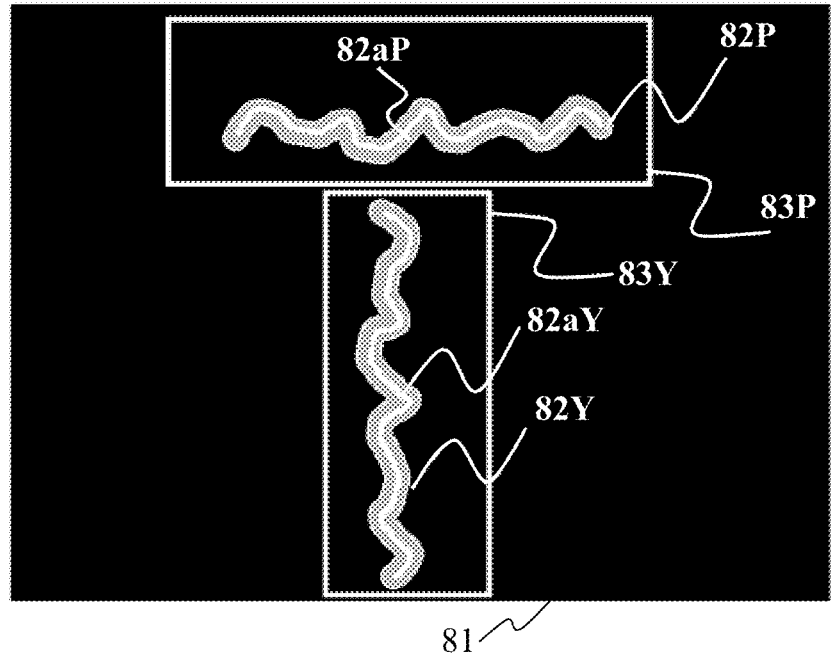

FIG. 8 illustrates locus images in the first embodiment.

FIGS. 9A, 9B, 9C, and 9D are graphs of a handheld blur calculating method according to the first embodiment.

Figure 10:
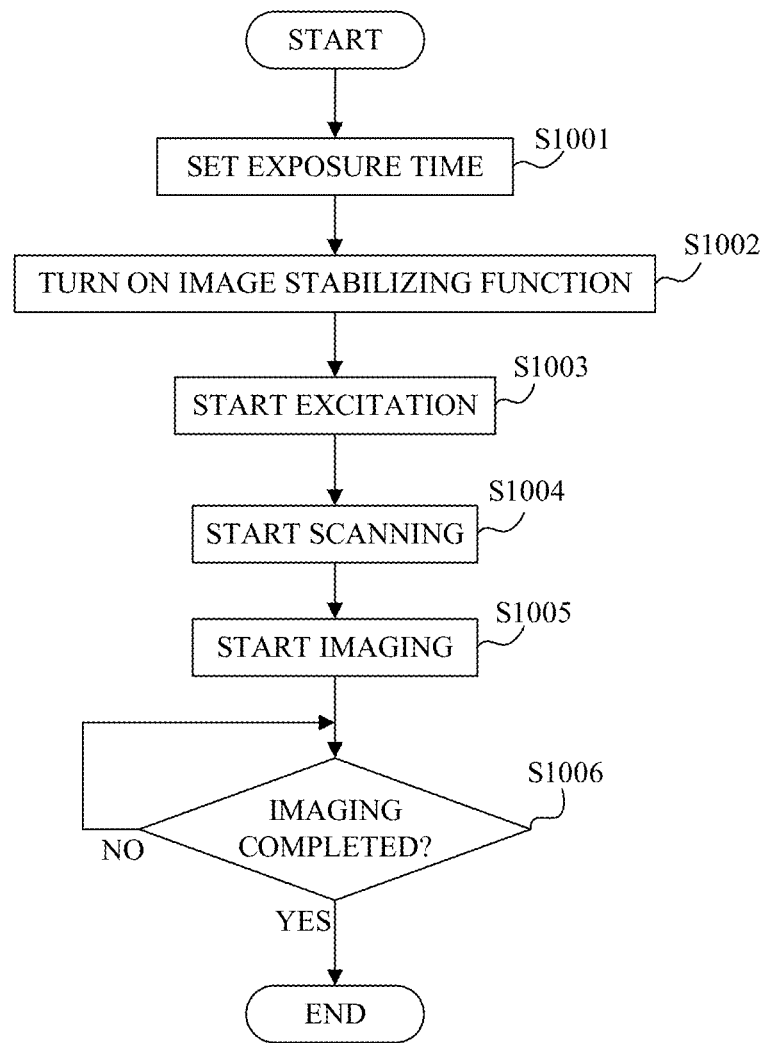

FIG. 10 is a flowchart of a measuring method according to the first embodiment.

Figure 11:
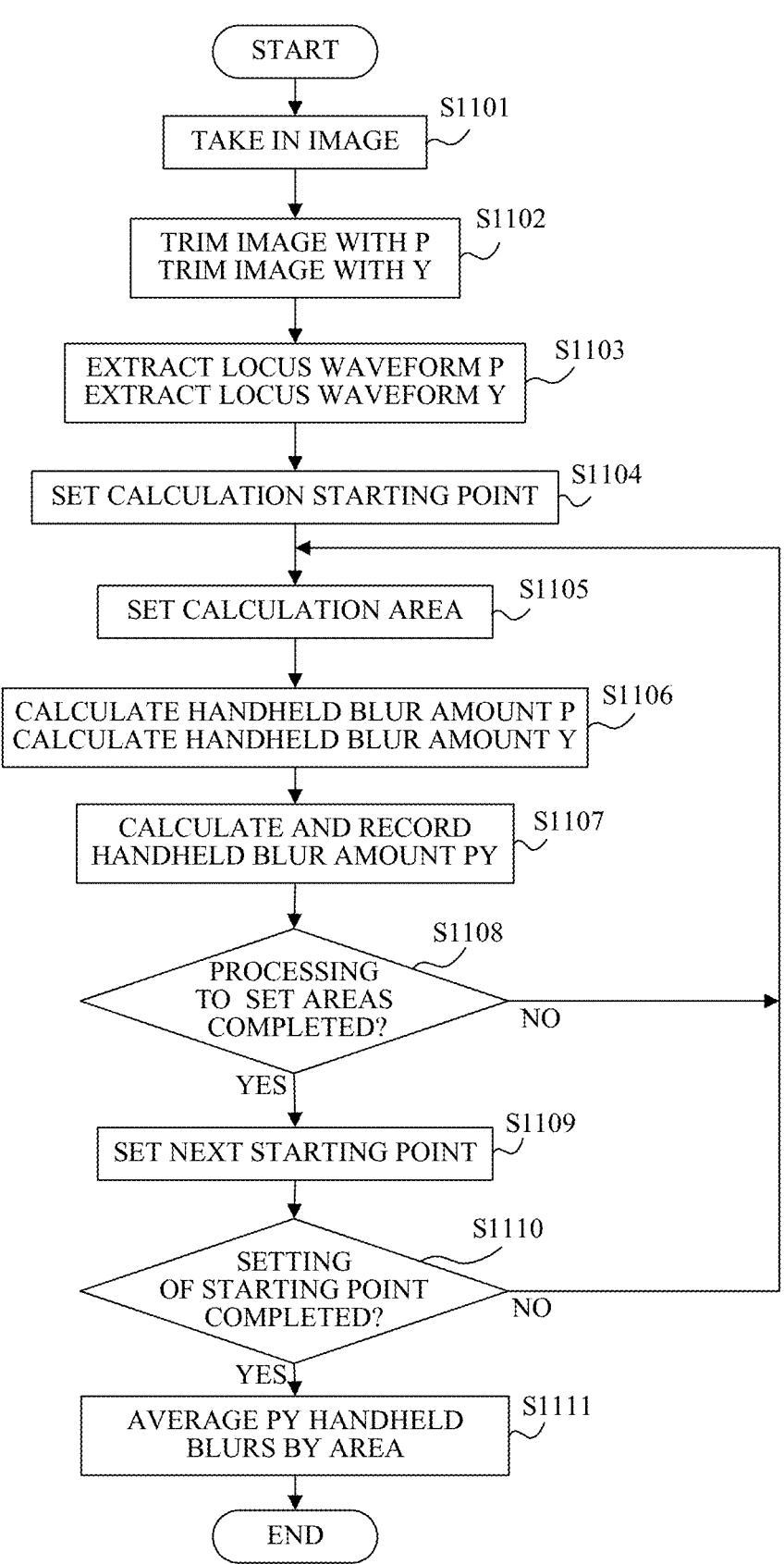

FIG. 11 is a flowchart of a handheld blur calculating method according to the first embodiment.

Figure 12:
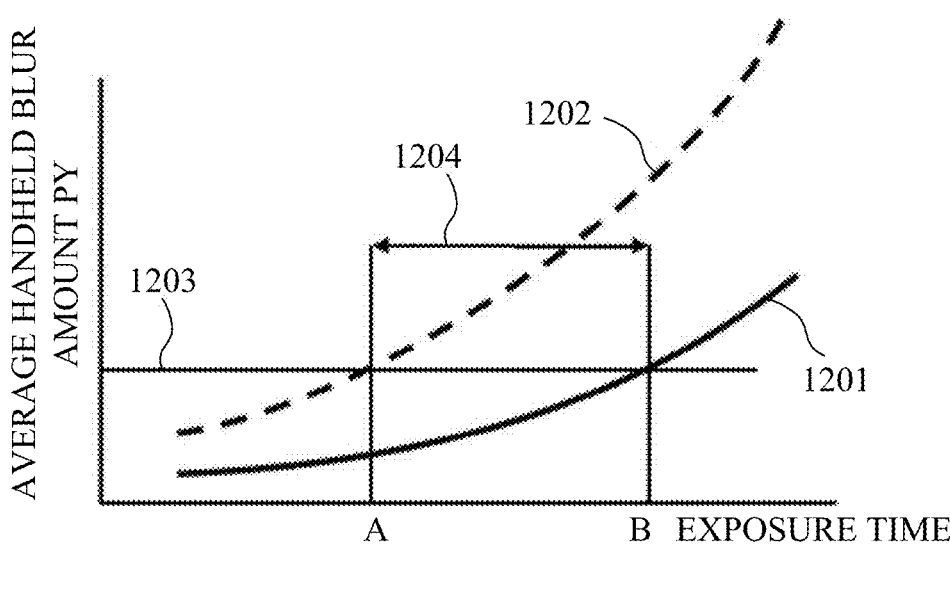

FIG. 12 is an image stabilizing performance evaluation graph in the first embodiment.

Figure 13:
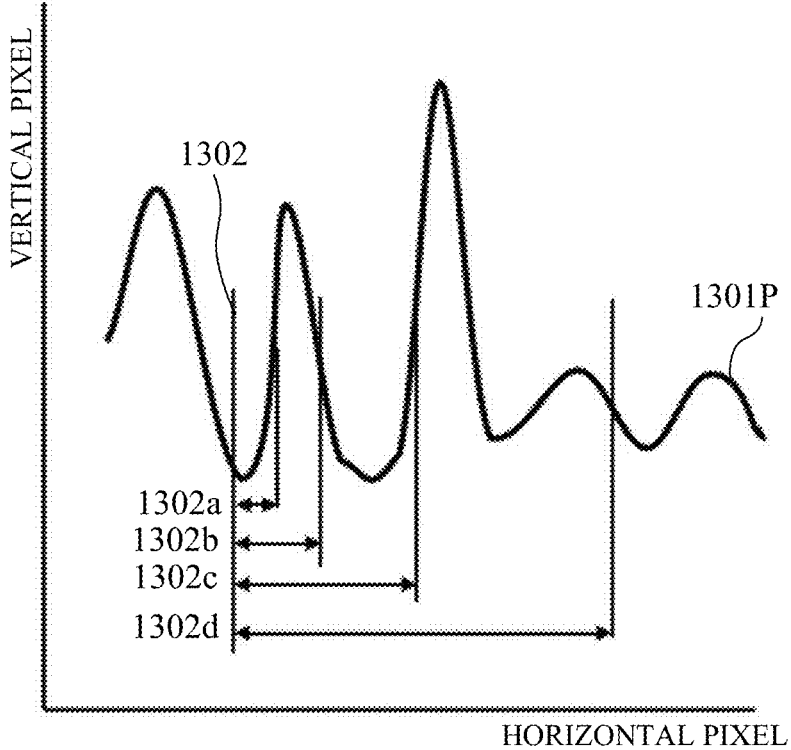
Figure 14A:
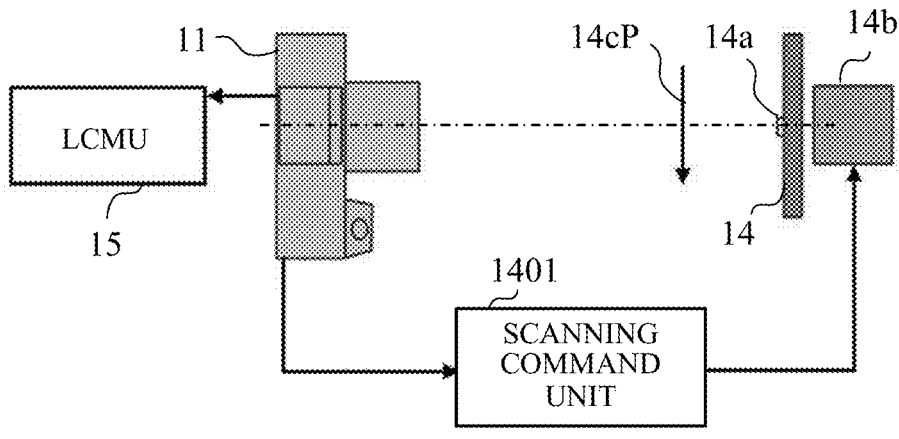
Figure 14B:
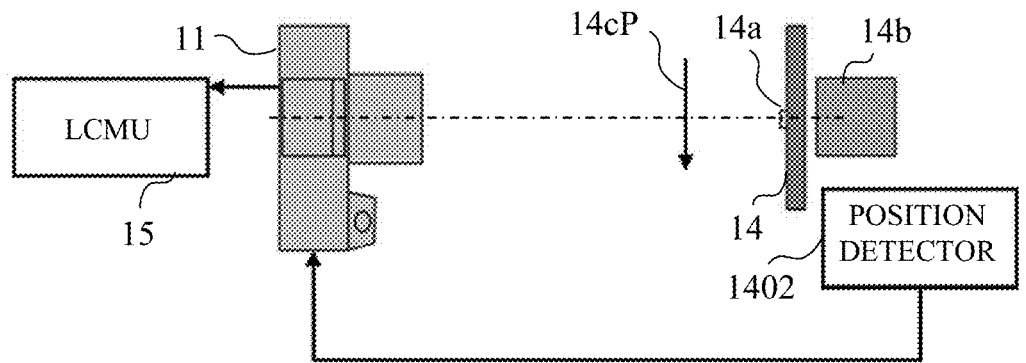

FIG. 13 is a graph of the handheld blur calculating method (while an image stabilizing function is turned off) according to the first embodiment;

FIGS. 14A and 14B explain object scanning control according to the first embodiment.

Figure 15:
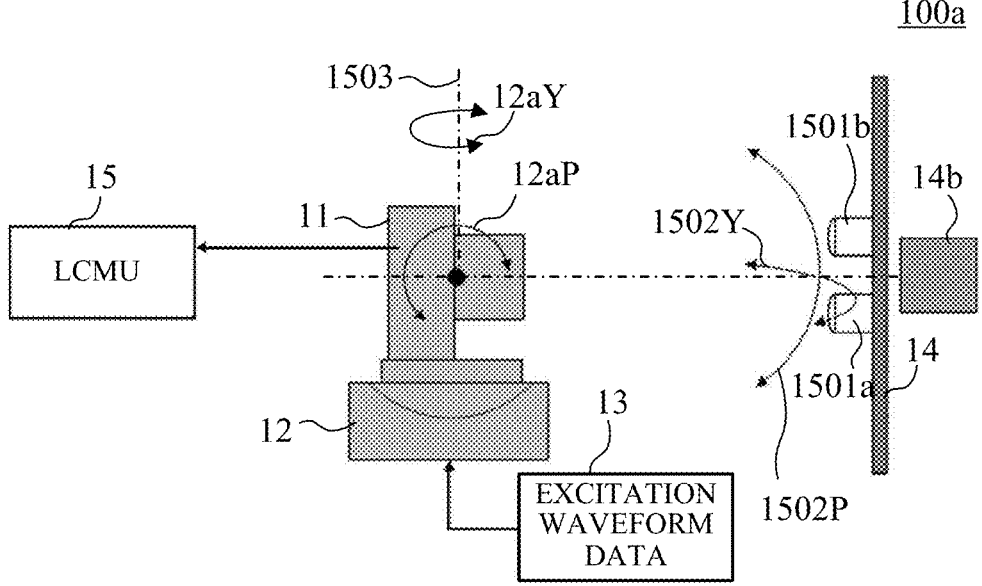

FIG. 15 is a side view of a handheld blur evaluating apparatus according to a second embodiment.

Figures 16A, 16B, 17:
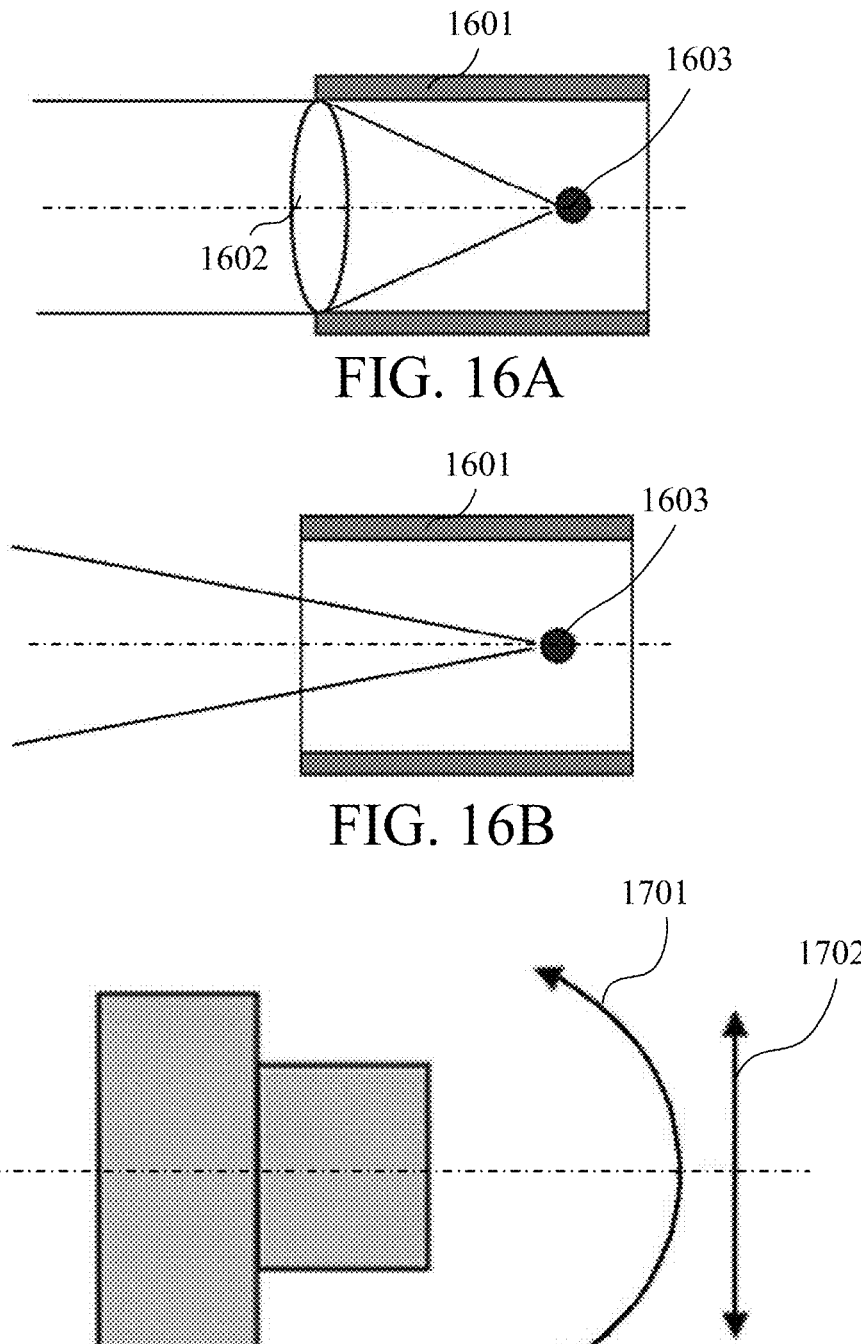

FIGS. 16A and 16B explain a collimated light source according to the second embodiment.

FIG. 17 explains the handheld blur applied to the camera in the second embodiment.

Figure 18A:
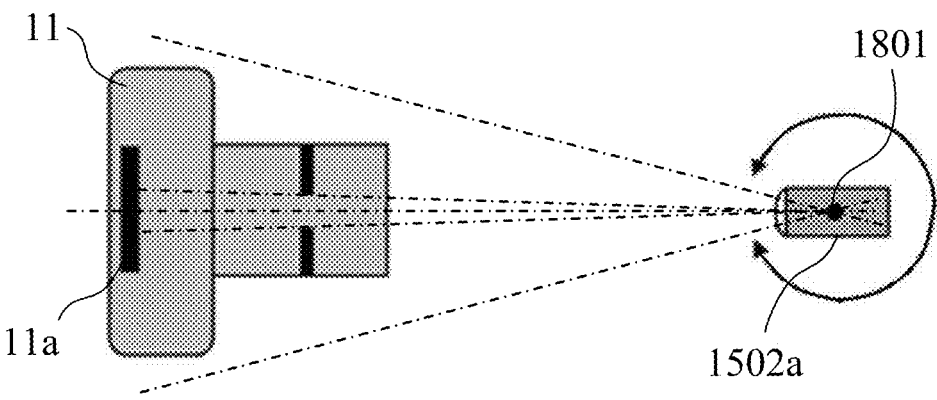
Figure 18B:
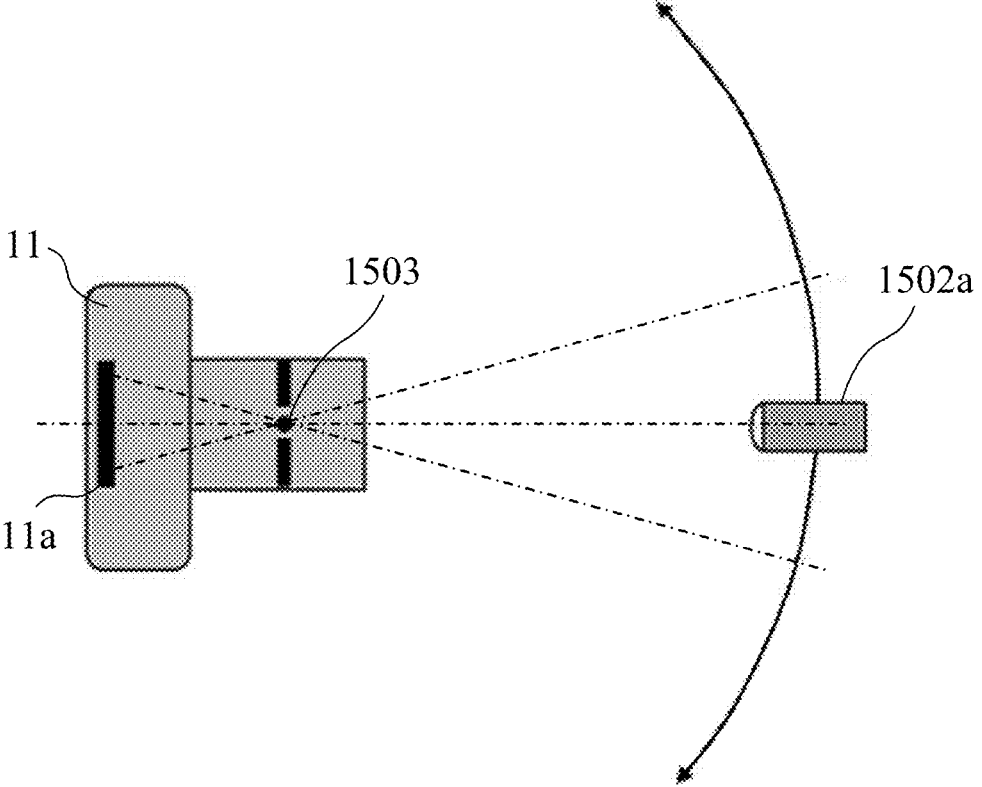

FIGS. 18A and 18B explain object scanning according to the second embodiment.

Figure 19:
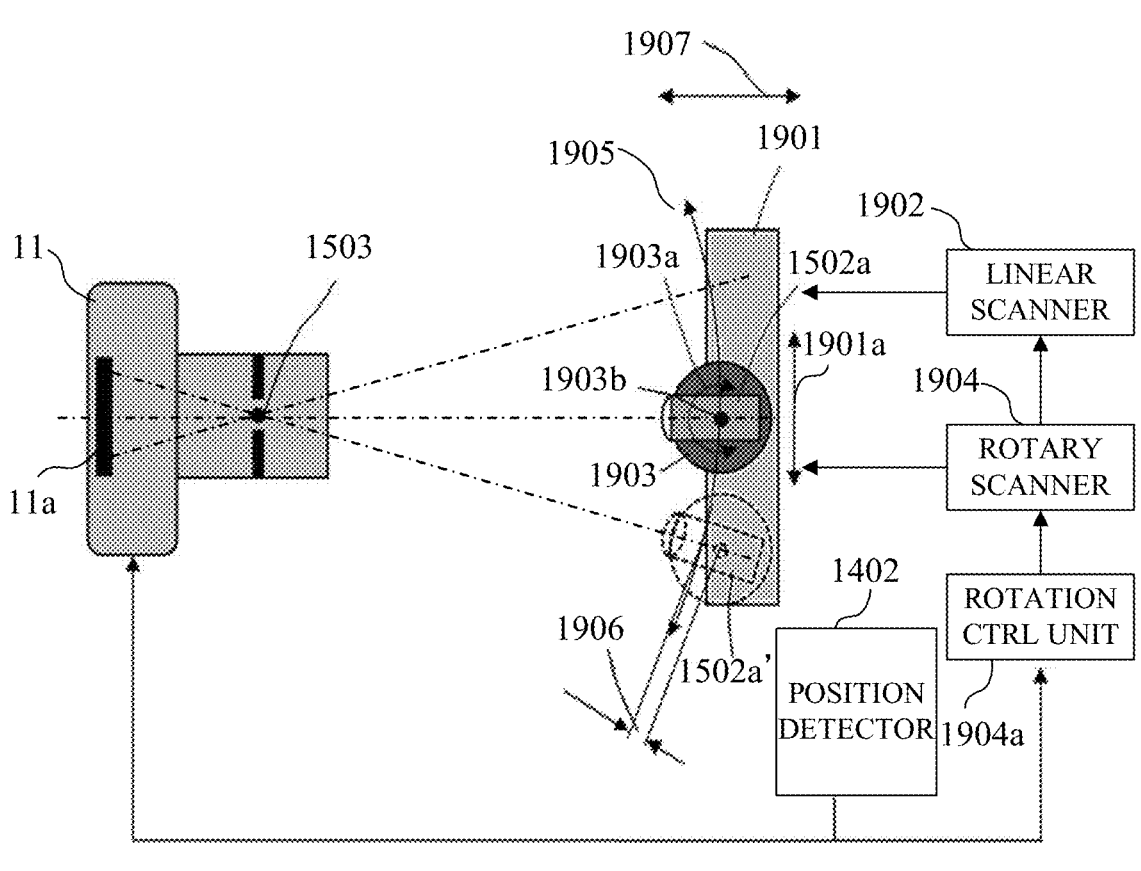

FIG. 19 explains object scanning control according to the second embodiment.

Figure 20:
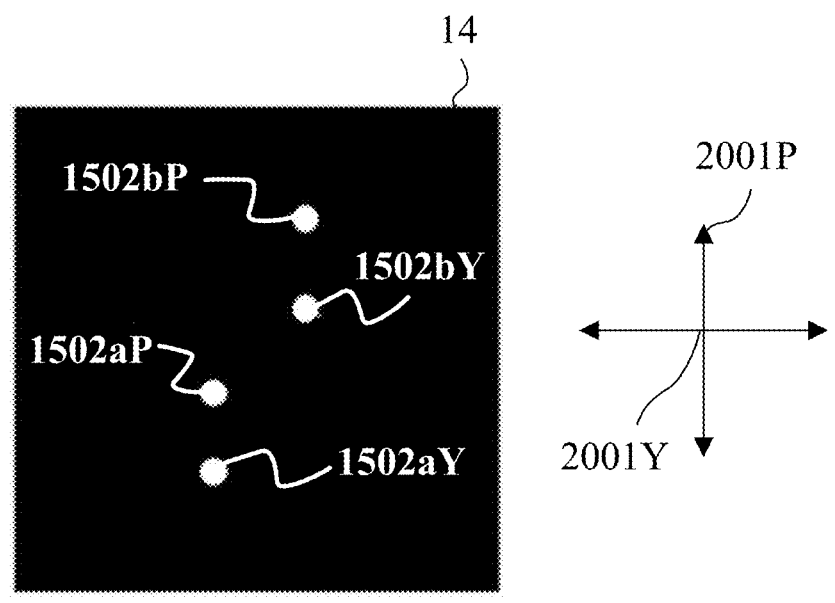

FIG. 20 is an object layout diagram in the second embodiment.

Figure 21:
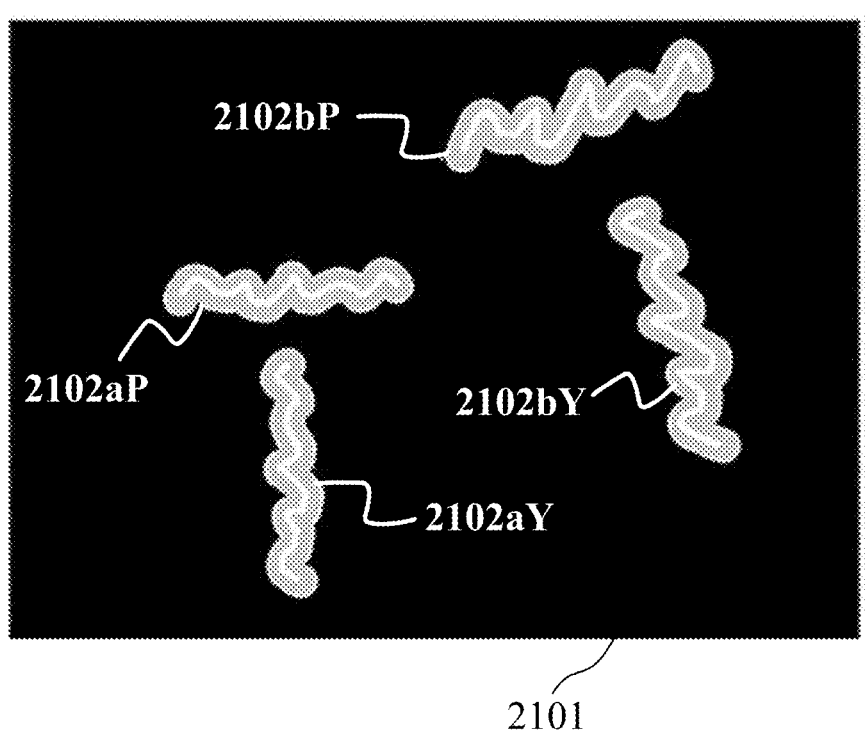

FIG. 21 is a locus image in the second embodiment.

Figure 22:
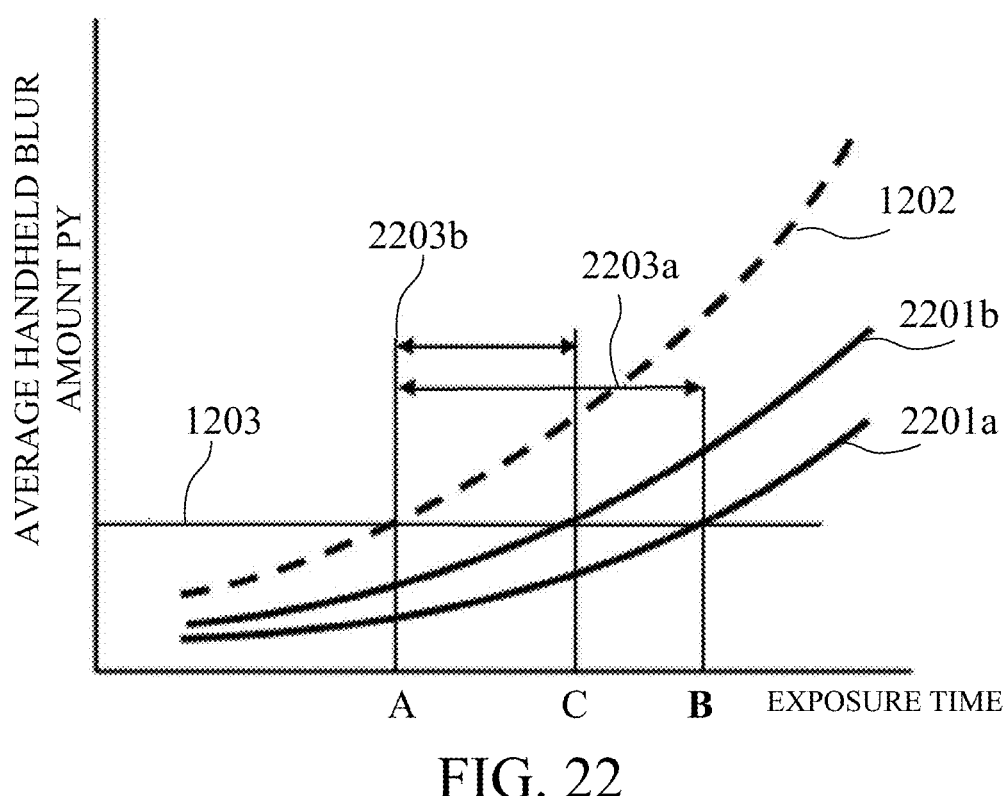

FIG. 22 is an image stabilizing performance evaluation graph in the second embodiment.

Figure 23:
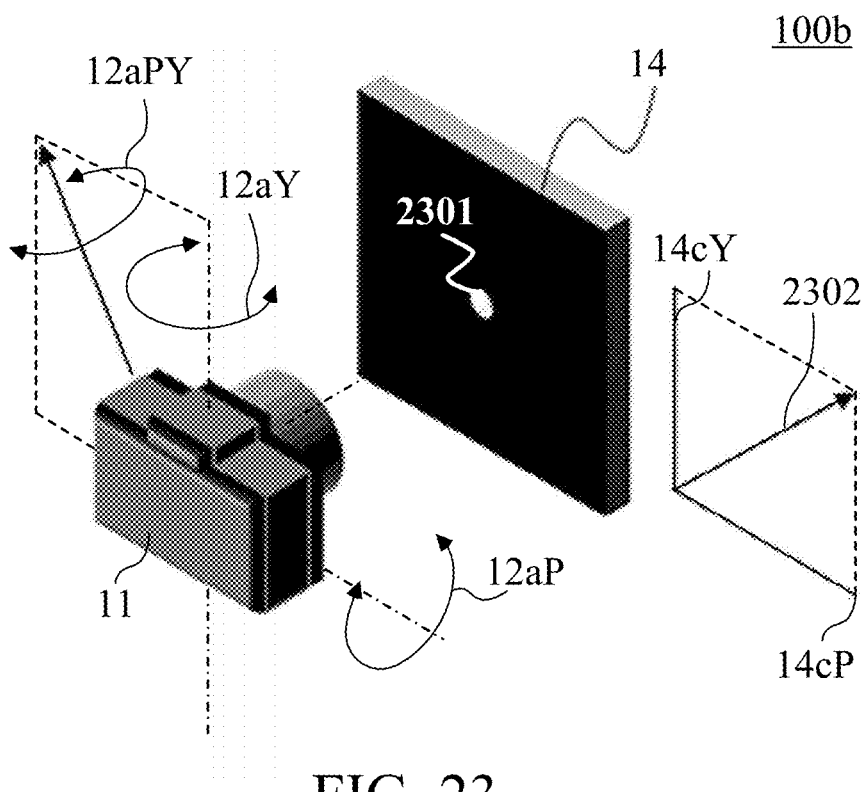

FIG. 23 is a perspective view of a handheld blur evaluating apparatus according to a third embodiment.

Figure 24:
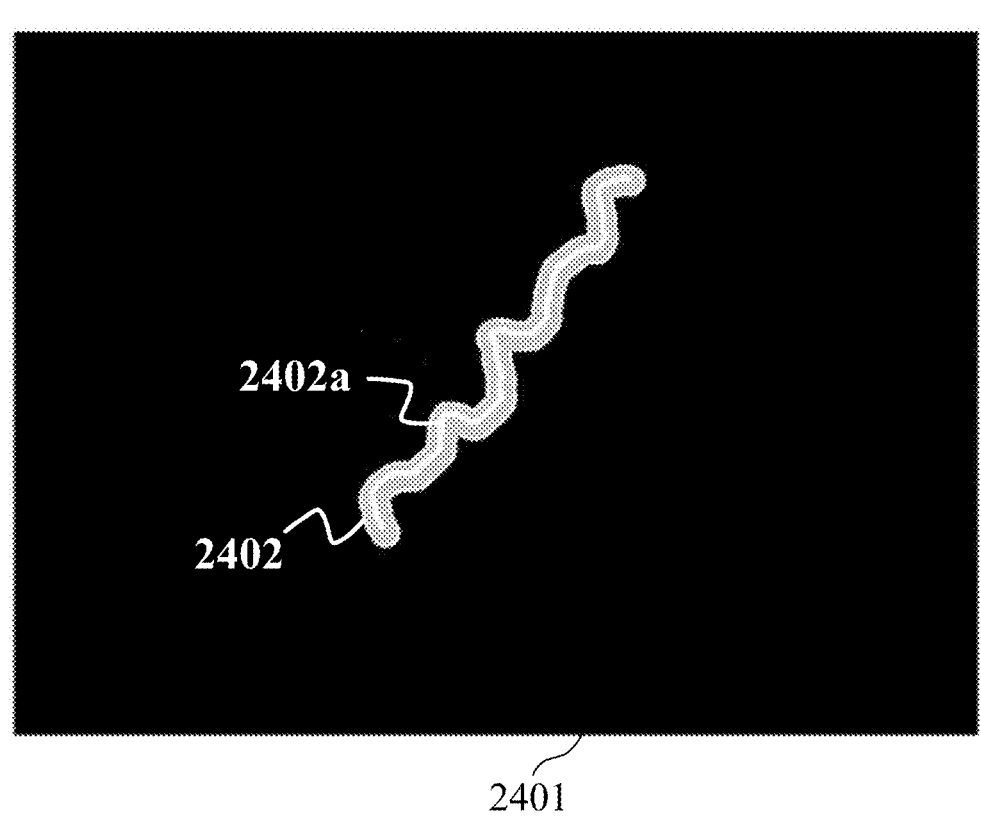

FIG. 24 is a locus image in the third embodiment.

Figure 25A:
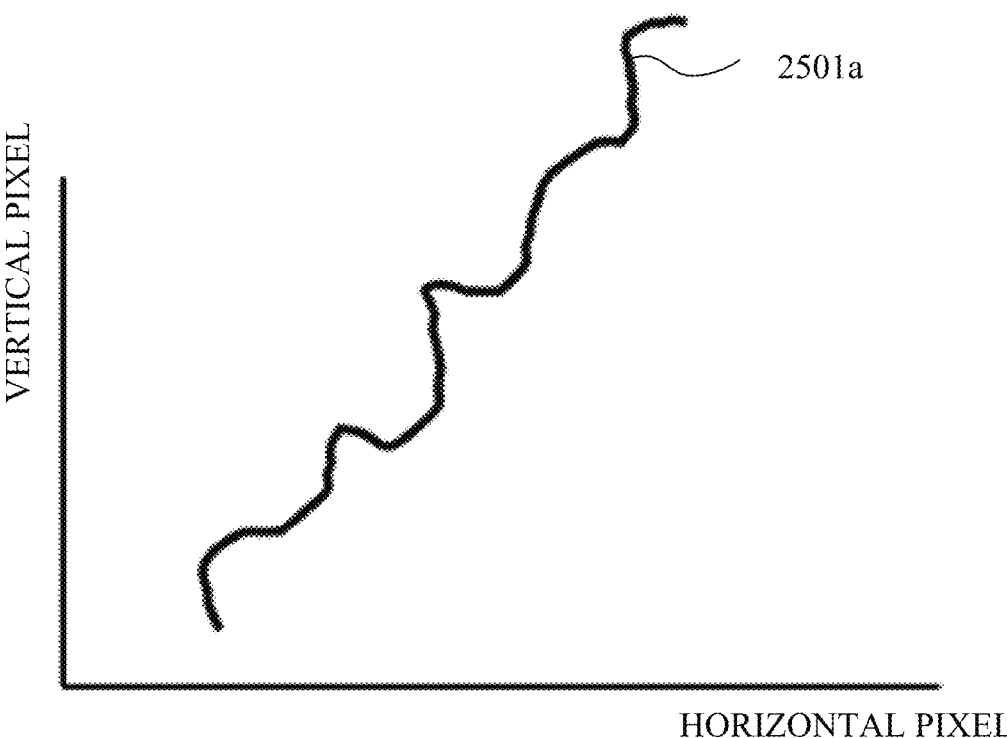
Figure 25B:
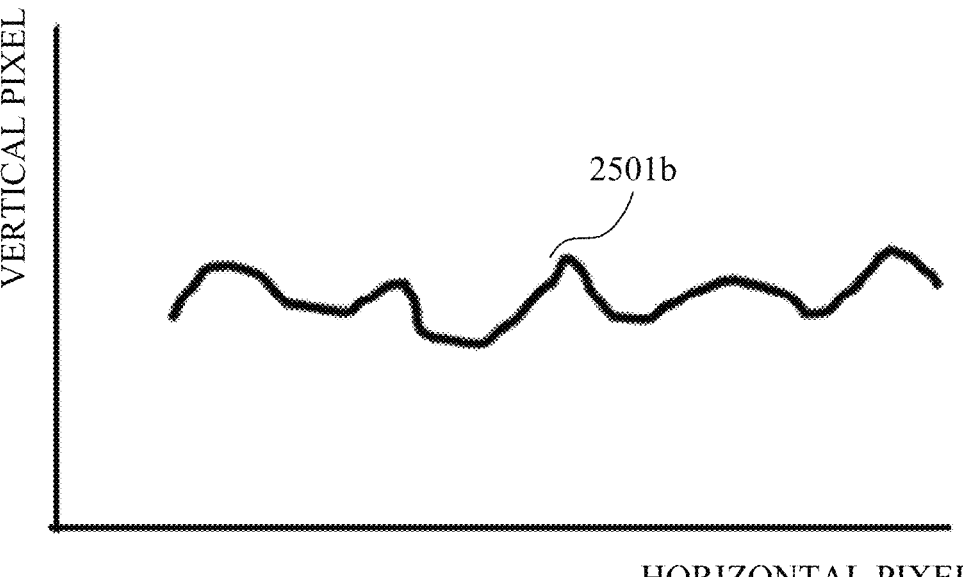

FIGS. 25A and 25B are extraction graphs of the locus of the center of gravity of the point image in the third embodiment.

Figures 26, 27:
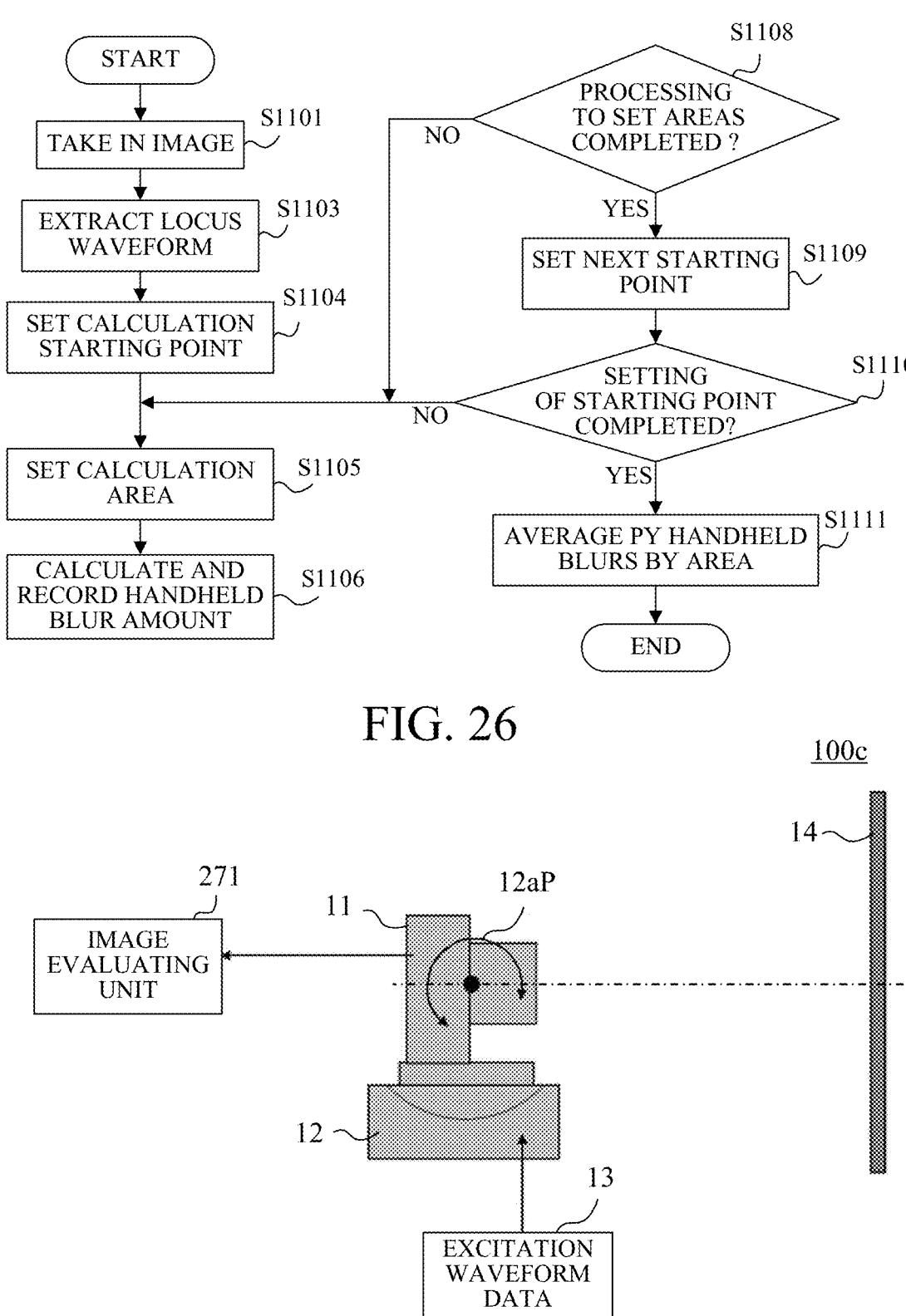

FIG. 26 is a flowchart of a handheld blur calculating method according to the third embodiment.

FIG. 27 is a schematic diagram of a handheld blur evaluating apparatus according to a fourth embodiment.

Figure 28:
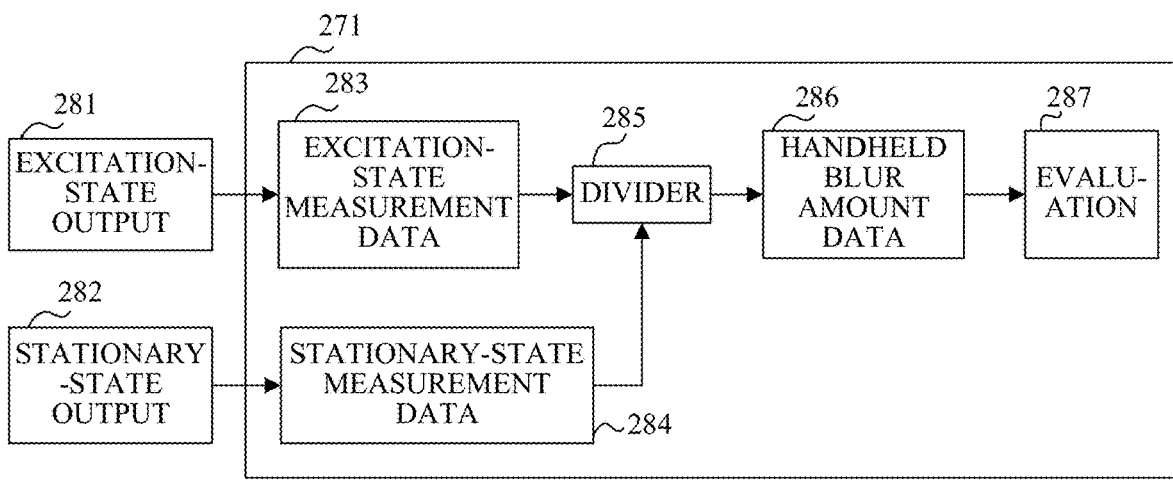

FIG. 28 is a block diagram of image evaluating unit in the fourth embodiment.

Figure 29:
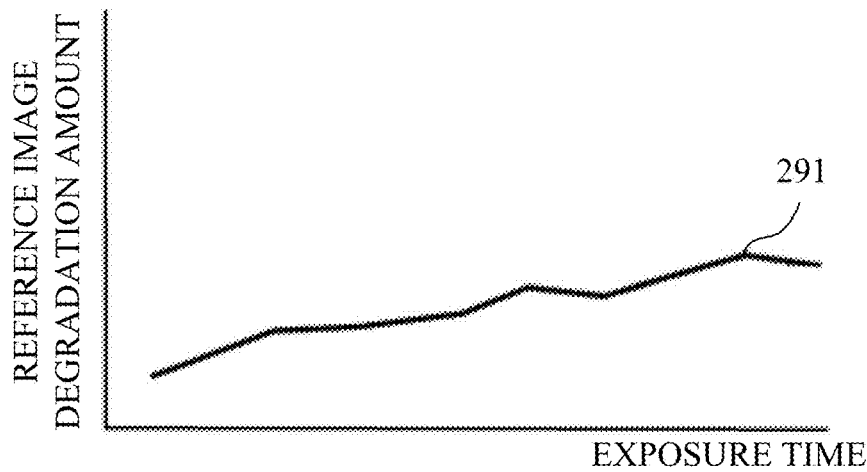

FIG. 29 is a graph of a reference image degradation amount in the fourth embodiment.

Figure 30:
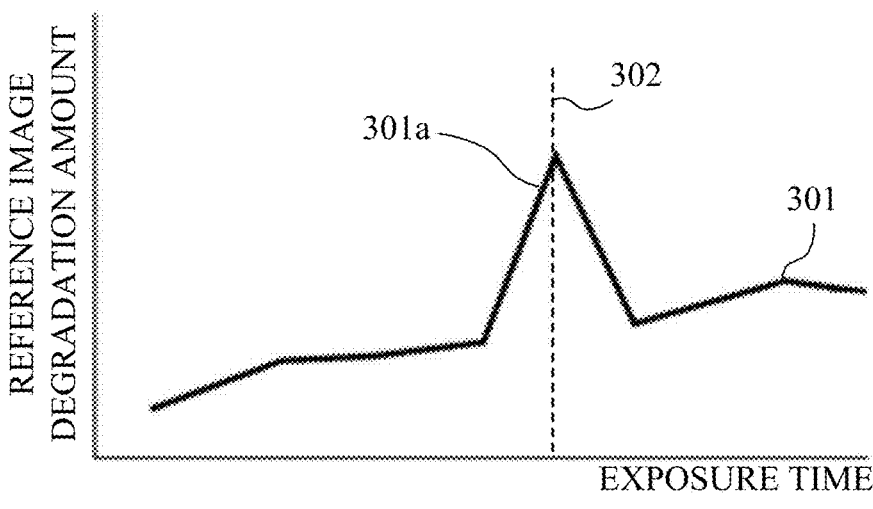

FIG. 30 is a graph of the reference image degradation amount in the fourth embodiment.

Figures 31A, 31B, 31C:
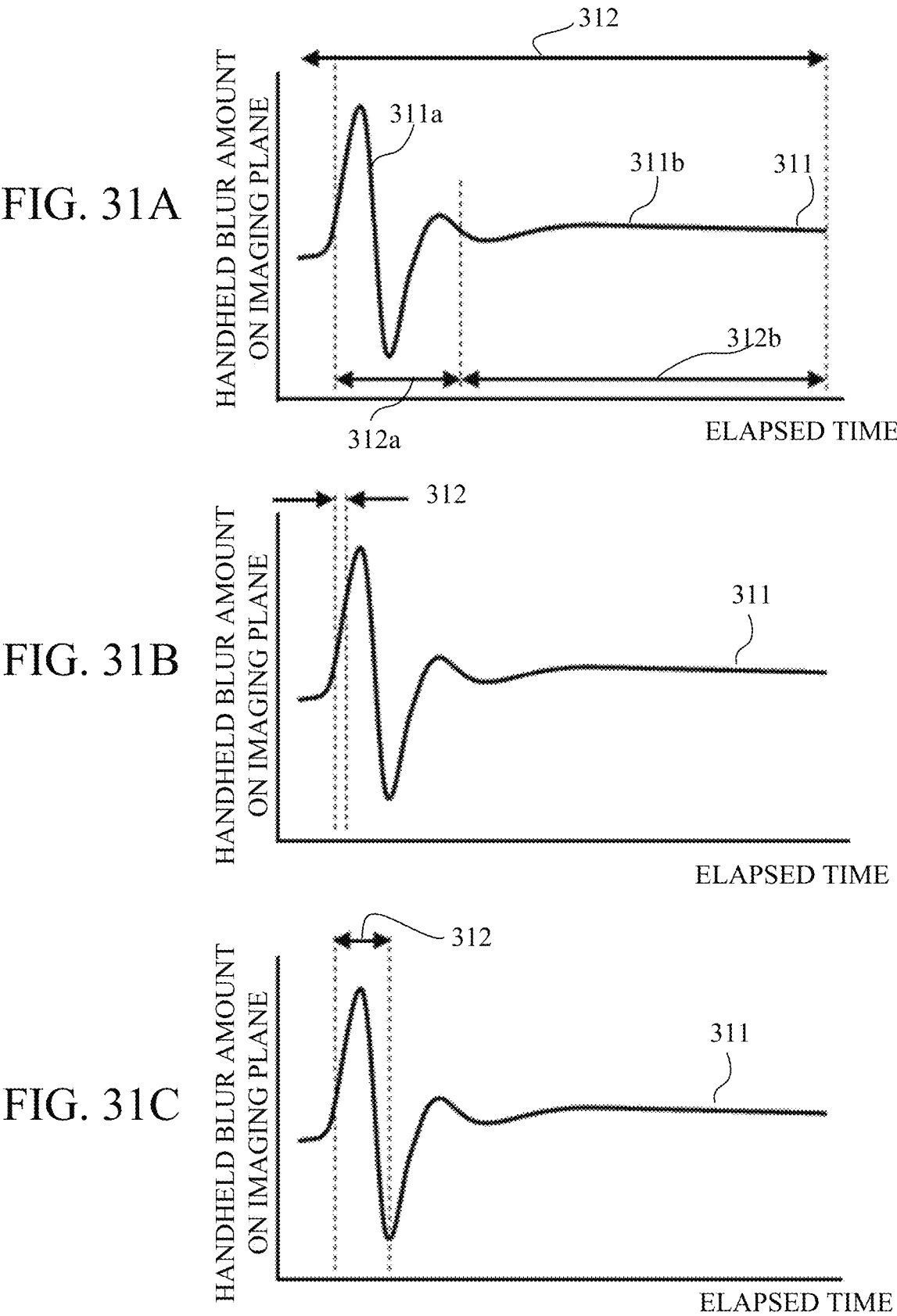

FIGS. 31A, 31B, and 31C explain a relationship between exposure time and disturbance according to the fourth embodiment.

Figure 32:
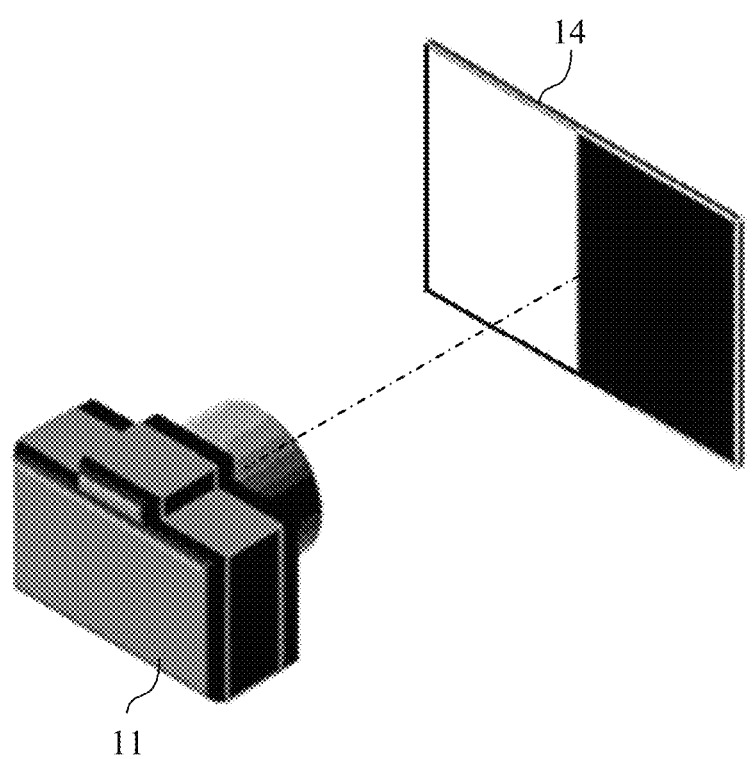

FIG. 32 explains an image contrast detecting method according to the fourth embodiment.

FIGS. 33A, 33B, 33C, and 33D explain a change amount calculating method and disturbance superimposition at high ISO speed according to the fourth embodiment.

Figure 34:
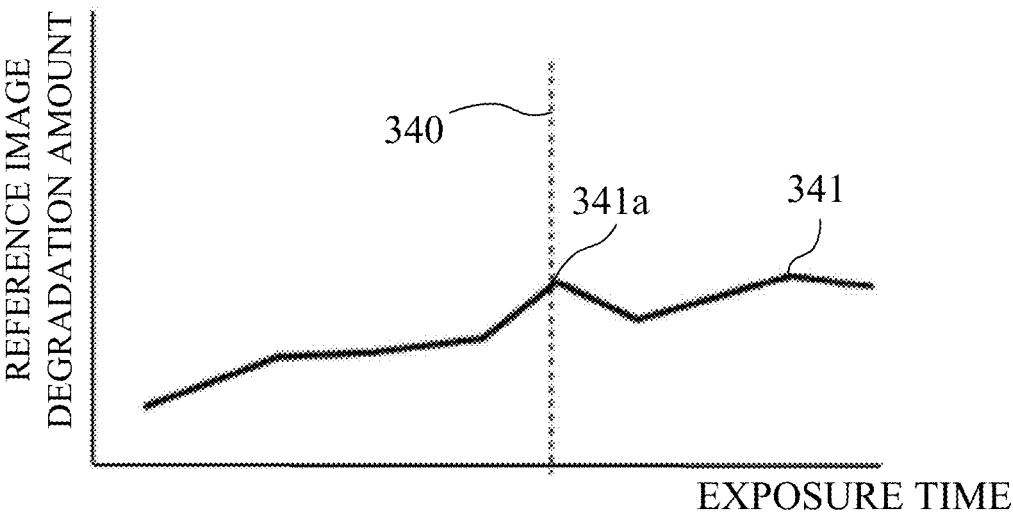

FIG. 34 explains the disturbance influence on the change amount according to the fourth embodiment.

Figure 35:
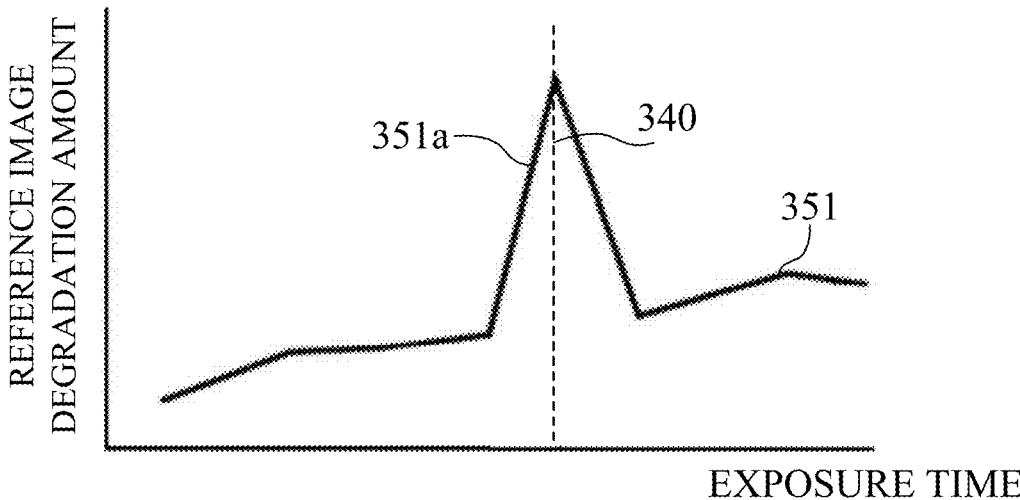

FIG. 35 explains the disturbance influence on the change amount according to the fourth embodiment.

Figures 36A, 36B, 36C:
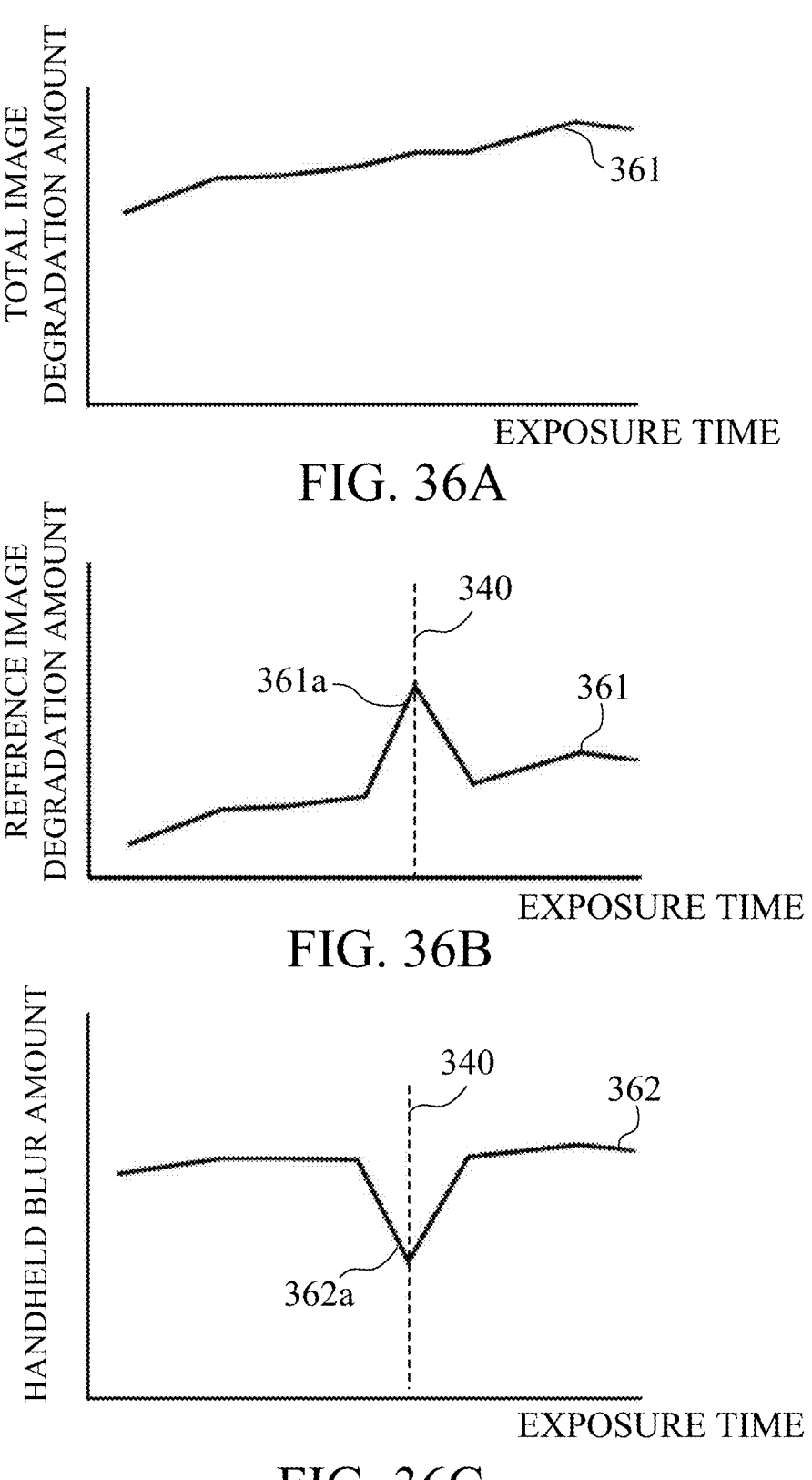

FIGS. 36A, 36B, and 36C explain the disturbance influence on a handheld blur amount according to the fourth embodiment.

Figure 37:
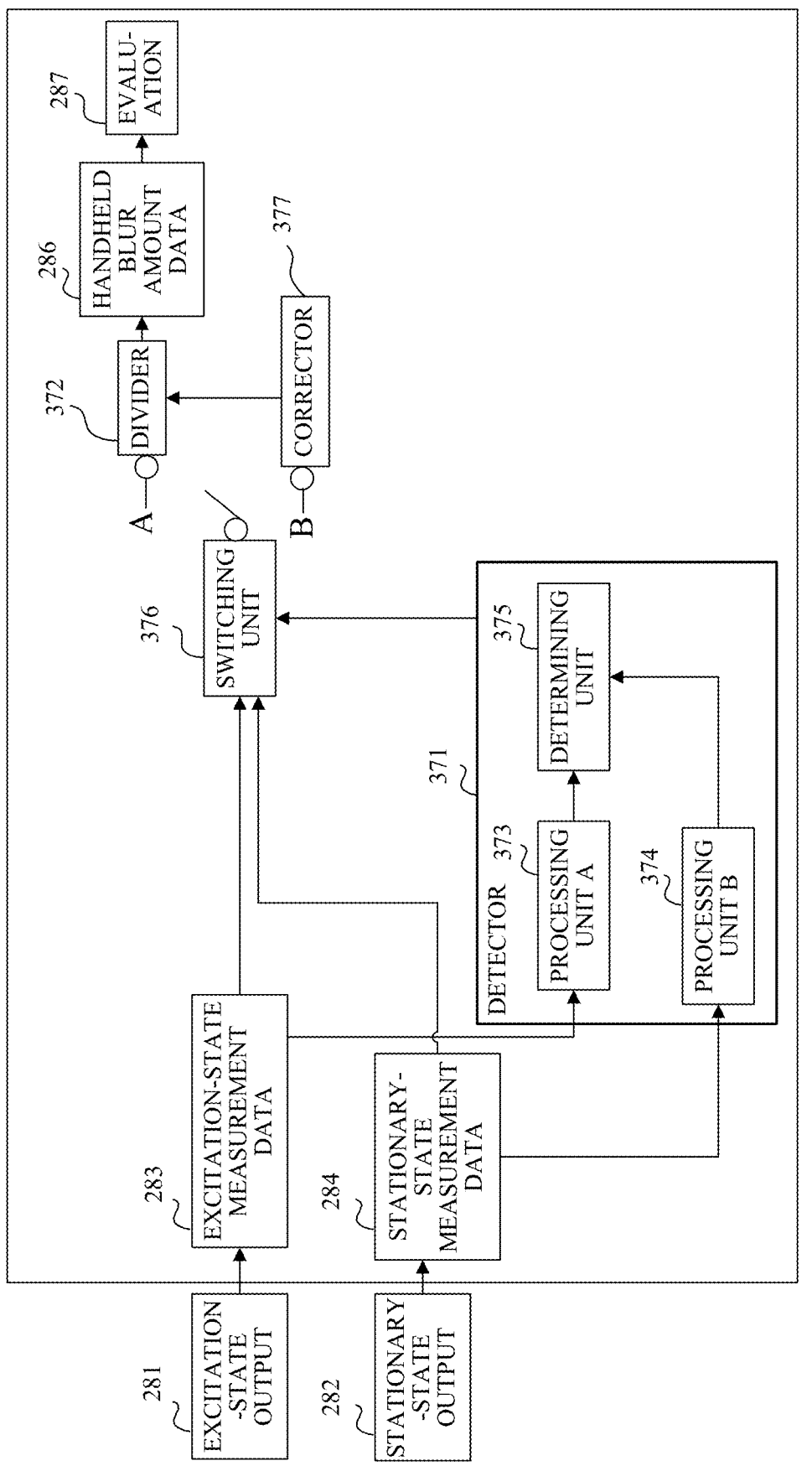

FIG. 37 is a block diagram of a handheld blur evaluating unit according to a fifth embodiment.

Figures 38A, 38B:
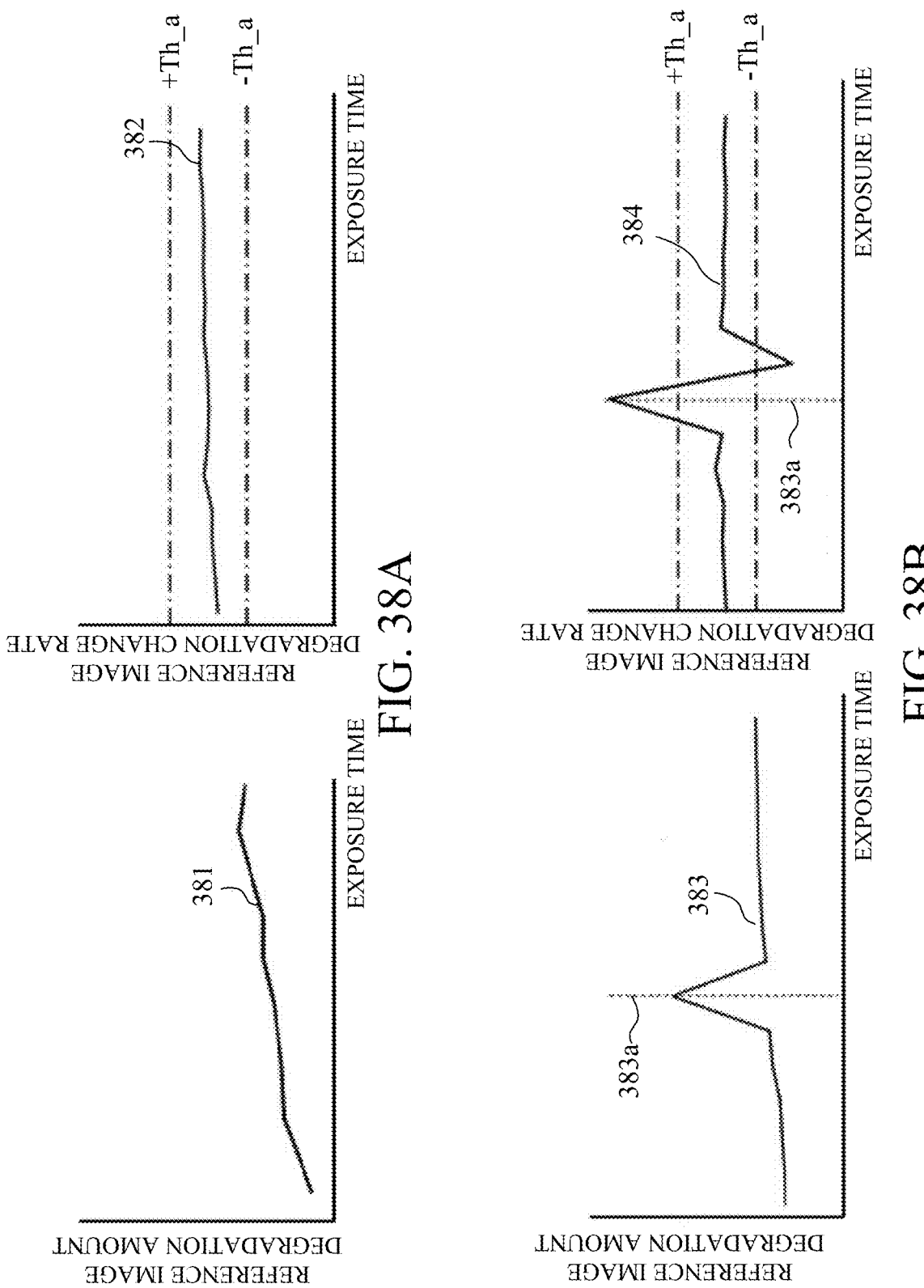

FIGS. 38A and 38B explain a disturbance determining threshold by a detector according to the fifth embodiment.

Figure 39A:
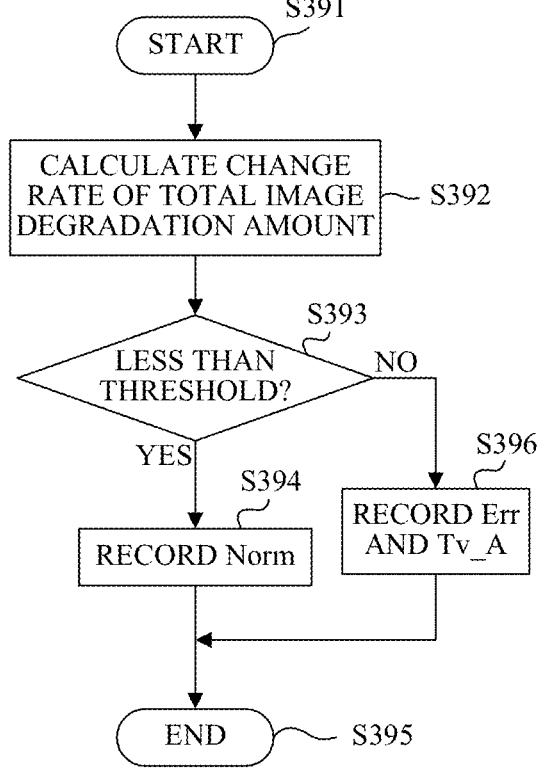
Figure 39B:
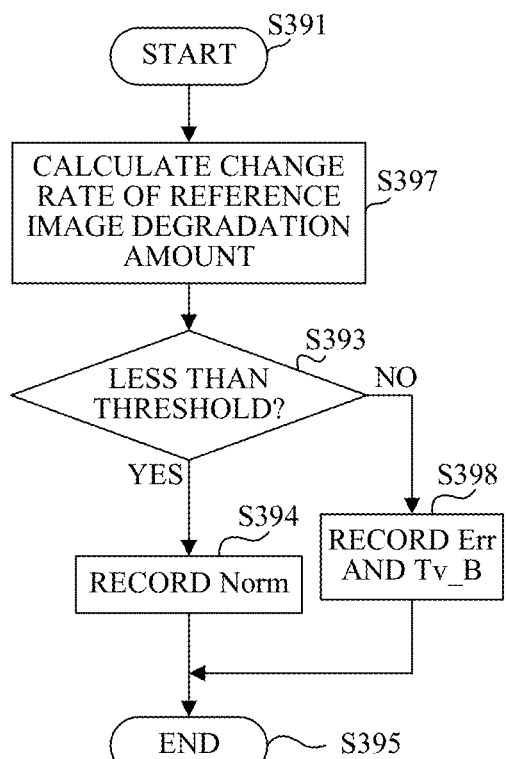
Figure 39C:
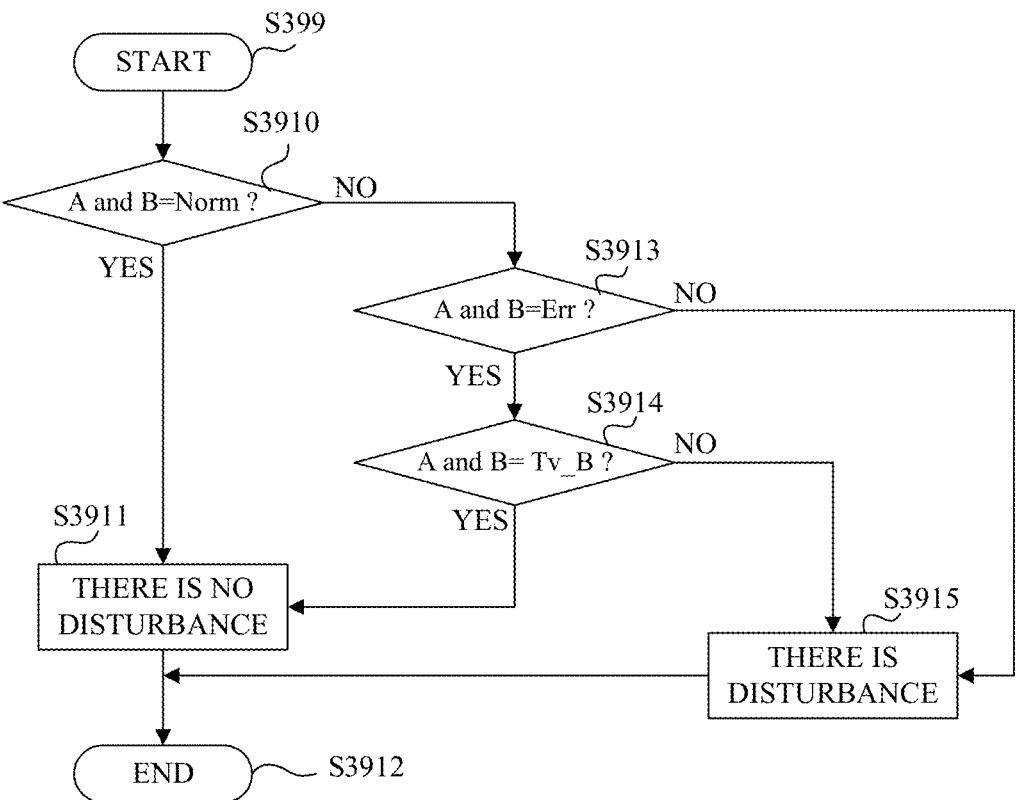

FIGS. 39A, 39B, and 39C are flowcharts illustrating the operation of a detector according to the fifth embodiment.

FIGS. 40A, 40B, 40C, and 40D explain the determination of whether there is disturbance according to the fifth embodiment.

FIGS. 41A, 41B, 41C, and 41D explain a correction method by a corrector in the fifth embodiment.

Figure 42:
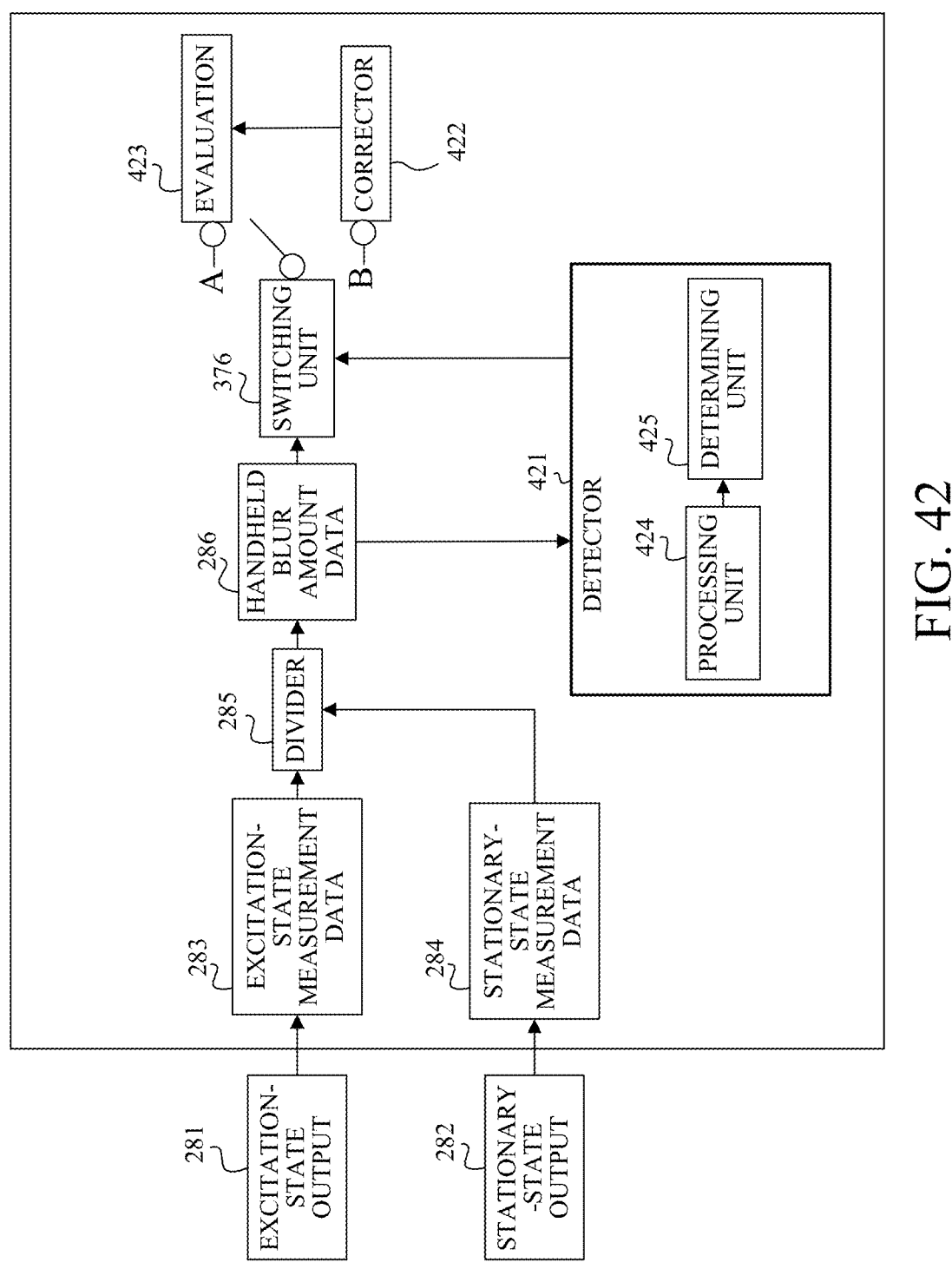

FIG. 42 explains a handheld blur evaluating unit according to a sixth embodiment.

Figure 43:
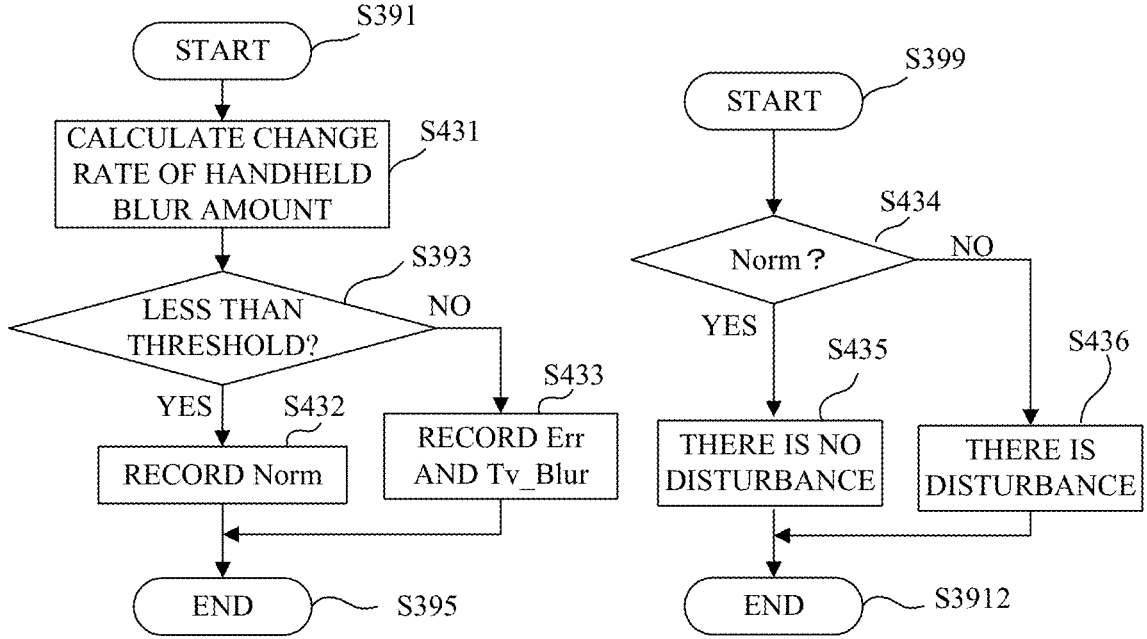

FIGS. 43A and 43B are flowcharts illustrating the operation in the detector in the sixth embodiment.

Figure 44:
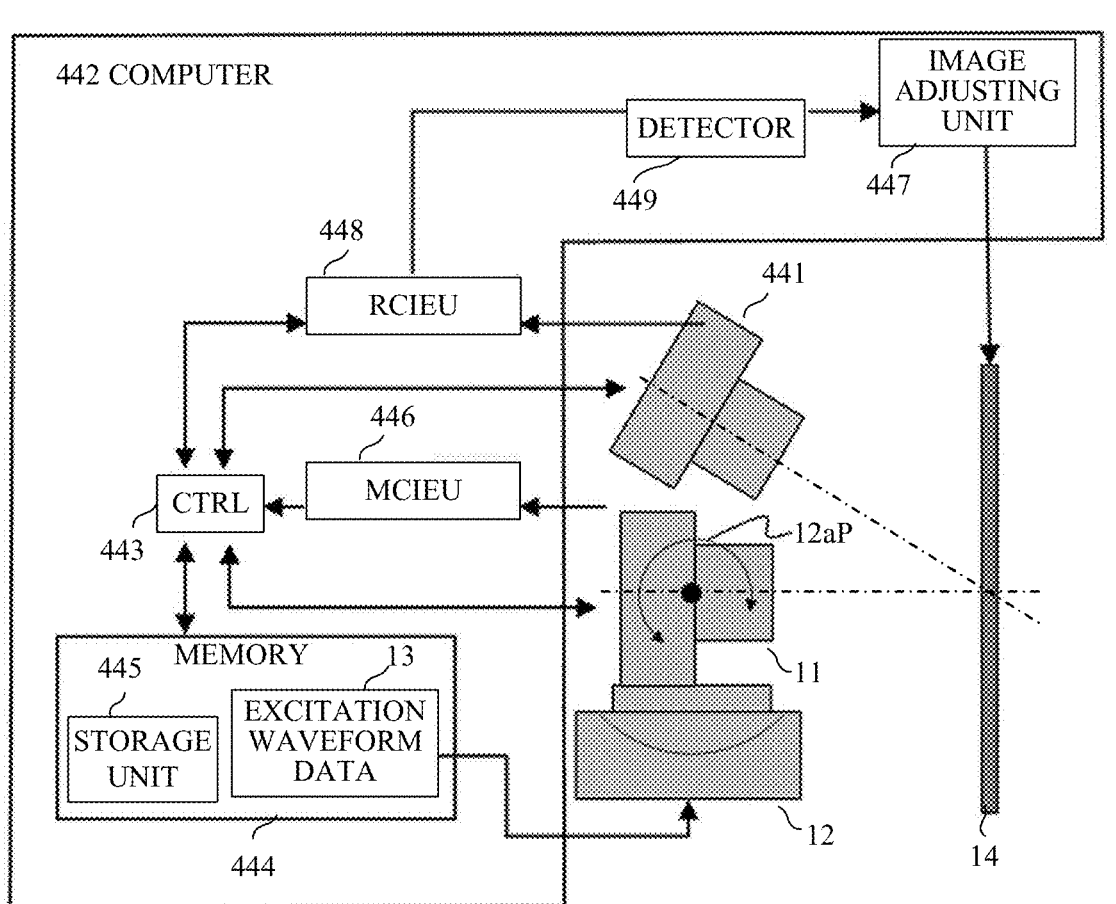

FIG. 44 is a schematic diagram of a handheld blur evaluating apparatus according to a seventh embodiment.

Figure 45:
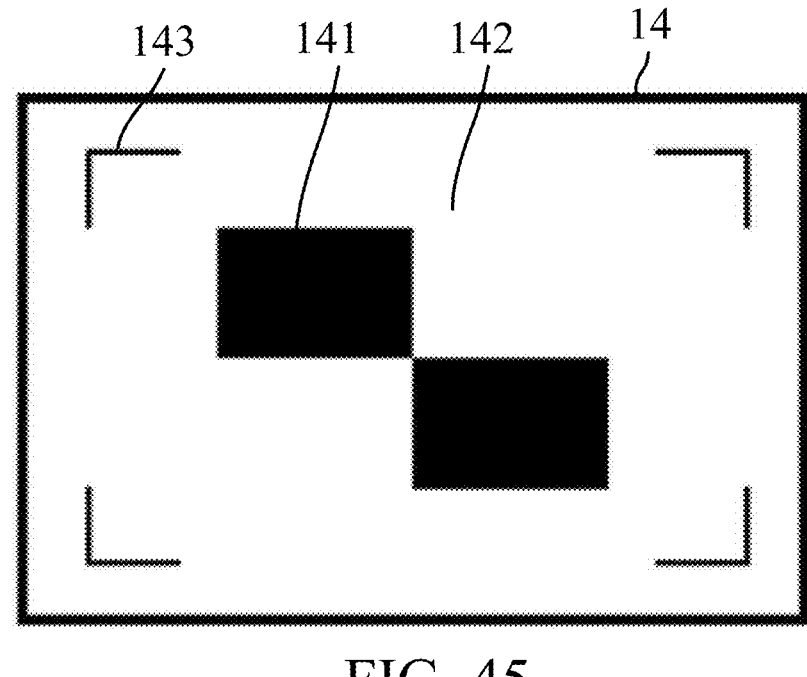

FIG. 45 is a plan view of a handheld blur measurement chart in the seventh embodiment.

Figure 46:
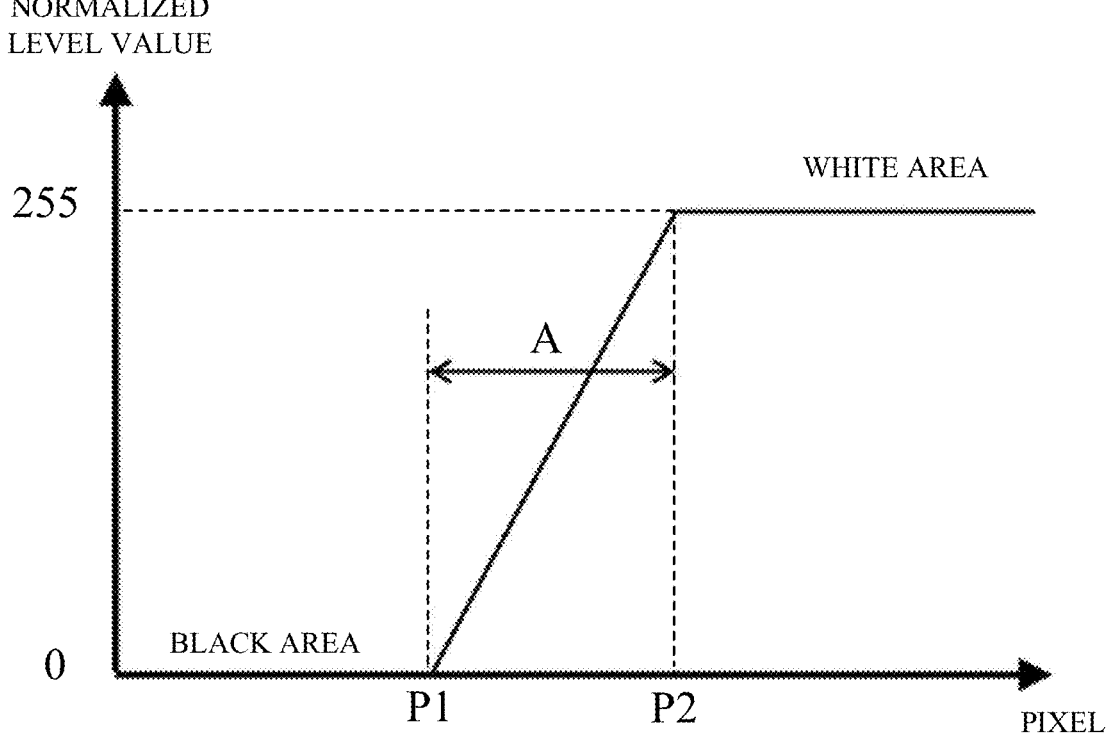

FIG. 46 explains an image degradation amount according to the seventh embodiment.

Figure 47A:
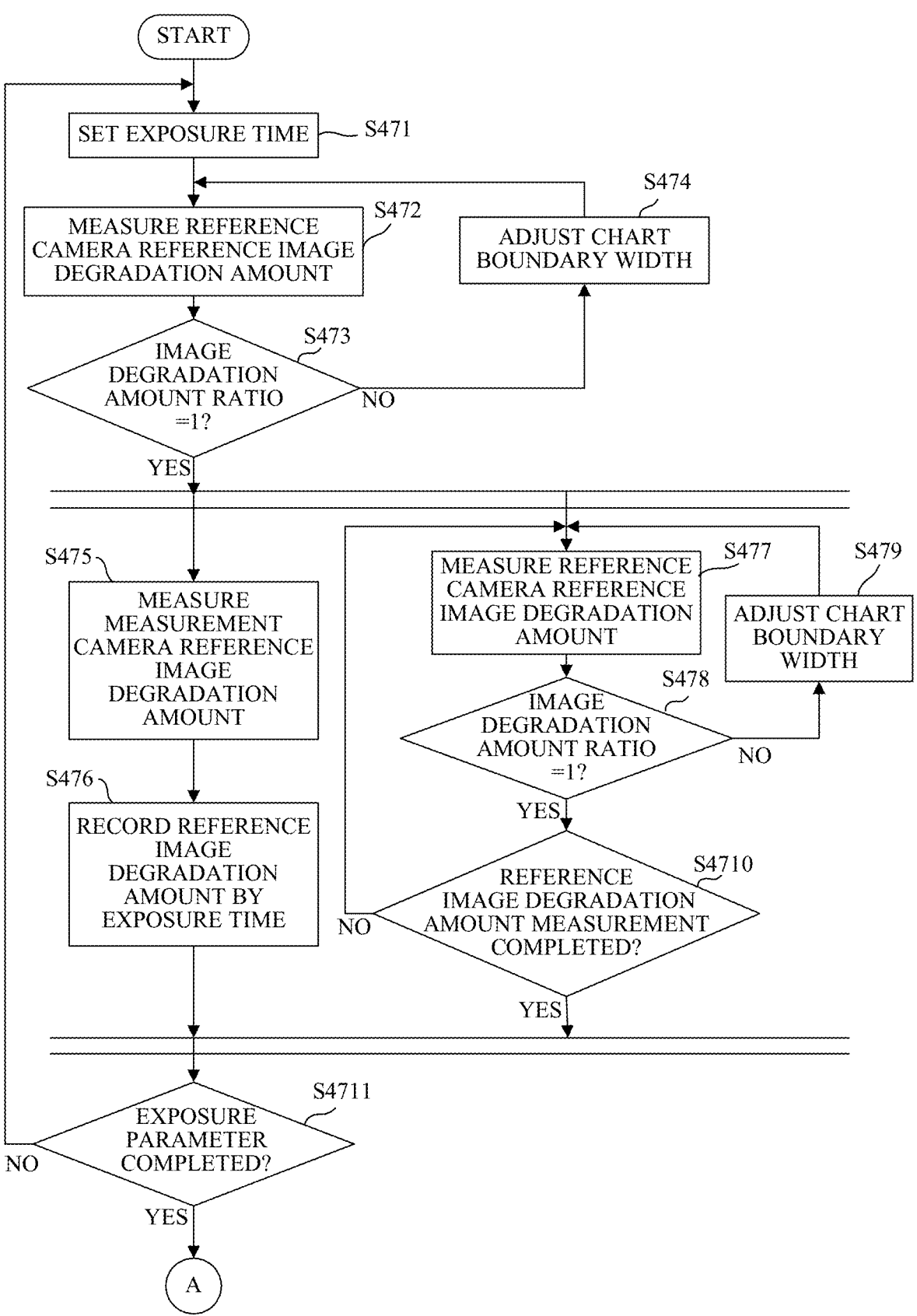
Figure 47B:
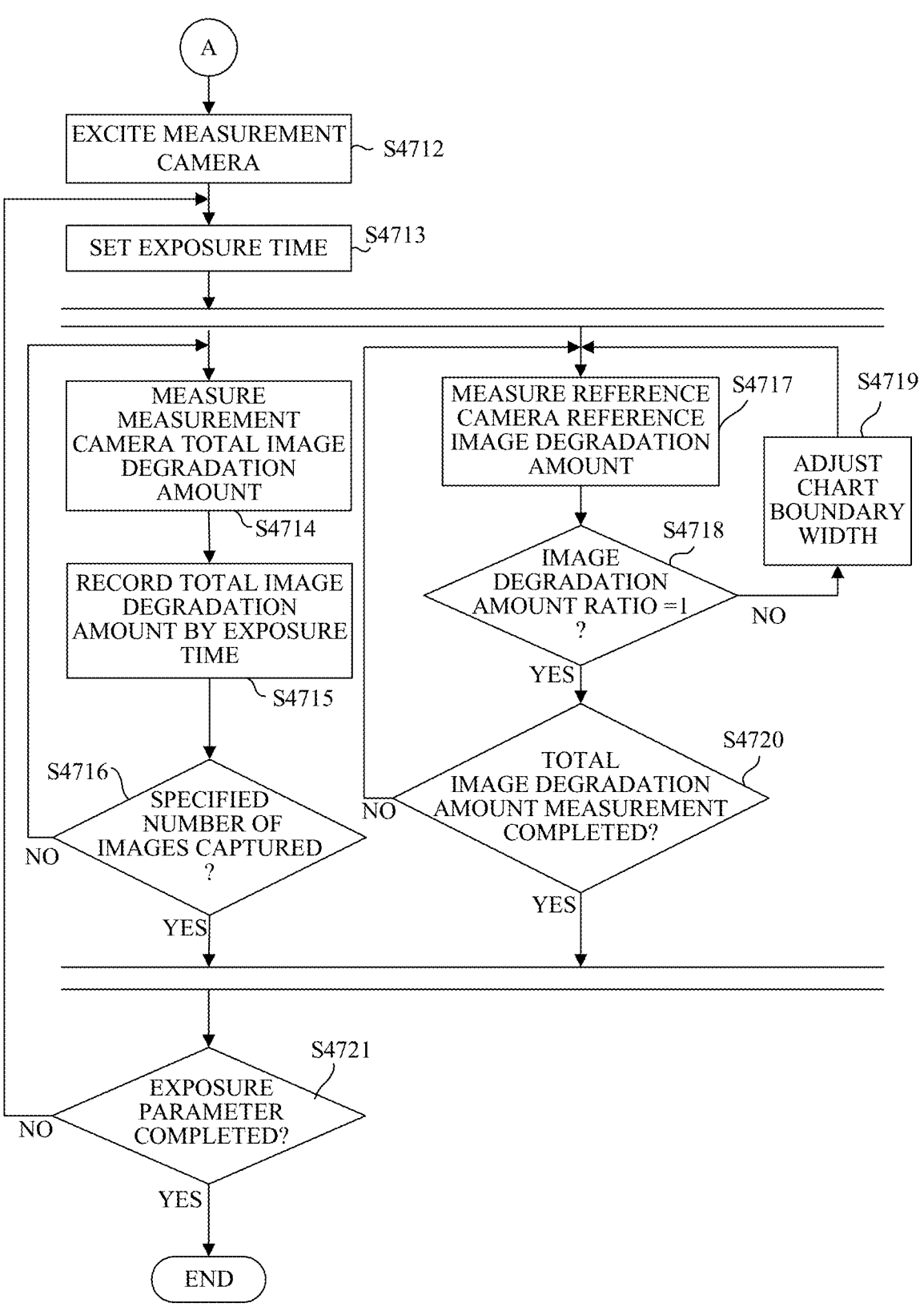

FIGS. 47A and 47B illustrate a flowchart of the handheld blur evaluating method in the seventh embodiment.

Figure 48A:
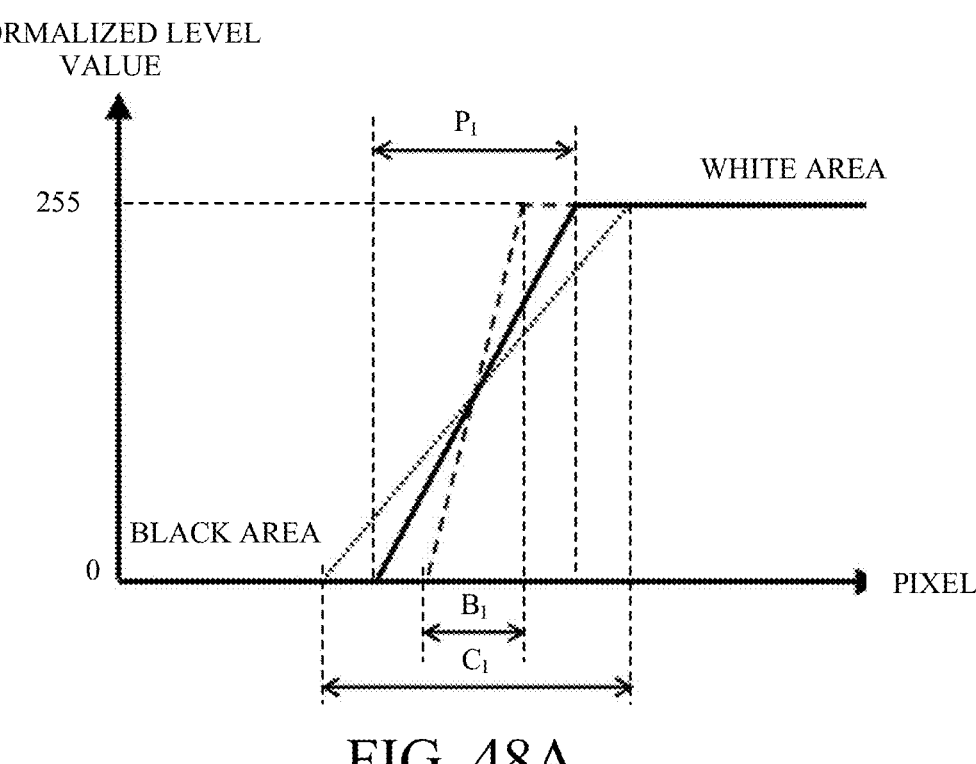
Figure 48B:
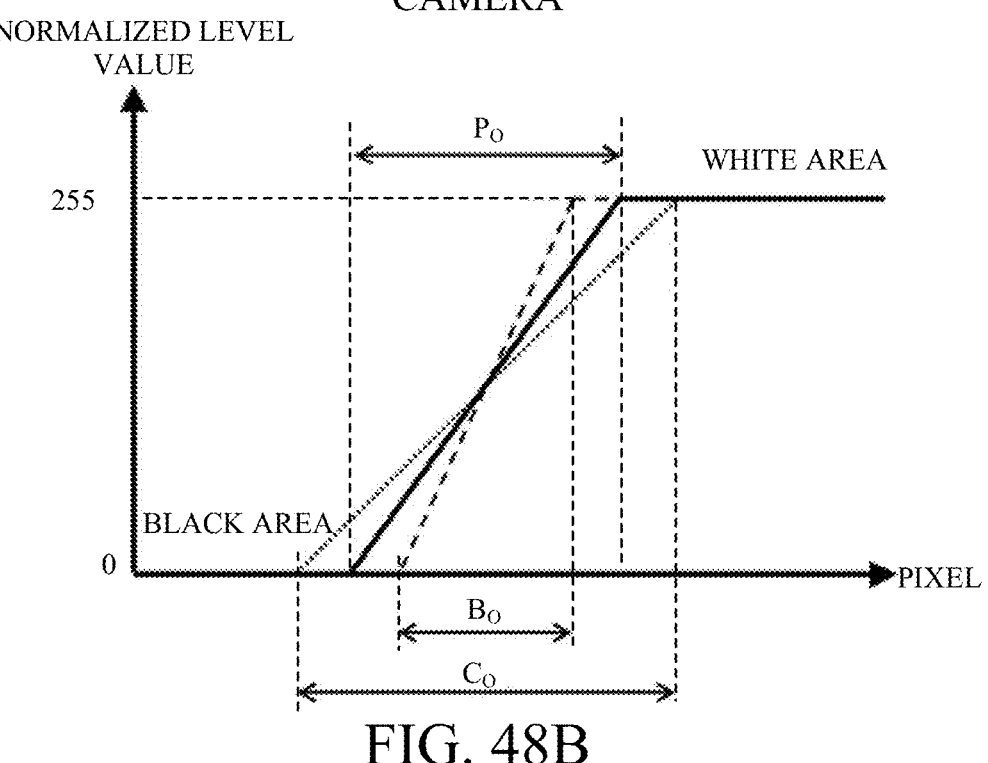

FIGS. 48A and 48B explain a relationship between a reference camera image and a chart image in the seventh embodiment.

Figure 49:
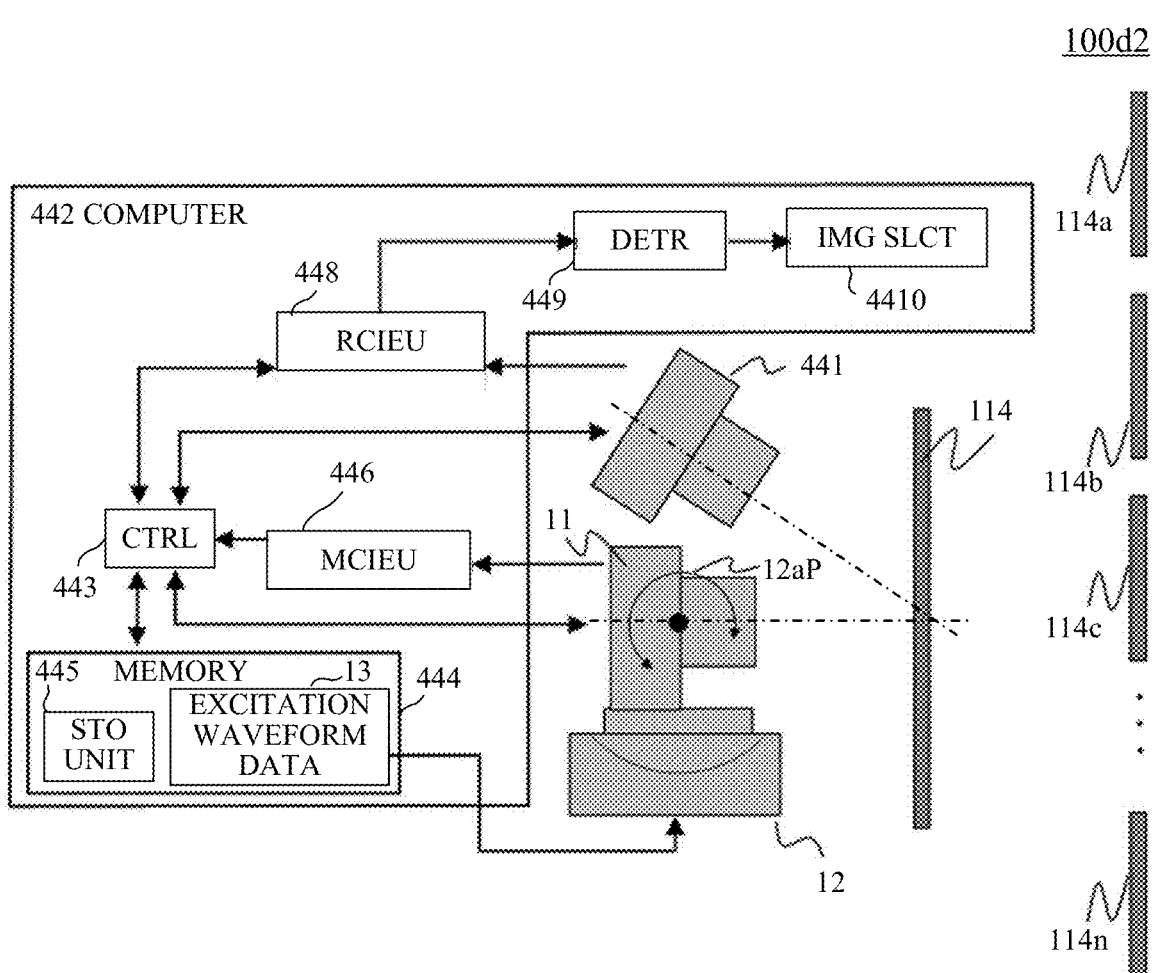

FIG. 49 is a schematic diagram of the handheld blur evaluating apparatus according to the seventh embodiment.

Figure 50A:
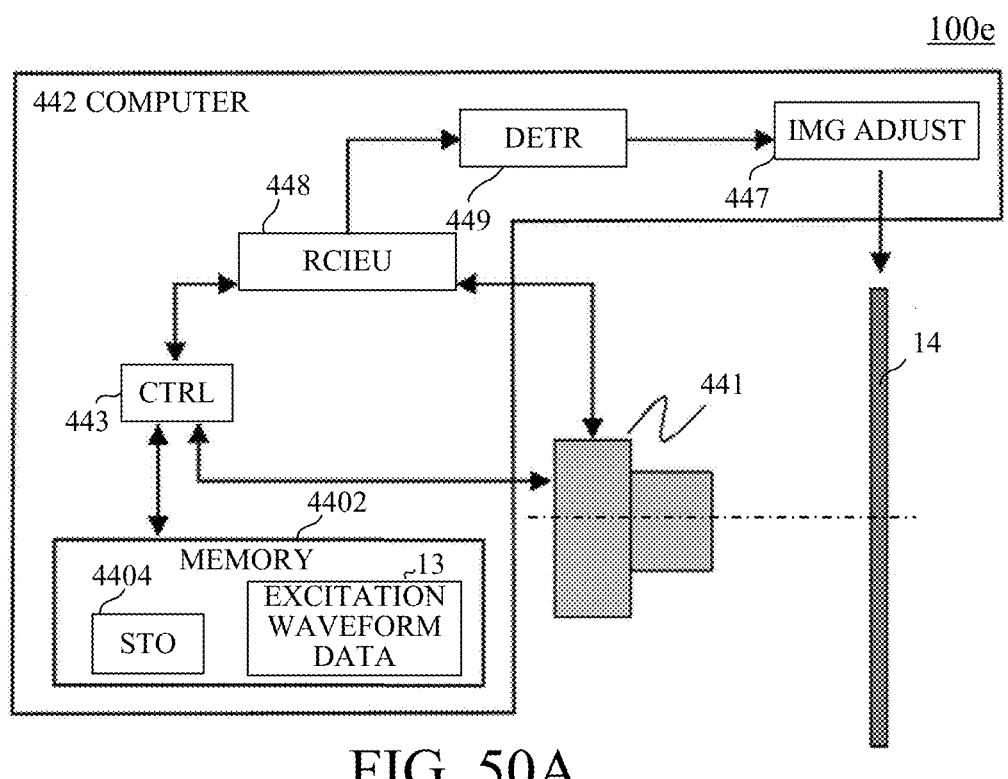
Figure 50B:
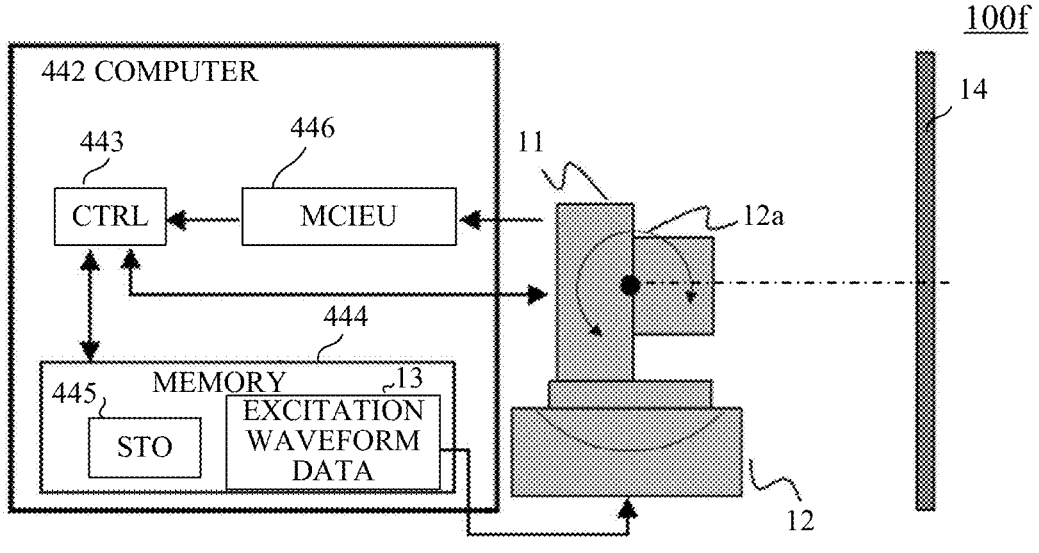

FIGS. 50A and 50B are schematic diagrams of a handheld blur evaluating apparatus according to an eighth embodiment.

Figure 51A:
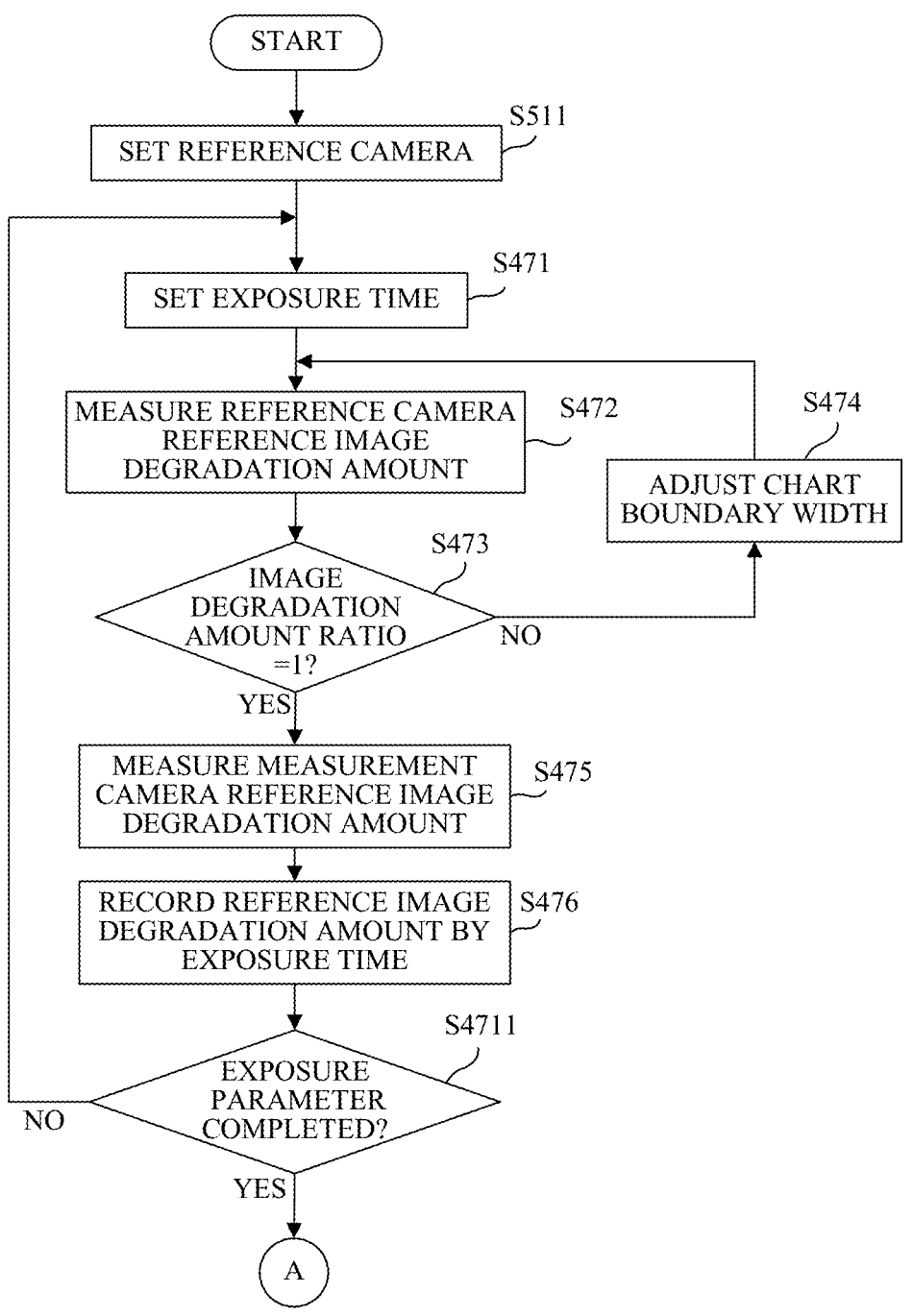
Figure 51B:
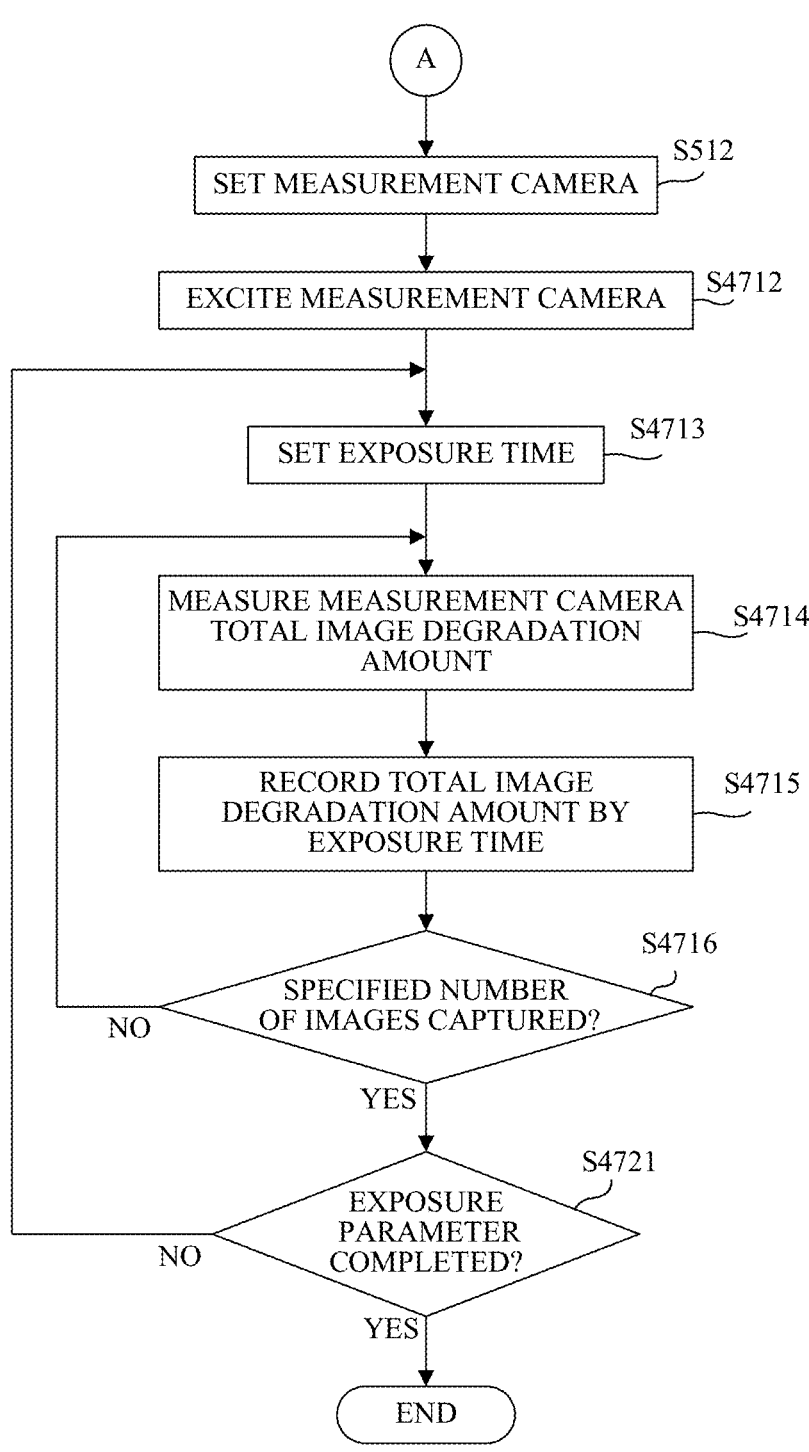

FIGS. 51A and 51B illustrate a flowchart of a handheld blur evaluating method according to the eighth embodiment.

Figure 52:
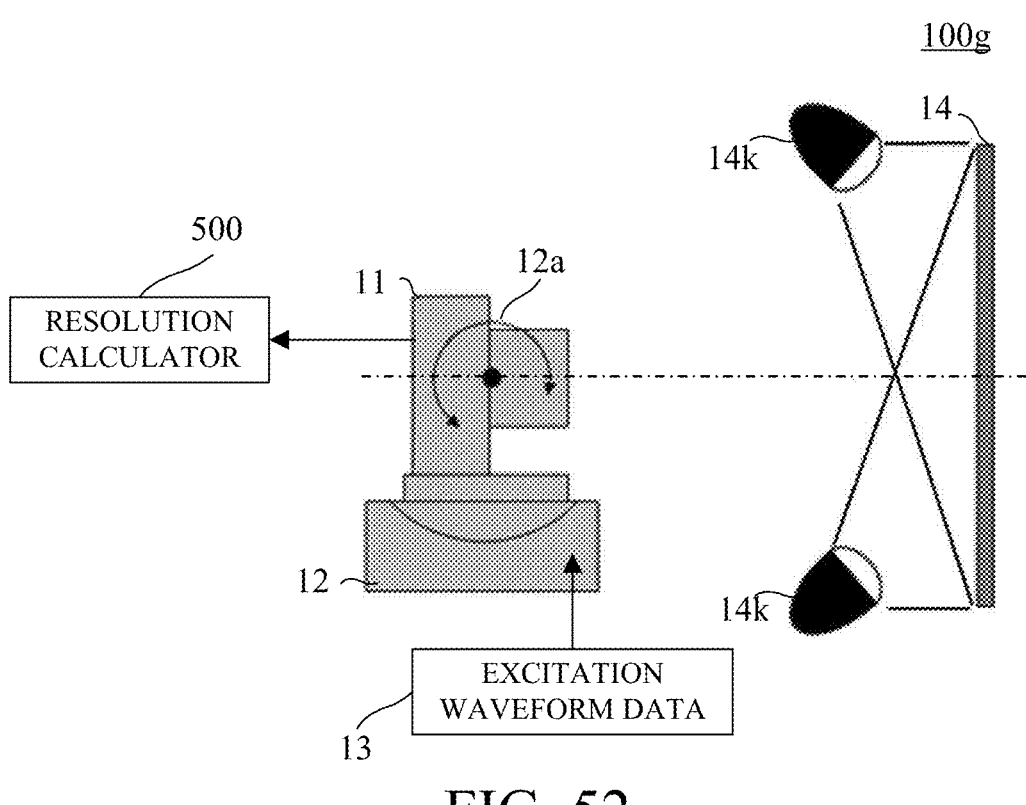

FIG. 52 is a schematic diagram of a handheld blur evaluating apparatus according to a ninth embodiment.

Figures 53A, 53B:
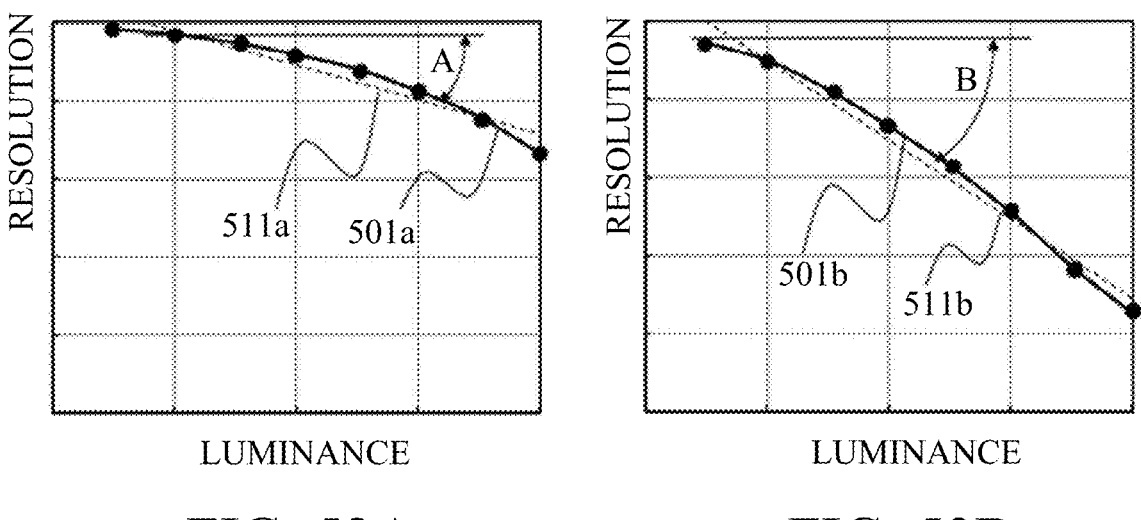

FIGS. 53A and 53B are explanatory diagrams of a handheld blur evaluating method according to the ninth embodiment.

FIGS. 54A and 54B explain the handheld blur evaluating method according to the ninth embodiment.

FIGS. 55A and 55B explain the handheld blur evaluating method according to the ninth embodiment.

Figures 56A, 56B:
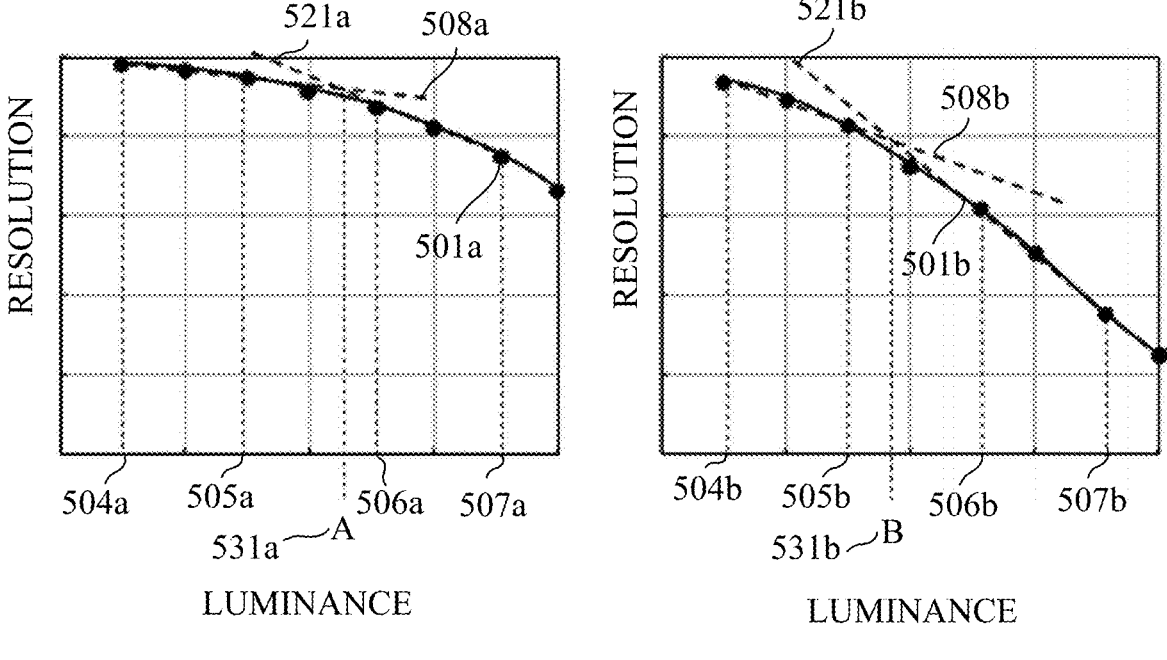

FIGS. 56A and 56B explain the handheld blur evaluating method according to the ninth embodiment.

FIGS. 57A, 57B, 57C, and 57D explain a method for determining data or a data range according to the ninth embodiment.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor)

components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

First Embodiment

Figures 1A, 1B, 1C:
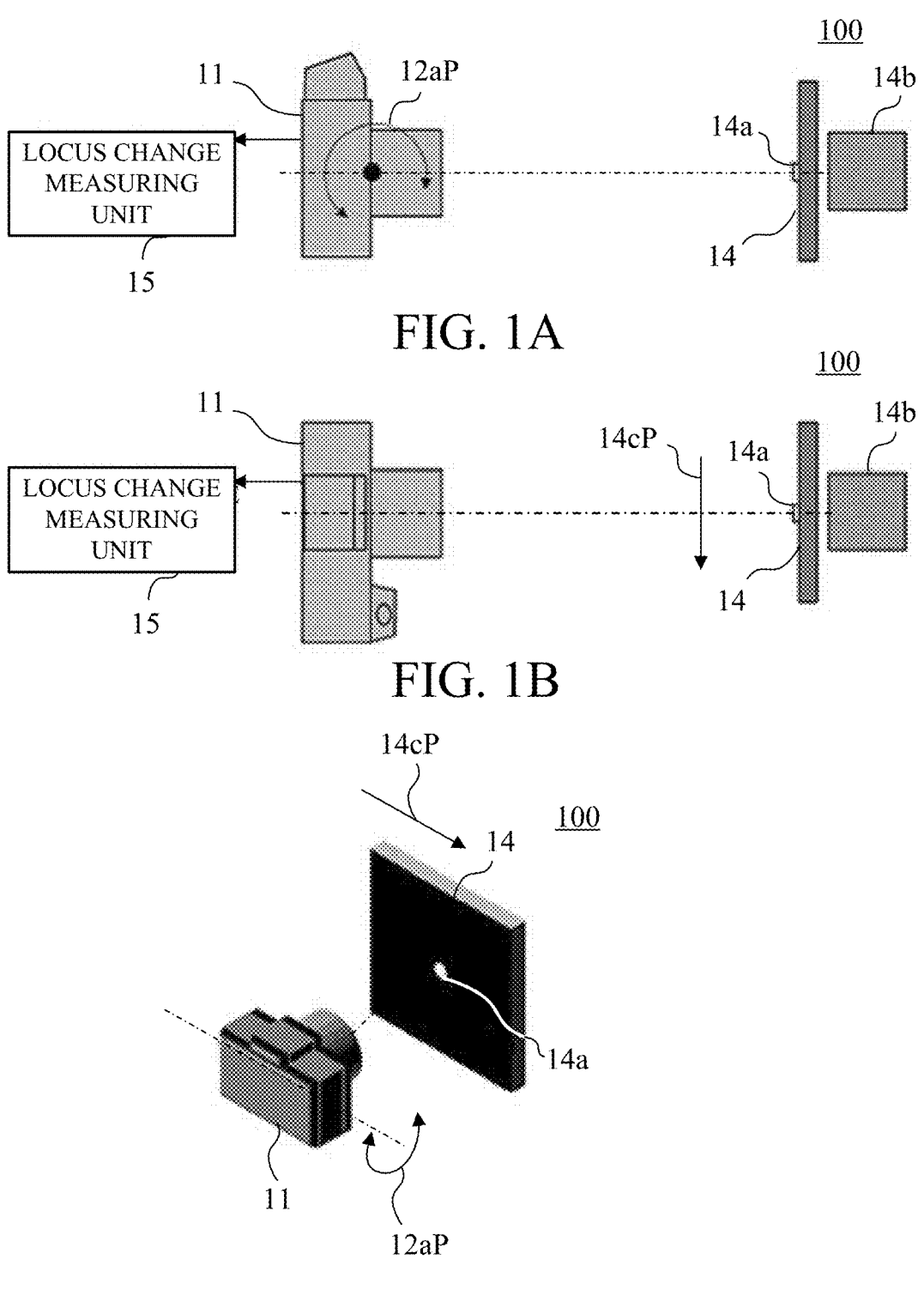
FIGS. 1A, 1B, and 1C schematically illustrate a handheld blur evaluating apparatus according to a first embodiment.

A description will now be given of a first embodiment according to the present disclosure. FIGS. 1A, 1B, and 1B are schematic diagrams of a handheld blur evaluating apparatus 100 that performs a handheld blur evaluating method according to this embodiment. FIG. 1A is a side view of the handheld blur evaluating apparatus 100. FIG. 1B is a top view of the handheld blur evaluating apparatus 100. FIG. 1C is a perspective view of the handheld blur evaluating apparatus 100. Reference numeral 11 denotes a measurement camera (imaging unit), which is held by a photographer. The measurement camera 11 faces a chart (object) 14. A chart image captured by the measurement camera 11 is input to a locus change measuring unit (LCMU) 15. The locus change measuring unit 15 detects the locus of the captured chart image and measures the deterioration degree of the captured image caused by the camera handheld blur of the photographer.

This embodiment has two characteristics. First, the chart 14 can be scanned in a direction of an arrow 14$c$P in FIG. 1B by an actuator (scanner) 14$b$. Second, the chart 14 includes a point object 14$a$, and the locus change measuring unit 15 calculates the center of gravity of the point image captured by the measurement camera 11 at each scanning position. Details of the above will be described below.

Figure 2:
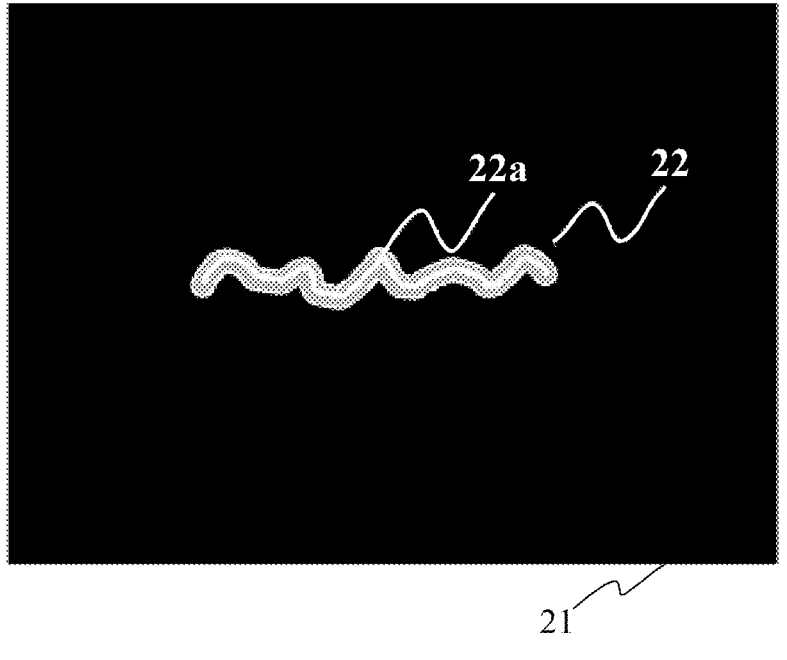
FIG. 2 illustrates a locus image in the first embodiment.

FIG. 2 is an image (locus image) captured by the measurement camera 11 in a state where camera handheld blur occurs. In FIG. 2, an image 21 illustrates a locus of a point image 22 resulting from scanning of the point object 14$a$ during imaging. Reference numeral 22$a$ denotes the locus of the center of gravity of the point image at each scanning position. The locus change measuring unit 15 calculates the projection of the image 22 in the horizontal direction and also calculates the center of gravity of the luminance at each horizontal position.

Figure 3:
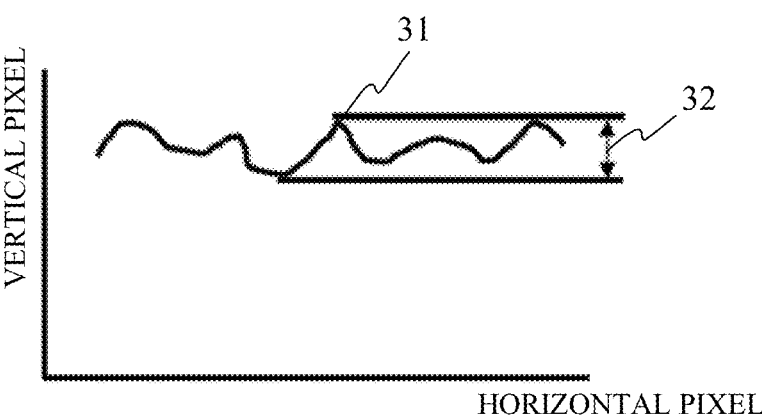
FIG. 3 is an extraction graph of a locus of a center of gravity of a point image in the first embodiment.

FIG. 3 is an extraction graph of the locus of the center of gravity of the point image binarized after the center of gravity of the image in FIG. 2 is obtained. In FIG. 3, a horizontal axis represents a horizontal pixel of an image sensor provided in the measurement camera 11, and a vertical axis represents a vertical pixel of the image sensor. A waveform 31 is a locus waveform obtained by connecting the positions of the centers of gravity of the vertical pixels of the point image in respective horizontal pixels. By measuring a vertical amplitude 32 of the waveform 31, the handheld blur in the vertical direction of the measurement camera 11 can be obtained.

FIG. 4 is a perspective view of the handheld blur evaluating apparatus 100. As illustrated in FIG. 4, the chart 14 can also be scanned in an arrow 14cY direction, and while the measurement camera 11 is imaging the chart 14, the chart 14 is scanned in the arrow 14cY direction. FIG. 5 illustrates a locus image at this time. In FIG. 5, an image 51 illustrates a locus of a point image 52 resulting from scanning of the point object 14a during imaging. Reference numeral 52a denotes a locus of the center of gravity of the point image at each scanning position. The locus change measuring unit 15 obtains the projection of the image 52 in the vertical direction and obtains the center of gravity of the luminance at each vertical position. FIG. 6 is an extraction graph of the locus of the center of gravity of the point image binarized after the center of gravity of the image in FIG. 5 is obtained. In FIG. 6, a horizontal axis represents a horizontal pixel of the image sensor provided in the measurement camera 11, and a vertical axis represents a vertical pixel of the image sensor. A waveform 61 is a locus waveform obtained by connecting the positions of the centers of gravity of the horizontal pixels of the point image in respective vertical pixels. By measuring a horizontal amplitude 62 of the waveform 61, the handheld blur in the horizontal direction of the measurement camera 11 can be obtained.

FIG. 7 is a side view of the handheld blur evaluating apparatus 100, and illustrates an example in which the measurement camera 11 is fixed onto a (vibration) excitation table ((vibration) excitation unit, vibration unit) 12 instead of being held by the photographer. Based on (vibration) excitation waveform data 13, the excitation table 12 excites (vibrates) the measurement camera 11 around an arrow 12aP and around an arrow 12aY orthogonal to the arrow 12aP. The chart 14 is scanned in the arrow 14cP direction and the arrow 14cY direction orthogonal to the arrow 14cP direction. The measurement camera 11 facing the chart 14 captures the chart 14 scanned during excitation by the excitation table 12. The chart image of the measurement camera 11 is input to the locus change measuring unit 15, which detects the locus of the captured chart image and measures the deterioration degree of the captured image due to the handheld blur when the excitation is made with the excitation waveform data 13.

The above example temporally shifts the imaging by the measurement camera 11 caused by the scanning in the arrow 14cP direction during the excitation in the arrow 12aP direction and the imaging by the measurement camera 11 caused by the scanning in the arrow 14cY direction during the excitation in the arrow 12aY direction. Therefore, the image 21 in FIG. 2 and the image 51 in FIG. 5 are different images. From the locus waveforms of the images 21 and 51, the handheld blur in the measurement camera due to the excitation in the arrow 12aP direction and the handheld blur in the measurement camera due to the excitation in the arrow 12aY direction are obtained. Here, the measurement camera 11 is excited in a direction (second direction) different from the arrows 14cP and 14cY, which are the scanning directions (first directions) of the chart 14. Therefore, the imaging by the measurement camera 11 caused by the scanning in the arrow 14cP direction during the excitation in the arrow 12aP direction and the imaging by the measurement camera 11 caused by the scanning in the arrow 14cY direction during the excitation in the arrow 12aY direction are simultaneously performed. Thereby, loci 82P and 82Y of the point image are recorded in a single image, as illustrated by an image 81 in FIG. 8 as locus images. From two images obtained by trimming the image 81 with frames 83P and 83Y, locus waveforms are created as illustrated in FIGS. 3 and 6, and a handheld blur amount can be calculated in each of the excitation directions 12aP and 12aY.

Referring now to FIGS. 9A, 9B, 9C, and 9D, a description will be given of a method for acquiring a handheld blur amount for each exposure time of the measurement camera 11 (handheld blur calculating method). FIGS. 9A, 9B, 9C, and 9D are graphs of the handheld blur calculating method. In each of FIGS. 9A, 9B, 9C, and 9D, a horizontal axis represents a horizontal pixel, and a vertical axis represents a vertical pixel.

Figures 9A, 9B, 9C, 9D:
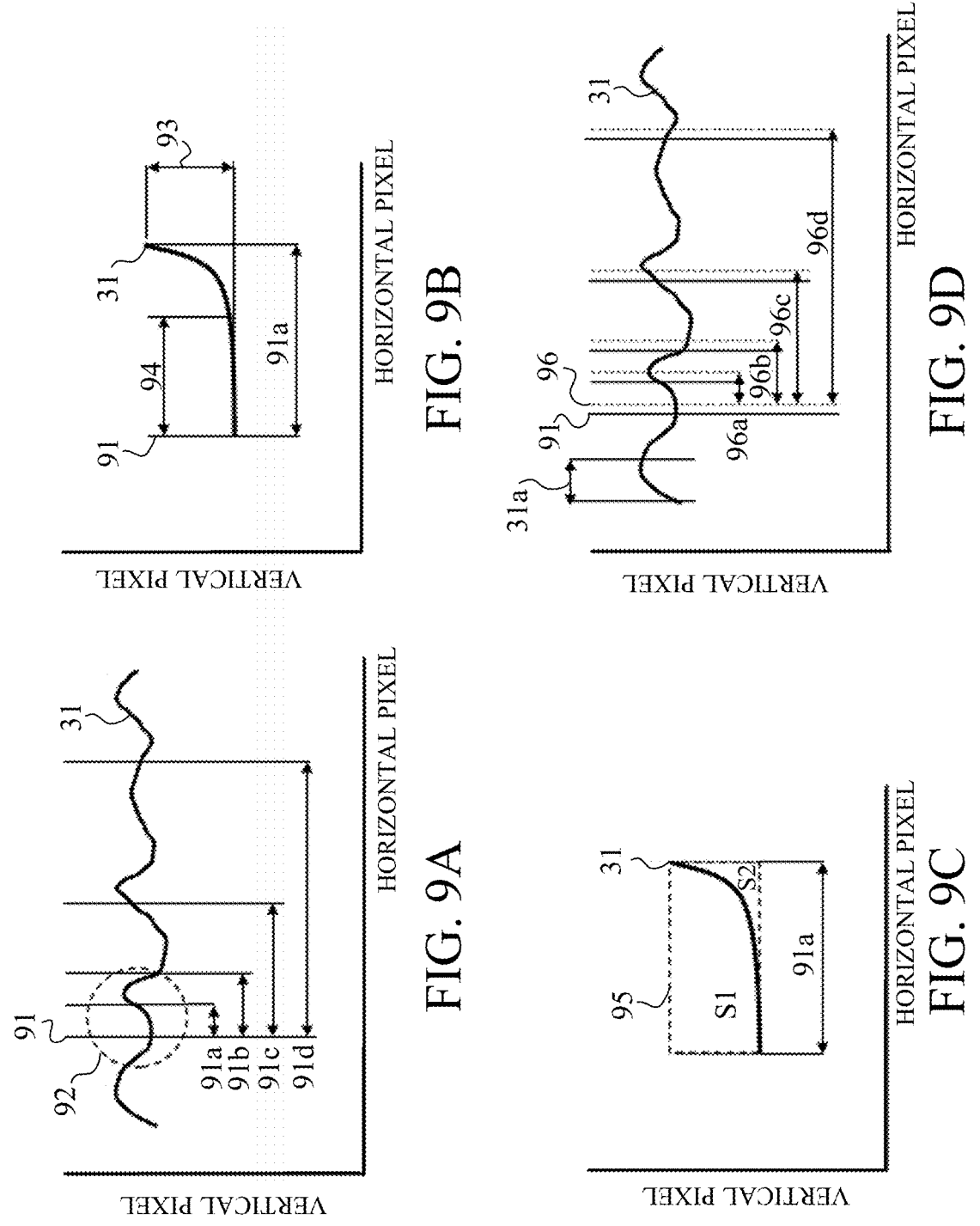

FIG. 9A is a graph illustrating the handheld blur calculating method in which the locus waveform 31 in FIG. 3 is divided into a plurality of calculation areas 91a to 91d by exposure time of the measurement camera 11. A description will now be given of a method of writing the exposure time together in FIG. 9A. A value obtained by multiplying the imaging magnification of the measurement camera 11 by the constant scanning speed of the chart 14 is the image plane speed on the image sensor of the measurement camera 11. By dividing this image plane speed by the pixel size of the image sensor, the number of moving pixels per time (pixel speed) can be obtained. Therefore, by multiplying the exposure time (for example, $\frac{1}{60}$ seconds) by the pixel speed, the number of moving pixels per exposure time can be obtained, so the number of pixels on the horizontal axis in FIG. 9A can be associated with the exposure time.

FIGS. 9B and 9C are enlarged views of the locus waveform 31 divided by the calculation area 91a enclosed by a circle 92 in FIG. 9A. In FIG. 9A, a plurality of calculation areas 91a (for example, $\frac{1}{60}$ seconds) to 91d (for example, $\frac{1}{8}$ seconds) are separated from a calculation starting point 91. As illustrated in FIG. 9B, a handheld blur amount is obtained by the number of pixels in a difference 93 between the maximum and minimum values of the locus waveform 31 at each exposure time (for example, the calculation area 91a). In another method, as illustrated in FIG. 9C, areas S1 and S2 where the locus waveform 31 divides a rectangle 95 enclosed by the maximum and minimum values of the locus waveform and the calculation area 91a are obtained, and a smaller one of the areas S1 and S2 is divided by the exposure time of the calculation area 91a to set the handheld blur amount. In FIG. 9B, a section 94 starting from the calculation starting point 91 is little handheld blurred, the image deterioration is little, and the handheld blur increases in a short time thereafter. In the case of such a handheld blur, a handheld blur amount corresponding to the difference 93 does not correctly represent the image deterioration caused by this handheld blur. On the other hand, the method described with reference to FIG. 9C can obtain the handheld blur that reflects the curve of the handheld blur during the exposure time.

In FIG. 9A, the handheld blur amount can be obtained in each of the divided calculation areas 91a to 91d at once. Prior art requires the measurement camera to capture images for respective exposure times, but the method according to this embodiment does not require such work. Calculation areas 96a to 96d are set from a calculation starting point 96 illustrated by a dashed line obtained by shifting the calculation starting point 91 illustrated by the solid line set in FIG. 9A to the right by one pixel (FIG. 9D) and the handheld blur amount is calculated for each set exposure time. A handheld blur amount can be stably obtained by averaging large handheld blur amount data obtained by sequentially shifting pixels in the section where the locus waveform 31 is continuous in the measurement of FIG. 9D. Prior art acquires a large number of images using the measurement camera 11 at each exposure time, and obtains a handheld blur amount by processing the obtained images, but this embodiment does not require such work.

Prior art proposes a method of obtaining a handheld blur amount from an image degradation amount in an image captured by the measurement camera. However, this method has difficulty in accurately separating image degradation in an image peculiar to the measurement camera 11 that is not being excited and image degradation in an image due to handheld blur in the measurement camera 11 that is being excited. On the other hand, as described with reference to FIGS. 9A, 9B, 9C, and 9D, this embodiment can obtain an accurate handheld blur amount directly from the locus waveform of the center of gravity of the point image.

FIG. 10 is a flowchart of a simple measuring method for imaging the chart 14 using the measurement camera 11. First, in step S1001, the exposure time is set for the measurement camera 11. In measuring the handheld blur amount from exposure time of 1/60 seconds to exposure time of 2 seconds, the exposure time is set to 4 seconds, which is double the maximum exposure time of 2 seconds. The brightness of the point object 14a in the chart 14 is adjusted by adjusting the illumination for proper exposure with the set exposure time, F-number, and ISO speed, or by attaching an ND filter to the imaging system of the measurement camera 11.

Next, in step S1002, the image stabilizing function of the measurement camera 11 is turned on. As described below, this embodiment does not require handheld blur amount measurement in a case where the image stabilizing function is turned off. Next, in step S1003, the excitation table 12 is operated to start exciting the measurement camera 11 in the 12aP and 12aY directions. Next, in step S1004, the chart 14 is scanned in the 14cP and 14cY directions. Next, in step S1005, imaging is started with the measurement camera 11 that is being excited. Next step S1006 is repeated until the imaging for four seconds, for example, is completed. After the imaging ends, this flow ends. Thereby, an image illustrated in FIG. 8 can be acquired.

FIG. 11 is a flowchart of a handheld blur calculating method configured to calculate the handheld blur in the measurement camera 11 from the image obtained in the measurement flow of FIG. 10. Each step in FIG. 11 is mainly executed by the locus change measuring unit 15.

First, in step S1101, the image 81 in FIG. 8 is taken in. Next, in step S1102, the image 81 is trimmed with frames 83P and 83Y. Next, in step S1103, the positions of the centers of gravity of the point images in the images of the frames 83P and 83Y are obtained, the locus waveforms 31 and 61 illustrated in FIGS. 3 and 6 are extracted, and the locus waveforms P and Y are set.

Next, in step S1104, the calculation starting point 91 of the handheld blur amount illustrated in FIG. 9A is set. Next, in step S1105, a calculation area for the handheld blur amount is set. More specifically, for the locus waveforms P and Y, as illustrated in FIG. 9A, the section of the first calculation area 91a is set. Next, in step S1106, the handheld blur amounts of the locus waveforms P and Y in the set calculation area are obtained using the method illustrated in FIG. 9C. Next, in step S1107, the mean square of the handheld blur amounts P and Y is calculated and a handheld blur amount PY is calculated and recorded.

Next, in step S1108, it is determined whether or not the handheld blur amount calculation for the set calculation areas has been completed. In a case where the handheld blur amount calculation has not yet been completed, the flow returns to step S1105 to set the next section (for example, the second calculation area 91b in FIG. 9A), and to record the handheld blur amount PY in that calculation area in step S1107. After the handheld blur amounts PY of all calculation areas 91a to 91d (exposure times) in FIG. 9A are recorded, the flow proceeds to step S1109.

In step S1109, the next calculation starting point is set. That is, the calculation starting point 96 in FIG. 9D is set. Next, in step S1110, it is determined whether or not the handheld blur amount PY of each of all calculation areas at the set calculation starting point has been completely calculated. In a case where there is an uncalculated starting point, the flow returns to step S1105 to continue the handheld blur amount calculation. In a case where the calculation of the handheld blur amount PY of each calculation area at all calculation starting points is completed, the flow proceeds to step S1111. In step S1111, an average handheld blur amount PY is obtained by averaging the recorded handheld blur amounts PY for respective calculation starting points by divided calculation area.

FIG. 12 is an image stabilizing performance evaluation graph illustrating the average handheld blur amount PY obtained by the above handheld blur calculation. In FIG. 12, a horizontal axis represents exposure time and, for example, the calculation areas 91a to 91d of the exposure times in FIG. 9A are arranged in order corresponding to the exposure time. On the horizontal axis, the exposure time increases toward the right. A vertical axis represents the average handheld blur amount PY. A solid curve 1201 illustrates the average handheld blur amount PY curve obtained by the flow of FIG. 11, and a residue amount of the image stabilization in a case where the image stabilizing function of the measurement camera 11 is turned on. A broken curve 1202 illustrates a handheld blur amount in a case where the image stabilizing function is turned off. The curve 1202 is not the result obtained from the measurement camera 11 but a theoretical curve obtained by plotting theoretically obtained numerical values. The reason why the theoretical curve can be used will be described below.

As mentioned above, the handheld blur amount can be obtained using the locus waveform of the center of gravity of the point image. Thus, the optical performance and image processing peculiar to each model of the camera do not affect the handheld blur amount, and the image stabilizing performance can be exclusively evaluated. In a case where the image stabilizing function is turned off, the handheld blur amount based on the excitation waveform data 13 of the excitation table 12 can be obtained for any camera and it is unnecessary to measure the handheld blur amount for each camera in a case where the image stabilizing function is turned off. The theoretical curve 1202 is obtained in accordance with the following items (1) to (5) similarly to steps S1104 and subsequent steps in FIG. 11.

(1) By multiplying the excitation waveform data 13, which is angular data around 12aP and 12aY in FIG. 7, by the focal length of the measurement camera, locus waveforms 1301P and 1301Y illustrating the handheld blur amounts on the image plane can be determined. A graph of the handheld blur calculating method in a case where the image stabilizing function is turned off in FIG. 13 illustrates only the locus waveform 1301P.

(2) A calculation starting point 1302 is set, and handheld blur amounts P and Y in calculation areas 1302a to 1302d from the calculation starting point 1302 are obtained from the locus waveforms 1301P and 1301Y, respectively.

(3) A handheld blur amount PY is obtained by calculating the mean square of the handheld blur amounts P and Y.

(4) By shifting the calculation starting point, the handheld blur amount in each of the calculation areas 1302a to 1302d is obtained from the locus waveforms 1301P and 1301Y.

(5) By averaging the handheld blur amounts PY for respective calculation starting points by calculation area, the average handheld blur amount PY is calculated.

Exposure times A and B are read from the graph, which are intersections between the theoretical curve 1202 of FIG. 12 obtained by the above calculation and a predetermined permissible handheld blur amount threshold 1203 and between the average handheld blur amount PY curve 1201 obtained where the image stabilizing function is turned on and the predetermined permissible handheld blur amount threshold 1203. The longer a distance 1204 between the exposure times A and B becomes, the higher the image stabilizing performance becomes.

A description will now be given of a function that improves the measurement accuracy. In a case where a positional relationship shifts between the positions of the loci 82P and 82Y of the point image illustrated in FIG. 8 and the frames 83P and 83Y, the point image cannot be accurately trimmed. In addition, the locus shape of the point image obtained in a case where the loci 82P and 82Y of the point image are projected at the central portion of the image 81, and the locus shape of the point image obtained in a case where the loci 82P and 82Y of the point image are projected at the peripheral portion of the image 81 may be different due to the optical distortion. Thus, this embodiment has a function for always projecting the loci 82P and 82Y of the point image at the same position on the image 81.

FIGS. 14A and 14B explain object scanning control. In FIG. 14A, a release signal as an imaging start signal of the measurement camera 11 is input to a scanning command unit 1401 serving as a measurement synchronizer. The scanning command unit 1401 receives the release signal and instructs the actuator 14b to scan the chart 14. Synchronizing the imaging start timing and the chart scanning timing in this manner can always keep constant the positional relationship between the loci 82P and 82Y of the point image and the image 81. Since constant-speed scanning is not performed for a while after the scanning of the chart 14 starts, the correct exposure time cannot be set in that section. Accordingly, the calculation starting point 91 illustrated in FIG. 9D is set within the constant-speed scanning section, and the handheld blur amount is not calculated for the locus waveform 31a during scanning acceleration.

In FIG. 14B, a position detector 1402 for detecting a scanning position of the chart 14 is provided. The position detector 1402 serves as a measurement synchronizer, and sends to the measurement camera 11 the position at which the chart 14 is scanned at a constant speed. The measurement camera 11 performs imaging at the timing output from the position detector 1402. Even such a configuration can always keep constant the positional relationship between the image 81 and the loci 82P and 82Y of the point image. Since the chart is not imaged during scanning acceleration, the calculation starting point 91 can be set at the start point of the locus waveform 31, and the calculated handheld blur amount can be increased. Thus, calculating the handheld blur amount using the locus waveform obtained from the center of gravity in the locus of the point image enables the handheld blur of the camera to be more accurately evaluated and the measurement time to be significantly reduced.

Thus, the handheld blur evaluating apparatus 100 according to this embodiment includes a scanner (actuator 14b) configured to scan an object (chart 14) as a point object 14a, and an imaging unit (measurement camera 11) configured to image the object that is being scanned. The handheld blur evaluating apparatus 100 further includes a (vibration) excitation unit (excitation table 12) configured to excite the imaging unit in a direction (second direction, i.e., excitation direction) different from the scanning direction (first direction) of the object. The handheld blur evaluating apparatus 100 further includes a locus change measuring unit 15 configured to measure the handheld blur of the imaging unit based on the locus change (loci 22 and 52 of the point image) relating to the excitation direction of the object image captured by the imaging unit. The handheld blur evaluating apparatus 100 evaluates the handheld blur of the imaging unit based on the output of the locus change measuring unit 15. More specifically, the locus change measuring unit 15 obtains the locus waveforms 31 and 61 from the locus of the center of gravity of the point image of the object image (step S1103 in FIG. 11), and obtains the handheld blur amount from the obtained locus waveform.

The locus change measuring unit 15 divides the locus waveforms 31 and 61 into a plurality of calculation areas, and obtains the handheld blur amount for each of the plurality of calculation areas (91a to 91d). The locus change measuring unit 15 obtains the sections of the plurality of calculation areas from the exposure time of the imaging unit (measurement camera 11). The locus change measuring unit 15 moves the plurality of calculation areas (shifts the calculation starting point 91) and obtains the handheld blur amount in each movement area. The handheld blur evaluating apparatus 100 includes a measurement synchronizer (scanning command unit 1401, position detector 1402) configured to synchronize the imaging by the imaging unit (measuring camera 11) and the scanning by the scanner (actuator 14b). The measurement synchronizer (scanning command unit 1401) controls the scanner (actuator 14b) based on the imaging timing of the imaging unit (measurement camera 11). The measurement synchronizer (position detector 1402) controls the imaging of the imaging unit (measurement camera 11) in synchronization with the position of the object (chart 14) scanned by the scanner (actuator 14b).

Second Embodiment

A description will now be given of a second embodiment according to the present disclosure. FIG. 15 is a side view of a handheld blur evaluating apparatus 100a that performs a camera handheld blur amount measuring method according to this embodiment. The handheld blur evaluating apparatus 100a is different from the handheld blur evaluating apparatus 100 of the first embodiment that has the point object 14a in that the handheld blur evaluating apparatus 100a includes a collimated light source 1501a and a point light source 1501b. The chart 14 is rotationally scanned in arrows 1502P and 1502Y directions around a virtual axis 1503, which is a principal point position or an aperture stop position of the measurement camera 11.

A description will now be given of the reason for using the collimated light source 1501a and the point light source 1501b instead of the chart 14. FIGS. 16A and 16B explain the collimated light source. FIG. 16A is a sectional view of the collimated light source 1502a that includes a lens barrel 1601, a lens 1602 fixed to the lens barrel 1601, and a light source 1603 disposed at a focal length position of the lens 1602. Since the light source is provided at the focal length position of the lens, a light beam (luminous flux) emitted from the light source passes through the lens 1602 and becomes parallel light (collimated light). Since the parallel light is an object light source at the infinity position, the imaging magnification of the measurement camera 11 becomes extremely small.

The handheld blur applied to the camera includes rotational handheld blur 1701 and shift handheld blur 1702 illustrated in FIG. 17, and the handheld blur of the imaging plane caused by the shift handheld blur 1702 is negligible in a case where the imaging magnification of the measurement camera 11 is small. Therefore, using the collimated light source 1502a can measure only the handheld blur amount caused by the rotational handheld blur. As illustrated in FIG. 16B, the point light source 1501b has a configuration in which the lens 1602 in FIG. 16A is removed. The handheld blur amount is measured as a mixture of the shift handheld blur and rotational handheld blur according to the imaging magnification of the measurement camera 11 relative to the point light source 1502b. Only the handheld blur amount caused by the shift handheld blur can be obtained from a difference between the locus waveform obtained from the collimated light source 1502a and the locus waveform obtained from the point light source 1502b. Thus, the handheld blur amount caused by the rotation handheld blur and the handheld blur amount caused by the shift handheld blur can be separated, and the image stabilizing performance for each handheld blur can be evaluated.

A description will now be given of the reason why the chart 14 is rotationally scanned around the virtual axis 1503 in the arrows 1502P and 1502Y directions unlike the first embodiment. The collimated light source 1502a is the object light source at infinity position and does not change the light source position on the imaging plane in the measurement camera 11 even if linear scanning is performed as in the first embodiment, and a locus waveform cannot be obtained. The locus waveform can be obtained by rotationally scanning the collimated light source 1502a. However, in a case where rotational scanning is performed around the position 1801 of the collimated light source, the emitted light source causes optical shielding as illustrated in FIG. 18A, and the locus waveform having a sufficient length cannot be obtained on the image plane 11a. On the other hand, as illustrated in FIG. 18B, in a case where the collimated light source 1502a is rotationally scanned about the virtual axis 1503, the shielding influence can be reduced, and the locus waveform having a sufficient length can be obtained on the image plane 11a. Since the point light source 1502b can obtain a locus waveform having a sufficient length on the image plane for both linear scanning and rotational scanning, the point light source 1502b may be integrated with the collimated light source 1502a to perform rotational scanning.

This embodiment performs rotational scanning about the virtual axis 1503 by linearly scanning and rotationally scanning the collimated light source. FIG. 19 explains object scanning control, and simply illustrates the configuration. A linear scanning actuator as a linear scanner 1902 scans a linear scanning table 1901 in an arrow 1901a direction. A rotational scanning table 1903 provided on the linear scanning table 1901 is rotationally scanned on the linear scanning table 1901 in an arrow 1903a direction about an axis 1903b by a rotational scanning actuator as a rotary scanner 1904. The cooperation of the linear scanning and rotational scanning causes the collimated light source 1502a to be scanned to 1502a' illustrated by a dotted line. This is approximately equivalent to rotationally scanning (arrow 1905) the collimated light source 1502a around the virtual axis 1503. More precisely, a distance between the collimated light source 1502a and the measurement camera 11 slightly changes (by a gap 1906) along with the rotational scanning, but the distance change does not matter because of the infinity light source.

The position detector 1402 continuously detects the position of the linear scanning table 1901, and controls the imaging timing of the measurement camera 11 similarly to FIG. 14. A rotation control unit 1904a is provided for controlling a rotation angle of the rotational scanning table 1903 by the rotary scanner 1904 based on a position detection output of the position detector 1402. Hence, the position of the virtual axis (rotation axis) 1503 can be changed by adjusting a relationship between the output of the position detector 1402 and the rotational scanning amount of the rotary scanner 1904 through the rotation control unit 1904a. The position of the linear scanning table 1901 in an arrow 1907 direction can be changed. By adjusting the positions of the rotation control unit 1904a and the arrow 1907, the collimated light source 1502a can be optimally rotationally scanned according to the optical characteristic of the measurement camera 11. For example, a wide lens with a short focal length can reduce the radius of rotation for rotational scanning, and a telephoto lens with a long focal length can increase the radius of rotation for rotational scanning.

FIG. 20 is an object layout diagram of the chart 14 in FIG. 15 viewed from the measurement camera 11 side. On the chart 14, collimated light sources 1502aP and 1502aY and point light sources 1502bP and 1502bY are provided. The collimated light source 1502aP and the point light source 1502bP are integrally rotationally scanned in an arrow 2001P direction (where the arrow becomes a straight line in the direction of FIG. 20). The collimated light source 1502aY and the point light source 1502bY are integrally rotationally scanned in the arrow 2001Y direction (where the arrow becomes a straight line in the direction of FIG. 20).

FIG. 21 illustrates locus images of the point images of the collimated light sources and the point light sources in FIG. 20 captured by the measurement camera 11. An image 2101 has a point image locus 2102aP of the collimated light source 1502aP, a point image locus 2102bP of the point light source 1502bP, a point image locus 2102aY of the collimated light source 1502aY, and a point image locus 2102bY of the point light source 1502bY. Each point image locus is trimmed similarly to FIG. 8, and the average handheld blur amount PY can be obtained similarly to the first embodiment.

FIG. 22, similarly to FIG. 12, illustrates an image stabilizing performance evaluation chart obtained in this embodiment, and illustrates the average handheld blur amount PY. A solid curve 2201a is the average handheld blur amount PY curve obtained by the collimated light source 1502a, and the solid curve 2201b is an average handheld blur amount PY curve obtained by the point light source 1502b. Exposure times A, B, and C are read from the graph, which are intersections between the theoretical curve 1202 in a case where the image stabilizing function is turned off and the predetermined permissible handheld blur amount threshold 1203, between the average handheld blur amount PY curve 2201a in a case where the image stabilizing function is turned on and the predetermined permissible handheld blur amount threshold 1203, and between the average handheld blur amount PY curve 2201b in a case where the image stabilizing function is turned on and the predetermined permissible handheld blur amount threshold 1203. The image stabilizing performance without shift handheld blur can be evaluated based on a distance between the exposure times A and B, and the image stabilizing performance evaluation with the shift handheld blur can be evaluated based on a distance between the exposure times A and C.

This embodiment has described camera handheld blur evaluation (evaluation of image stabilizing performance)

using an example in which the measurement camera 11 is excited by the excitation table 12, but is not limited to the excitation table 12 and the photographer may grip the measurement camera 11 and evaluate the image stabilizing performance through his manual handheld blur. In this case, the theoretical curve 1202 may be used for a state in which the image stabilizing function is turned off, or the photographer may create a measurement curve in which the image stabilizing function of the measurement camera 11 is turned off. The camera handheld blur may be more accurately evaluated and the measurement time can be significantly reduced by obtaining the handheld blur amount using the locus waveform obtained from the locus of the center of gravity of the point image. A handheld blur amount caused only by the angular handheld blur can be accurately obtained by using a collimated light source as a point object.

As described above, the handheld blur evaluating apparatus 100*a* according to this embodiment includes a scanner (actuator 14*b*) configured to scan an object (chart 14) as a point object 14*a*, and an imaging unit (measurement camera 11) configured to image the object that is being scanned. The handheld blur evaluating apparatus 100*a* includes a (vibration) excitation unit (excitation table 12) configured to excite the imaging unit in a direction different from the scanning direction of the object. The handheld blur evaluating apparatus 100*a* further includes a locus change measuring unit 15 configured to measure the handheld blur of the imaging unit based on the locus change in the object image captured by the imaging unit (point image loci 2102*a*P, 2102*b*P, 2102*a*Y, and 2102*b*Y). The handheld blur evaluating apparatus 100*a* evaluates the handheld blur of the imaging unit based on the output of the locus change measuring unit 15. More specifically, the object (chart 14) is a collimated light source, and the locus change measuring unit 15 obtains the handheld blur amount from the locus waveform obtained from the locus of the center of gravity of the object image. The scanner (linear scanner 1902 and rotary scanner 1904) rotationally scans the object (chart 14) with the imaging unit about the virtual axis (central axis) 1503. The handheld blur evaluating apparatus 100*a* further includes the rotation control unit 1904*a* configured to change the radius of rotation of the scanner.

Third Embodiment

A description will now be given of a third embodiment according to the present disclosure. FIG. 23 is a perspective view of a handheld blur evaluating apparatus 100*b* according to this embodiment. As described with reference to FIG. 7, the first embodiment includes the chart 14 that has a point object scanned in the arrow 14*c*P direction and a point object scanned in the arrow 14*c*Y direction, and calculates a handheld blur amount from the loci. On the other hand, this embodiment illustrated in FIG. 23 scans a point object 2301 in an arrow 2302 direction tilted by −45 degrees relative to the handheld blur direction generated by the excitation directions 12*a*P and 12*a*Y of the excitation table 12. The measurement camera 11 is excited based on the same excitation waveform data in the arrows 12*a*P and 12*a*Y directions according to the excitation table 12, so that the combined excitation is performed around an excitation axis (combined excitation axis) 12*a*PY.

Thus, orthogonally combining the scanning direction and the combined excitation axis can provide a locus image 2401 in FIG. 24 similarly to FIG. 3, and a locus waveform 2501*a* illustrated in FIG. 25A is obtained from the locus image. The coordinate transformation by 45° is performed for the locus waveform 2501*a* to provide a locus waveform 2501*b* illustrated in FIG. 25B. A handheld blur amount is obtained by the method described with reference to FIG. 9 from the obtained locus waveform 2501*b*. Since the locus waveform 2501*b* includes handheld blurs in the excitation directions 12*a*P and 12*a*Y of the excitation table 12 mixed as the excitation direction (excitation axis 12*a*PY), there is no need to take the mean square of the handheld blurs in the two directions unlike the first and second embodiments.

FIG. 26 is a flowchart of a handheld blur calculating method that is used by the locus change measuring unit 15 to calculate the handheld blur in the measurement camera 11 from the locus image 2401 in this embodiment. FIG. 26 illustrates a flow that omits the handheld blur calculation in two directions and the mean squares in FIG. 11. Hence, calculation processing can be simplified by scanning the point object in a direction different from the two handheld blur directions generated in the measurement camera 11 caused by the excitation of the excitation table 12.

As described above, the handheld blur evaluating apparatus 100*b* according to this embodiment includes the scanner (actuator 14*b*) configured to scan an object (chart 14) as the point object 14*a*, and the imaging unit (measurement camera 11) configured to image the object that is being scanned. The handheld blur evaluating apparatus 100*b* further includes the excitation unit (excitation table 12) configured to excite the imaging unit, and the locus change measuring unit 15 configured to measure the camera handheld blur based on the locus change in the object image (locus 2302 of the point image) captured by the imaging unit. The handheld blur evaluating apparatus 100*b* evaluates the handheld blur of the imaging unit based on the output of the locus change measuring unit 15. The scanner (actuator 14*b*) scans the object (chart 14) in a direction different from the plurality of excitation directions (12*a*P and 12*a*Y) of the excitation table 12. More specifically, the scanner (actuator 14*b*) scans the object (chart 14) in a direction orthogonal to the excitation axis 12*a*PY in the combined excitation direction (combined direction) of the plurality of excitation directions (12*a*P and 12*a*Y).

Fourth Embodiment

A description will be given of a fourth embodiment according to the present disclosure. FIG. 27 is a schematic diagram of a handheld blur evaluating apparatus 100*c* that performs a camera handheld blur amount measuring method according to this embodiment. In FIG. 27, reference numeral 11 denotes a measurement camera (imaging unit), which is installed on a (vibration) excitation table (excitation unit) 12. The excitation table 12 excites (vibrates) the measurement camera 11 about an arrow 12*a*P based on excitation waveform data 13. The excitation table 12 can be controlled to switch a driving state (that is, between an excitation state and a stationary (non-excitation) state). The measurement camera 11 faces a chart 14 as an object, and a chart image captured by the measurement camera 11 during excitation by the excitation table is input to an image evaluating unit 271. The image evaluating unit 271 detects the contrast of the captured chart image and measures the deterioration degree of the captured image caused by the (vibration) excitation. The details of the evaluation method are also disclosed in the image evaluating method in the prior art, and a description thereof will be omitted.

Referring now to FIG. 28, a description will be given of the operation of the image evaluating unit 271. FIG. 28 is a block diagram of the image evaluating unit 271. In FIG. 28, a stationary-state (non-excitation-state) output 282 includes image data at the stationary time (measurement data at the stationary time) captured by the measurement camera 11 while the excitation table 12 is in the stationary state with a plurality of exposure times or luminances. An excitation-state output 281 includes image data at the excitation time (measurement data at the excitation time) captured by the measurement camera 11 while the excitation table 12 is in an excitation state with a plurality of exposure times or luminances.

The image evaluating unit 271 calculates information such as a handheld blur amount and an image degradation (bokeh) amount as an excitation-state change amount (excitation-state measurement data) 283 based on the excitation-state output 281 that has been input. Similarly, the image evaluating unit 271 calculates a stationary-state change amount (stationary-state measurement data) 284 such as a handheld blur amount and an image degradation amount based on the stationary-state output 282 that has been input. The handheld blur amount and the image degradation amount at the stationary time are generally referred to as a reference image degradation amount, and therefore will be uniformly referred to as a reference image degradation amount in this specification. A change amount such as the image degradation amount and the handheld blur amount measured at the excitation time will be uniformly referred to as an total image degradation amount in this specification.

The obtained total image degradation amount 283 and stationary-state measurement data 284 are compared by a divider 285, and handheld blur amount data 286 is calculated by calculation processing such as subtraction. The handheld blur amount data 286 corresponds to handheld blur amount data in the claims. The handheld blur is evaluated by an evaluation block 287 based on this handheld blur amount data 286.

Here, camera handheld blur is applied to the measurement camera 11 even in a case where the excitation table 12 is in the stationary state. The causes of camera handheld blur include driving the shutter, mirrors, and lenses inside the measurement camera 11, and irregular vibrations input to the measurement environment from the outside, such as building and floor shakes. In addition to the camera handheld blur, in a case where the ISO speed is increased, noise that does not appear in the actual phenomenon may be superimposed on an image. Camera handheld blur caused by shutter, mirror, and lens driving inside the measurement camera 11, the irregular vibrations input to the measurement environment from the outside, such as building and floor shakes, and noise superimposition due to the high ISO speed may become disturbances in calculating a change amount and cause erroneous calculation of the handheld blur amount. A description will now be given of the disturbance influence on the reference image degradation amount and the total image degradation amount using the reference image degradation amount as a target.

FIG. 29 is a graph illustrating a reference image degradation amount in order of exposure time in a case where there is no camera handheld blur or disturbance. In the graph of FIG. 29, a horizontal axis represents exposure time, which increases toward the right. A vertical axis represents the reference image degradation amount, which increases as the position goes up. The unit of the vertical axis is, for example, the number of imaging pixels of the image sensor in the measurement camera 11. As illustrated in FIG. 29, in a reference image degradation amount waveform 291, the reference image degradation amount generally increases as the exposure time increases. This is because noise is superimposed on a captured image of a dark object that requires a long exposure time.

FIG. 30 is a graph illustrating a reference image degradation amount in order of exposure time in a case where there is camera handheld blur or disturbance. In a reference image degradation amount waveform 301, the tendency of a reference image degradation amount 301a significantly changes at a specific exposure time 302. Although not illustrated, such a phenomenon also occurs in an total image degradation amount waveform. A reference image degradation amount, an total image degradation amount (excitation-state bokeh amount), or a handheld blur amount representing a sudden change at a singular point will be referred to as a singular (anomalous) change amount. A specific exposure time that significantly changes the tendency of the change amount will be referred to as a specific exposure time (specific imaging condition). In order to avoid description confusion, a singular change amount generated in a reference image degradation amount waveform will be referred to as a singular image degradation amount, a singular change amount generated in an total image degradation amount waveform will be referred to as a singular total image degradation amount, and a singular change amount generated in handheld blur amount data will be referred to as a singular handheld blur amount.

FIGS. 31A, 31B, and 31C illustrate camera handheld blur waveforms in measuring a reference image degradation amount, where a horizontal axis represents elapsed time and a vertical axis represents a handheld blur amount on an imaging plane. The unit of the vertical axis is the number of imaging pixels similarly to FIGS. 29 and 30. As illustrated in FIG. 31A, a camera handheld blur waveform 311 has a large camera handheld blur 311a in the first half of exposure 312a and a small camera handheld blur 311b in the second half of exposure 312b. In this case, since the exposure time 312 is long, a ratio of the camera handheld blur 311b is large and the influence of the camera handheld blur 311a is small. Therefore, the reference image degradation amount is not significant. In FIG. 31B, the exposure time 312 is short relative to the camera handheld blur 311a, so the reference image degradation amount is not significant. However, in FIG. 31C, the exposure time 312 is approximately as long as a duration in which the maximum and minimum values of the camera handheld blur 311a occur. Thus, the reference image degradation amount becomes significant due to the camera handheld blur generated during exposure, and becomes a singular image degradation amount. In this way, a singular image degradation amount occurs in a specific exposure time due to the camera handheld blur. Even in the case of irregular disturbance vibration, a similar phenomenon occurs depending on the timing with the exposure time.

Referring now to FIGS. 32 and 33, a description will be given of the disturbance superimposition that occurs in a case where the ISO speed becomes high using the reference image degradation amount as a target. FIG. 32 explains a method of obtaining a reference image degradation amount from an image captured by the measurement camera 11. In order to detect the image contrast described above, a black-and-white chart 14 illustrated in FIG. 32 is used.

Figures 33A, 33B, 33C, 33D:
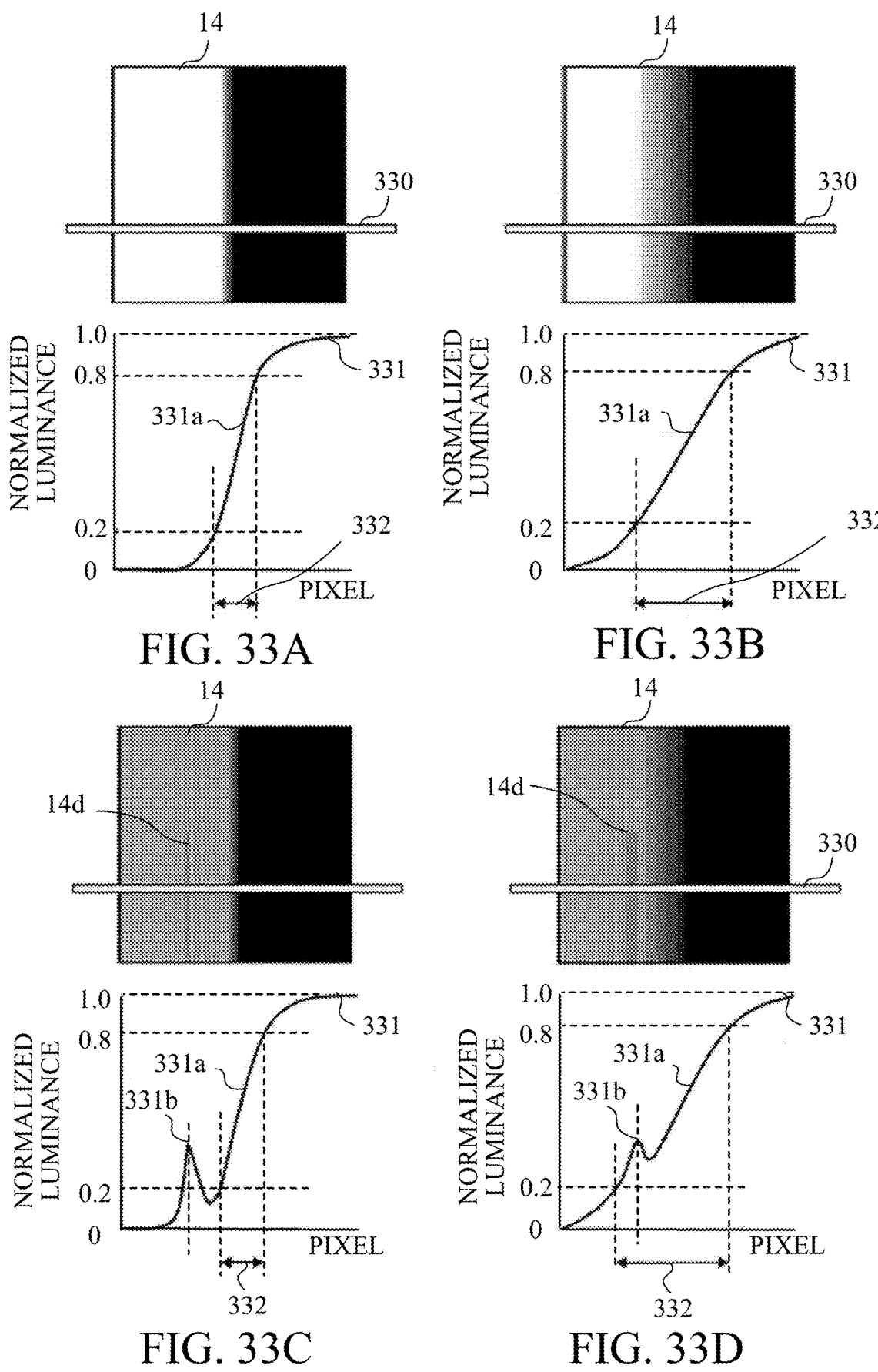

FIG. 33A is a graph illustrating luminance changes in the horizontal direction in an image of the chart 14 captured without camera handheld blur. A horizontal axis represents a black-and-white boundary line of the chart 14 and pixels in the normal direction on the image sensor, and a vertical axis represents normalized pixel luminance in the normal direction. This luminance is detected by a luminance extraction line 330 in a captured image. As illustrated in FIG. 33A, a luminance change waveform 331 has a predetermined slope 331*a* in a range that includes a boundary between white and black. A luminance change width 332 that excludes the upper and lower limits of 20% is set to a reference image degradation amount. In the case where there is the camera handheld blur as illustrated in FIG. 31C, a luminance change waveform 331 illustrated in FIG. 33B is obtained, and the luminance change width 332 becomes wider. Therefore, the reference image degradation amount increases.

A description will now be given of a relationship between the imaging sensitivity (ISO speed) and the reference image degradation amount. FIG. 33C illustrates the state of the chart 14 in imaging at low luminance with high sensitivity. In this state, the luminance varies in a case where the chart is illuminated at low luminance. Slight contrast changes in the chart are increased for high-sensitivity imaging. Thereby, chart irregularity 14*d* appears on the chart 14.

FIG. 33C illustrates an imaging result in a state where there is no camera handheld blur or disturbance vibration, and an irregular peak indicated by 331*b* may appear in the luminance change waveform 331 due to the chart irregularity 14*d*. Since the width of the irregular peak 331*b* is smaller than the luminance change width 332, it is treated as noise. Therefore, the obtained reference image degradation amount is not much different from the reference image degradation amount obtained by imaging with normal sensitivity.

FIG. 33D illustrates an imaging result in a case where there is camera handheld blur or disturbance vibration, and an irregular peak indicated by 331*b* may appear in the luminance change waveform 331 due to the chart irregularity 14*d*. As described with reference to FIG. 33B, since the irregular peak 331*b* caused by the chart irregularity 14*d* is included in the luminance change width 332, the luminance change width 332 becomes wider. Therefore, in high-sensitivity imaging at a specific exposure time, a singular image degradation amount appears due to camera handheld blur or disturbance vibration.

FIG. 34 illustrates an imaging result of a chart with normal luminance. FIG. 34 is a graph illustrating a reference image degradation amount in order of exposure time in a case where there is camera handheld blur or disturbance vibration. A reference image degradation amount waveform 341 has a slightly larger reference image degradation amount 341*a* at a specific exposure time 340.

FIG. 35 illustrates an imaging result of a chart illuminated with low luminance with high sensitivity (high ISO speed). FIG. 35 is a graph illustrating a reference image degradation amount in order of exposure time in a case where there is camera handheld blur or disturbance vibration. A reference image degradation amount waveform 351 has a singular handheld blur amount 351*a* at a specific exposure time 340. Thus, a singular image degradation amount different from a reference image degradation amount appears at a specific exposure time due to an imaging condition such as the imaging sensitivity, camera handheld blur, or disturbance vibration.

As described above, in order to evaluate the handheld blur in the measurement camera 11, the image evaluating unit 271 obtains a reference image degradation amount while the excitation table 12 is in the stationary state, and subtracts it from an total image degradation amount obtained from the image evaluating unit 271 in the handheld blur state. Now assume that the measurement camera 11 has an image stabilizing function. At this time, camera handheld blur and disturbance vibration are reduced by the image stabilization.

FIG. 36A illustrates an total image degradation amount at each exposure time captured in a case where the measurement camera 11 that is turning on the image stabilizing function is excited and handheld blurred. In FIG. 36A, a horizontal axis represents exposure time, and a vertical axis represents an total image degradation amount. An total image degradation amount waveform 361 does not generate a singular image degradation amount due to the image stabilizing function. A handheld blur amount waveform 362 illustrated in FIG. 36C is obtained by subtracting the reference image degradation amount illustrated in FIG. 36B from the obtained total image degradation amount. In FIG. 36B, since there is a singular handheld blur amount at the exposure time 340, a handheld blur amount obtained by the subtraction also has a singular handheld blur bottom. Therefore, the handheld blur amount becomes small at the exposure time 340. A handheld blur amount in FIG. 36C represents a residue handheld blur amount after the image stabilizing function works, but the image stabilizing performance is incorrectly evaluated at the specific exposure time 340. This would result in inaccurate evaluation of the image stabilizing performance, and thus the countermeasure of the singular image degradation amount may be taken.

Fifth Embodiment

A description will be given of a fifth embodiment according to the disclosure. Referring now to FIG. 37, a description will be given of an operation of an image evaluating unit 271 according to this embodiment. FIG. 37 is a block diagram of the image evaluating unit 271. FIG. 37 is based on FIG. 28, and thus a description of common portion will be omitted by designating the same reference numerals.

Reference numeral 371 in FIG. 37 denotes a detector configured to detect disturbance. The detector 371 includes a processing unit A373 that processes data of an total image degradation amount in a case where the total image degradation amount is input, and a processing unit B374 that processes data of a reference image degradation amount in a case where the reference image degradation amount is input. A determination unit 375 determines whether there is disturbance in the data processed by the processing units A373 and B374. The detector 371 transmits the result of the internal determination unit 375 to a switching unit 376. In a case where it is determined that there is no disturbance, the determination unit 375 transmits an total image degradation amount 283 and a reference image degradation amount 284 to an A route, and a divider 372 calculates a handheld blur amount. In a case where it is determined that there is disturbance, the determination unit 375 transmits the total image degradation amount 283 and the reference image degradation amount 284 to a B route, and a corrector 377 performs correction processing for these amounts, and then the divider 372 calculates a handheld blur amount.

Referring now to FIGS. 38A and 38B, a description will be given of a threshold that is used to determine the disturbance influence by the detector 371 in FIG. 37 by using the reference image degradation amount as a target. Reference numeral 381 in FIG. 38A denotes a waveform graph where a horizontal axis represents exposure time and a vertical axis represents a reference image degradation amount. Reference numeral 382 in FIG. 38A denotes a waveform graph illustrating a change rate of the reference image degradation amount of the waveform graph 381 relative to adjacent exposure times. +Th_a and −Th_a are thresholds for determining the disturbance influence. As indicated by 381, a monotonously increasing waveform having no singular change amount exhibits a gentle slope as indicated by 382 in a case where the change rate is calculated, and the change rate does not exceed the thresholds.

Reference numerals 383 and 384 in FIG. 38B denote waveform graphs similar to those in FIG. 38A. Reference numeral 383a in FIG. 38B denotes a specific exposure time at which a singular handheld blur amount has occurred due to disturbance. In the waveform 383 in which the reference image degradation amount like such a singular point occurs, in a case where the change rate is calculated, the change rate having a steep slope is calculated as indicated by 384. The detector 371 determines whether the change rate indicated by the specific exposure time 383a is equal to or higher than the (upper) threshold, and determines whether or not there is disturbance influence.

Referring now to FIGS. 39A, 39B, and 39C, a description will be given of operations of the processing units A373 and B374, and the determination unit 375 installed in the detector 371 in FIG. 37. FIG. 39A is a flowchart illustrating specific operation of the processing unit A373. In a case where the total image degradation amount is input to the detector 371, the processing unit A373 starts the operation in step S391.

In step S392, the processing unit A373 calculates the change rate of the input reference image degradation amount. In a case where it is determined in step S393 whether the result of the change rate calculated is less than the threshold, the result is recorded as Norm in step S394, and the flow ends in step S395. In a case where it is determined in step S393 that the result of the change rate calculated is higher than the threshold, the result is recorded as Err in step S396, at the same time, the exposure time at which the change rate is higher than the threshold is recorded as Tv_A, and the flow ends.

FIG. 39B is a flowchart illustrating the operation of the processing unit B374. Since the basic operation is the same as that of the processing unit A373 illustrated in FIG. 39A, common portions will be designated by the same reference numerals and the details of the description will be omitted. After the change rate of the reference image degradation amount is calculated in step S397, in a case where the result is less than the threshold, the result is recorded as Norm and the flow ends. In a case where the result of the change rate of the reference image degradation amount is higher than the threshold, the result is recorded as Err in step S398, and the exposure time at which the change rate is higher than the threshold is recorded as Tv_B.

FIG. 39C is a flowchart illustrating the operation of the determination unit 375. After the processing units A373 and B374 have completed their operations, the determination unit 375 starts the operation in step S399 based on the results of them. In step S3910, in a case where the results of the processing units A373 and B374 illustrated in FIGS. 39A and 39B are both Norm indicating that both change rates are less than the thresholds, it is determined that there is no disturbance in step S3911, and the flow ends in step S3912. In a case where the result of step S3910 is NO, the flow proceeds to step S3913 to determine whether the results of both processing units A373 and B374 are Err indicating that both change rates are higher than the thresholds. In a case where the result of step 3913 is YES, in step S3914, the exposure time Tv_A at which the change rate is higher than the threshold in the processing unit A373 is compared with the exposure time Tv_B at which the change rate is higher than the threshold in the processing unit B374. In a case where the exposure times Tv_A and Tv_B are the same exposure time, there is environmental influence, the flow proceeds to step s3911, it is determined that there is no disturbance, and the flow ends.

In a case where the result of step S3914 is NO, the change rates are higher than the thresholds at different exposure times, the flow proceeds to step S3915, it is determined that there is disturbance, and the flow ends. In a case where the result of step S3913 is NO, one of the change rates is higher than the threshold, the flow proceeds to step S3915, it is determined that there is disturbance, and the flow ends.

Figures 40A, 40B, 40C, 40D:
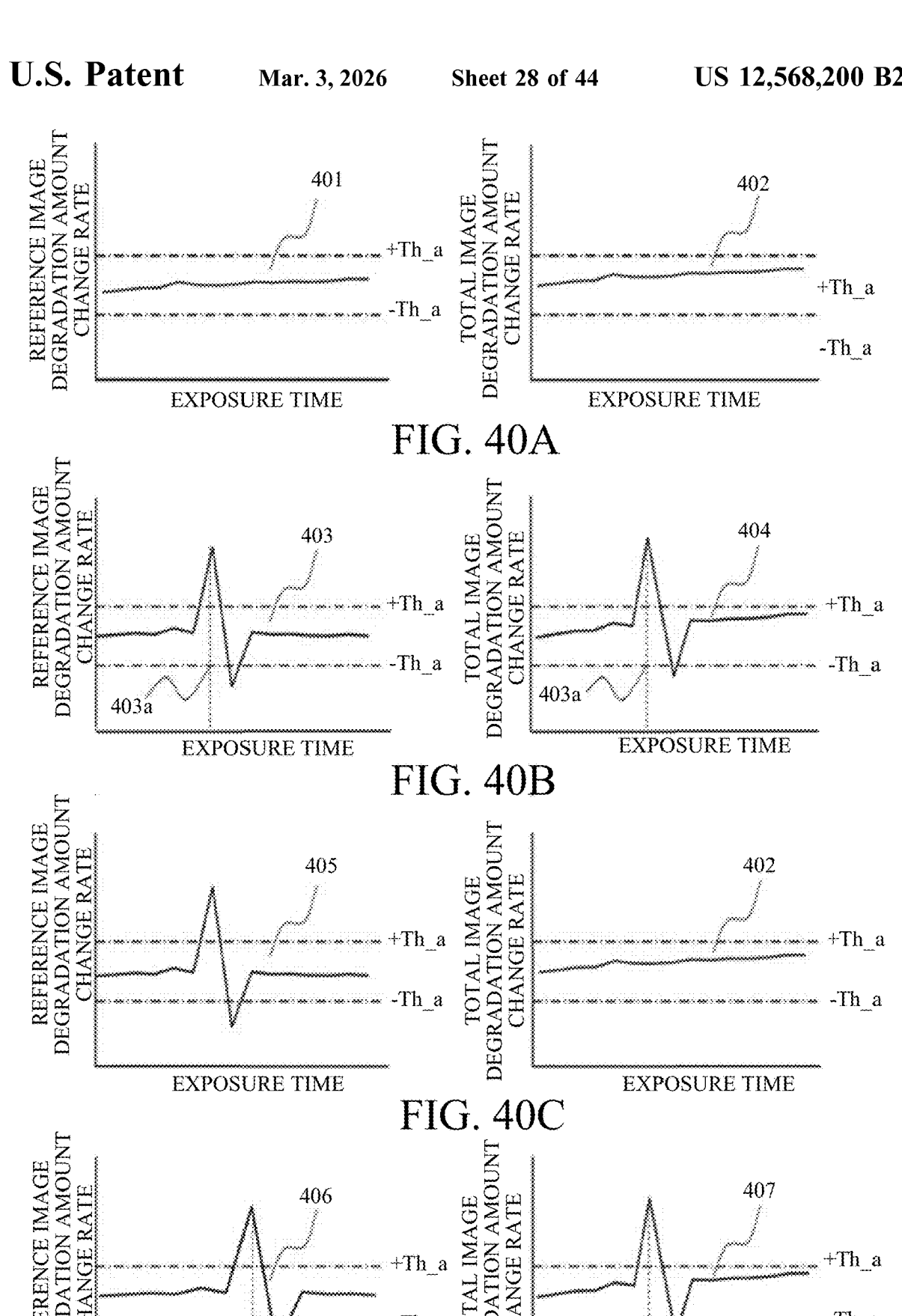

Referring now to FIGS. 40A, 40B, 40C, and 40D, a description will be given of the determination of the presence and absence of disturbance determined in FIG. 39C. In FIG. 40A, a waveform graph 401 has a horizontal axis that represents exposure time and a vertical axis that represents a change rate calculated from the reference image degradation amount. A waveform graph 402 has a horizontal axis that represents exposure time and a vertical axis that represents a change rate calculated from the total image degradation amount. Since both of the change rates of the waveform graphs 401 and 402 are not higher than the thresholds, even if these data are used, the handheld blur amount can be calculated without disturbance influence.

Next, FIG. 40B will be described. A waveform graph 403 illustrated in FIG. 40B has a horizontal axis that represents exposure time and a vertical axis that represents a change rate calculated from the reference image degradation amount. A waveform graph 404 has a horizontal axis that represents exposure time and a vertical axis that represents a change rate calculated from the total image degradation amount. Reference numeral 403a denotes a specific exposure time at which the change rate is higher than the threshold. Both of the change rates of the waveform graphs 403 and 404 are higher than the thresholds, but the specific exposure times at which the change rates are higher than the thresholds is the same specific exposure time 403a. Even in a case where the handheld blur amount is calculated using these data, the singular change amount occurs at the same exposure time 403a, and the influences are canceled out. Therefore, the handheld blur amount without disturbance influence can be calculated.

Next, FIG. 40C will be described. FIG. 40C is based on FIG. 40A, and common portions will be designated by the same reference numerals and a description thereof will be omitted. In a waveform graph 405 illustrated in FIG. 40C, a horizontal axis represents exposure time, and a vertical axis represents a change rate calculated from the reference image degradation amount. The change rate of the waveform graph 405 is higher than the threshold, but the change rate of the waveform graph 402 is not higher than the threshold. In calculating a handheld blur amount using these data, a handheld blur amount illustrated in FIG. 36C in which disturbance influence appears at a specific exposure time may be calculated. Therefore, in this case, it is determined that there is disturbance, and the corrector 377 in FIG. 37 performs correction processing for the reference image degradation amount higher than the threshold. The data whose change rate is higher than the threshold is first data determined to have the disturbance. The data whose change rate is not higher than the threshold is second data determined to have the disturbance.

Next, FIG. 40D will be described. Since FIG. 40D is based on FIG. 40B, corresponding elements will be designated by the same reference numerals and a description thereof will be omitted. In a waveform graph 406 illustrated in FIG. 40D, a horizontal axis represents exposure time, and a vertical axis represents a change rate calculated from the reference image degradation amount. Reference numeral 406a denotes a specific exposure time at which the change rate is higher than the threshold. Both of the change rates of the waveform graphs 406 and 407 are higher than the thresholds. The specific exposure times 406a and 403a at which the change rates are higher than the thresholds are different from each other. In calculating a handheld blur amount using these data, a handheld blur amount illustrated in FIG. 36C in which the disturbance influence appears at a specific exposure time may be calculated. Therefore, in this case, it is determined that there is disturbance, and the corrector 377 in FIG. 37 performs correction processing for the reference image degradation amount and the total image degradation amount that are higher than the thresholds. The data in which the change rates are higher than the thresholds is the first data determined to have the disturbance.

FIGS. 41A, 41B, 41C, and 41D sequentially describe several correcting methods to be performed by the corrector 377 in FIG. 37 using the waveform of the reference image degradation amount as a target.

Figures 41A, 41B, 41C, 41D:
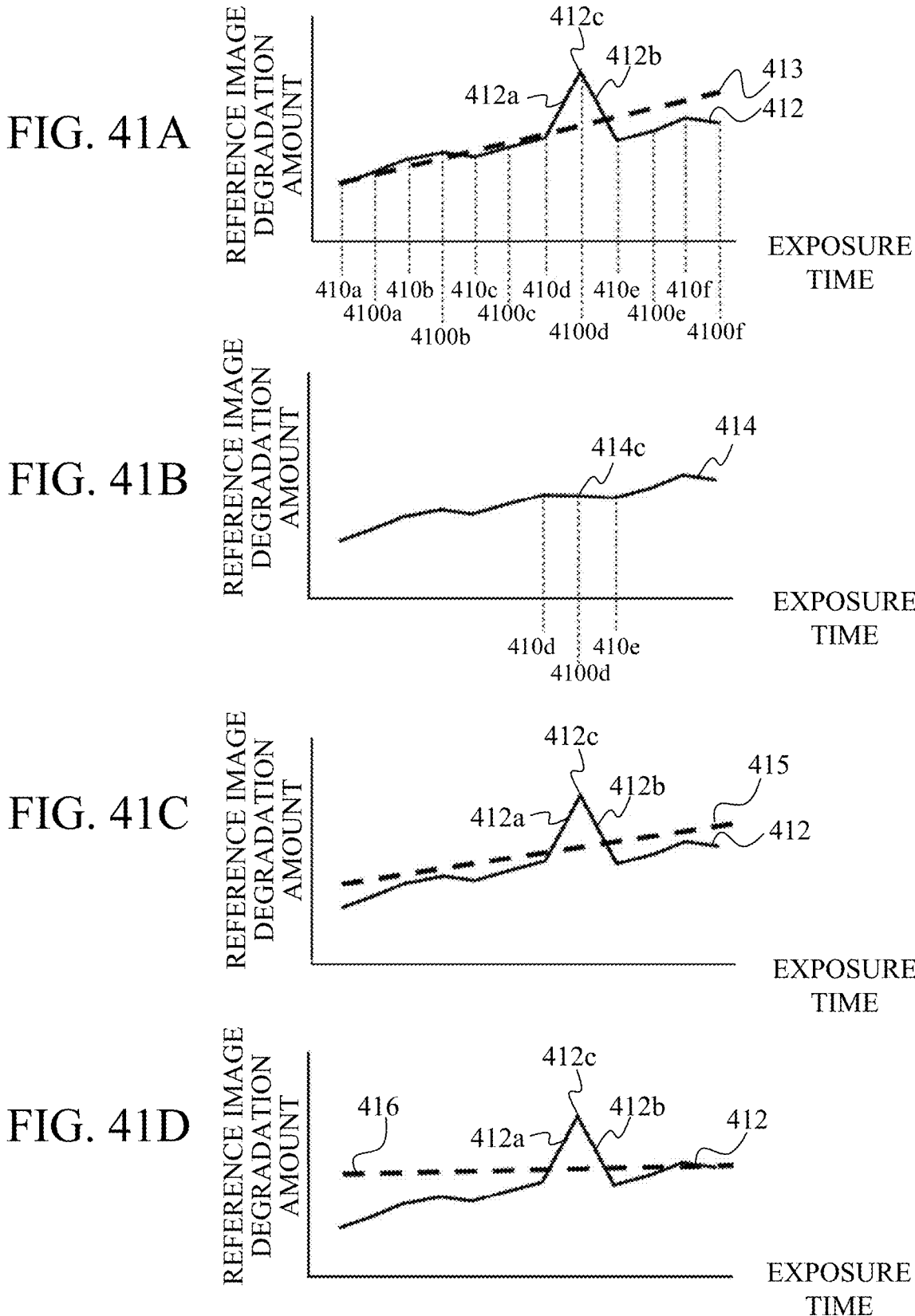

(1) In FIG. 41A, a reference image degradation line obtained by averaging the slopes of the reference image degradation amounts for respective exposure times is set as a new reference image degradation amount. In FIG. 41A, a slope of a line connecting the reference image degradation amounts at exposure times 410a and 4100a of a reference image degradation waveform 412 is obtained (a ratio of adjacent reference image degradation amounts at the continuously changed exposure times is obtained). Similarly, the slope of the line connecting the reference image degradation amounts at the exposure times 4100a and 410b is obtained. Thus, the slopes between all the exposure times are obtained, and an adjusted image degradation amount (straight line) 413 having an average slope of those slopes is set, for example, by setting the exposure time 410a as a starting point, and an intercept of the straight line and each exposure time is set to an adjusted image degradation amount. The adjusted image degradation amount 413 corresponds to a correction change amount. Here, front and rear waveforms 412a and 412b of a singular image degradation amount 412c have steep slopes, but since these slopes have opposite directions, they are canceled out by averaging. That is, the averaging of the slopes is less affected by the singular image degradation amount. A handheld blur amount can be stably obtained by using a difference between the adjusted image degradation amount 413 and the total image degradation amount in FIG. 36A.

(2) A description will be given of a method illustrated in FIG. 41B. Since the waveforms 412a and 412b having slopes larger than an average slope of the adjusted image degradation amount 413 can be found in FIG. 41A, exposure time 4100d for generating the singular image degradation amount can be found. Accordingly, in FIG. 41B, only the singular image degradation amount at the exposure time 4100d is obtained by averaging the adjacent exposure times 410d and 410e, and is set as an adjusted image degradation amount 414c. The adjusted image degradation amount 414c corresponds to a correction change amount. A handheld blur amount can be stably obtained by using a difference between the adjusted image degradation amount 414 thus obtained and the total image degradation amount in FIG. 36A.

(3) A description will be given of a method of FIG. 41C. In FIG. 41C, an adjusted handheld blur amount is obtained by using a waveform (correction change amount) 415 obtained by linearly approximating the reference image degradation waveform 412 obtained in FIG. 41A. A handheld blur amount can be stably obtained by using a difference between the adjusted image degradation waveform 415 thus obtained and the total image degradation amount in FIG. 36A. A waveform on which linear approximation is based is not limited to the reference image degradation waveform 412 in FIG. 41A, but may be, for example, the adjusted image degradation amount 414 in FIG. 41B.

(4) In FIG. 41D, an adjusted reference image degradation amount is obtained by using a straight line (correction change amount) 416 obtained by averaging the reference image degradation amounts at respective exposure times of the reference image degradation waveform 412 obtained in FIG. 41A. A handheld blur amount can be stably obtained by using a difference between the adjusted handheld blur waveform (straight line) 416 thus obtained and the total image degradation amount illustrated in FIG. 36A. A waveform on which the average straight line is based is not limited to the reference image degradation waveform 412 in FIG. 41A, but may be the adjusted image degradation amount 414 in FIG. 41B.

The corrector 377 illustrated in FIG. 37 is a unit configured to adjust and calculate a singular image degradation amount in the above items (1) to (4) and to set the adjusted image degradation amount. As described above, according to this embodiment, even if there is disturbance in either the reference image degradation amount data or the handheld blur amount data, the disturbance can be corrected and camera handheld blur can be evaluated with high accuracy.

Sixth Embodiment

A description will now be given of a sixth embodiment according to the present disclosure. Referring now to FIG. 42, a description will be given of an operation of an image evaluating unit 271 according to this embodiment. FIG. 42 is a block diagram of the image evaluating unit 271. Since FIG. 42 is based on FIGS. 28 and 37, common portions will be designated by the same reference numerals, and a description thereof will be omitted. In FIG. 42, reference numeral 421 denotes a detector configured to detect disturbance. The detector 421 includes an internal processing unit 424 configured to process data of a handheld blur amount in a case where the handheld blur amount is input. A determination unit 425 determines whether or not there is disturbance in the data processed by the processing unit 424. The detector 421 transmits the result of the internal determination unit 425 to a switching unit 376.

In a case where it is determined that there is no disturbance, the determination unit 425 transmits handheld blur amount data 286 to an A route, and an evaluation unit 423 performs handheld blur evaluation. In a case where it is determined that there is disturbance, the determination unit 425 transmits the handheld blur amount data 286 to a B route, and after correction processing is performed in the corrector 422, the evaluation unit 423 performs handheld blur evaluation.

Referring now to FIGS. 43A and 43B, a description will be given of operations of the processing unit 424 and the determination unit 425 provided in the detector 421. FIG. 43A is a flowchart illustrating a specific operation of the processing unit 424. Since FIG. 43A is based on FIG. 13, common portions will be designated by the same reference numerals, and a description thereof will be omitted.

In a case where the handheld blur amount is input to the detector 421, the processing unit 424 starts the operation. In step S431, the processing unit 424 calculates the change rate of the input reference image degradation amount. In a case where the change rate is less than the threshold, the result is recorded as Norm in step S432 and the flow ends. The change rate calculating method and the threshold determining method are similar to those described with reference to FIGS. 38A and 38B, and a description thereof will be omitted. In a case where it is determined that the change rate is higher that the threshold, the result is recorded as Err in step S433, the exposure time at which the change rate is higher than the threshold is recorded as Tv_Handheld blur, and the flow ends.

FIG. 43B is a flowchart illustrating the operation of the determination unit 425 in the detector 421 illustrated in FIG. 42. Since FIG. 42B is based on FIG. 13C, the common portions will be designated by the same reference numerals and a description thereof will be omitted. After the operation of the processing unit 424 ends, the determination unit 425 starts the operation based on the result.

In step S434, in a case where the result of the processing unit 424 illustrated in FIG. 43A is Norm lower than the threshold, it is determined in step S435 that there is no disturbance, and the operation ends. In a case where the result of step S434 is NO, it is determined in step S436 that there is disturbance in the handheld blur amount data, and the flow ends. The handheld blur amount data with disturbance is handheld blur amount data determined to have the disturbance.

In a case where it is determined that there is disturbance due to the determination of presence and absence of the disturbance described with reference to FIGS. 43A and 43B, the corrector 422 corrects the disturbance. Since the correction method is similar to that illustrated in FIGS. 41A, 41B, and 41C, a detailed description thereof will be omitted.

As described above, even if there is disturbance in the handheld blur amount data, this embodiment can correct the disturbance and accurately evaluate the handheld blur in the camera.

Seventh Embodiment

A description will be given of a seventh embodiment according to the present disclosure. FIG. 44 is a schematic diagram of a handheld blur evaluating apparatus 100d1 that executes a camera handheld blur amount measuring method according to this embodiment. In FIG. 44, reference numeral 11 denotes a measurement camera (imaging unit), which is installed on an excitation table (excitation unit) 12. The measurement camera 11 and the excitation table 12 are controlled through a control unit (CTRL) 443 of a computer 442. The excitation table 12 excites the measurement camera 11 about the arrow 12aP based on the excitation waveform data 13 stored in a memory 444 in the computer 442. The measurement camera 11 faces the chart 14 as an object, and a chart image captured by the measurement camera 11 that is being excited by the excitation table 12 is input to an image evaluating unit (measurement camera image evaluating unit (MCIEU)) 446 in the computer 442. The image evaluating unit 446 detects a width of a boundary between two adjacent colors in the captured chart image, and measures the deterioration degree of the captured image caused by the excitation. The image evaluating unit 446 evaluates the handheld blur of the measurement camera from the deterioration degree. Since the details of the evaluation method are similar to those of the prior art, a description thereof will be omitted.

In order to evaluate the handheld blur of the measurement camera 11, a measurement camera reference image degradation amount to be superimposed on the measurement camera signal in the handheld blur-free state is obtained, and subtracted from the camera signal in the handheld blur state.

Since handheld blur is evaluated by using the exposure time as a parameter, the measurement camera reference image degradation amount is obtained by each exposure time. Here, the exposure time, F-number (aperture value), and ISO speed of the measurement camera 11 are at issue. In addition, a change in a measurement camera reference image degradation amount becomes problematic in a measurement environment, such as influence from the outside such as building shakes, an illumination condition such as chart shadows due to lighting, and a distance error between the chart and the measurement camera, and chart warpage. This is because due to this change, the measurement camera reference image degradation amount in the handheld blur state and the measurement camera reference image degradation amount in the handheld blur-free state are different, even if they are subtracted, the measurement camera reference image degradation amount cannot be cancelled out, and handheld blur cannot be correctly calculated. Therefore, it is necessary to obtain a stable measurement camera reference image degradation amount regardless of the measurement environment.

In FIG. 44, reference numeral 441 denotes a reference camera (reference determination unit), which images the chart 14 with substantially the same composition as that of the measurement camera 11. The reference camera 441 is a mass-production product having a known point spread function (PSF), and is selected to have a PSF with stable dispersion among individuals of the same model and a normal distribution with small variance. Cameras of the same model are used as the reference camera in a case where camera handheld blur is evaluated at various locations. Here, a handheld blur amount in a case where the chart 14 has previously been imaged by exposure time by the reference camera 441 is determined as a specified (or regulated) image degradation amount.

Referring now to FIG. 45, a description will be given of a chart according to this embodiment. FIG. 45 is a plan view of a handheld blur measurement chart. The chart 14 is a handheld blur measurement chart displayed on a monitor illustrated in FIG. 45. The handheld blur measurement chart is a chart that is used as an object in measuring the image stabilizing effect. A black area 141 is a low-brightness (lightness or value) area (first color) painted in black. A white area 142 is a white high-brightness area (second color). An imaging area marker 143 is a marker that is used as a guide for setting the imaging area. The handheld blur measurement chart is not limited to that illustrated in FIG. 45, and can use various charts. For example, instead of a combination of black and white as illustrated in FIG. 45, a pattern of a plurality of types of color areas having chroma may be used. At this time, a reflectance ratio of a high-brightness color and a low-brightness color may be 4:1 or higher. The handheld blur measurement chart may be a pattern in which an actual image is partially incorporated as well as a geometrical pattern. That is, the handheld blur measurement chart may be any chart that includes a plurality of color areas.

This embodiment evaluates a handheld blur amount in an image by measuring the handheld blur in the image at a boundary between the different color areas on the handheld blur measurement chart. Conceptually, the color in the color area here includes black, gray, and white that do not have chroma, and also includes colors that have chroma. The image degradation refers to a phenomenon in which the sharpness of a captured image is reduced due to misalignment between a focal plane of a lens and an imaging plane of an image sensor, camera handheld blur, or the like. The image degradation can also occur due to image processing of image data. An image degradation amount is quantified image degradation magnitude. A boundary width between the black area 141 and the white area 142 on the chart 14 can be adjusted by an image adjusting unit (changing unit) 447. In a case where there are a plurality of reference image degradation amount confirmation points, the image adjusting unit 447 can adjust the boundary width at an arbitrary location on the chart.

The reference camera 441 obtains the imaging result by exposure time, and compares the reference camera reference image degradation amount obtained by a reference camera image evaluating unit (RCIEU) (image degradation amount calculator) 448 with a predetermined specified image degradation amount through the detector 449. The image adjusting unit 447 controls the boundary width on the chart 14 based on the result. Therefore, the measurement camera reference image degradation amount of the measurement camera 11 can be stably obtained regardless of the measurement environment.

Referring now to FIG. 46, a description will be given of an image degradation amount. FIG. 46 is a graph illustrating changes in the normalized level value at the boundary between the black area and the white area in the image on the chart 14 captured by the camera. A horizontal axis represents the number of pixels in the image sensor in the camera, and a vertical axis represents a level value of the normalized image signal (here normalized luminance). A level value of the image signal in the black area is set to 0 and a level value of the image signal in the white area is set to 255 by normalization. In FIG. 46, the handheld blur amount of the image is a boundary portion between a white area P1 and a black area P2 illustrated in A, and is a distance between level values changing from 0 to 255 in the normalized image signal. The details of the handheld blur amount calculating method are disclosed in prior art, and thus a description thereof will be omitted here.

Referring now to FIGS. 47A and 47B, a description will be given of a handheld blur evaluating method of the measurement camera. FIGS. 47A and 47B illustrate a simple flowchart of the handheld blur evaluating method of the measurement camera in a case where imaging of the reference camera and imaging of the measurement camera are performed at the same time.

First, in step S471, the exposure times of the measurement camera 11 and the reference camera 441 are set. For example, in a case where the focal length of the imaging lens in the measurement camera 11 is 100 mm and the size of the image sensor is a full-size format (36 mm in width and 24 mm in height), the exposure time is initially set to 1/100 seconds.

Next, in step S472, the chart 14 is imaged by the reference camera 441, and the reference camera reference image degradation amount is obtained by the reference camera image evaluating unit 448. The reference camera reference image degradation amount is acquired by obtaining the image degradation amount from the boundary width between the black area and the white area in the image on the chart 14 captured by the reference camera in the stationary state as described above.

Next, in step S473, the control unit 443 determines whether or not a ratio of a specified image degradation amount of the reference camera 441 to a reference camera reference image degradation amount obtained in step S472 (referred to as an image degradation amount ratio hereinafter) is 1. In a case where the image degradation amount ratio is 1, the specified image degradation amount of the reference camera 441 and the reference image degradation amount coincide with each other, and this state is an ideal state. However, the handheld blur amount ratio of 1 may have a range, and the determination may be made so that the ratio can fall within that range (for example, the error is ±5%). In a case where there are a plurality of confirmation locations of the reference camera reference image degradation amount, the image degradation amount ratio is confirmed at all locations. In a case where the image degradation amount ratio at all locations is 1 or falls within the set range, the flow proceeds to step S475. Otherwise, the flow proceeds to step S474.

In step S474, the boundary width between the black area 141 and the white area 142 of the chart 14 is adjusted based on the image degradation amount ratio obtained in step S473. For example, in a case where the reference camera reference image degradation amount obtained in step S473 is larger than the specified image degradation amount by 10%, the boundary width of the chart 14 is narrowed according to that amount. Conversely, in a case where the handheld blur amount is smaller than the specified image degradation amount by 10%, the boundary width of the chart 14 is widened according to that amount. By repeating steps S472 to S474, the reference camera reference image degradation amount is made closer to the specified image degradation amount.

Referring now to FIGS. 48A and 48B, a description will be given of a relationship between the image degradation amount of the reference camera 441 and the boundary width of the chart 14. FIG. 48A is a graph illustrating changes in a normalized level value at the boundary between the black area and the white area in the image on the chart 14, where $B_I$, $C_I$, and $P_I$ respectively represent boundary widths. FIG. 48B is a graph illustrating how the normalized level value changes at the boundary between the black area and the white area in the captured image on the chart 14 captured by the reference camera 441. $P_O$ is a boundary width of the specified image degradation amount. Each of $B_O$ and $C_O$ represents a boundary width of a reference image degradation amount. The boundary widths $B_O$, $C_O$, and $P_O$ in FIG. 48B correspond to the results of multiplying the boundary widths $B_I$, $C_I$, and $P_I$ in FIG. 48A by the PSF, which will be described below. In both FIGS. 48A and 48B, a horizontal axis represents the number of pixels in the image sensor in the camera, and a vertical axis represents a level value of the normalized image signal.

Since the PSF can be regarded as a transfer function between an image to be captured and a captured image, the following relationship is established where O is a captured image by the reference camera 441 and I is an image of the chart 14:

$$O = I \otimes \text{PSF} \tag{1}$$

Since this embodiment divides the PSF into PSF1 of the camera itself and PSF2 that represents an image influence factor such as a measurement environment, equation (1) can be expressed as follows.

$$O = I \otimes \text{PSF1} \otimes \text{PSF2} \tag{2}$$

PSF1 of the camera itself represents the resolving power of the camera, is a function that expresses the influence of a shift between the focal plane of the lens and the imaging plane of the image sensor in the camera, image processing in the camera, and lens aberration, and corresponds to a known image acquiring state. PSF1 cannot be arbitrarily controlled by a measuring person (measurer), but can be previously recognized. Therefore, in selecting the reference camera 441, selecting PSF1 that has a normal distribution and small variance can reduce the influence of the camera itself on the captured image.

PSF2, which represents an image influence factor such as the measurement environment, is a function that expresses the influence on an image due to disturbance such as building shakes, lighting, a distance error between the chart and the measurement camera, and chart warping, and changes depending on the measurement environment. Therefore, it is difficult to previously recognize it, and the measuring person cannot arbitrarily control it. PSF2 corresponds to an unknown image acquiring state. Thus, the captured image O is an image obtained by applying a known image acquiring state and an unknown image acquiring state to the chart.

Image I in the chart 14 is an image captured by reference camera 441, and is the only image arbitrarily controllable by the measuring person in equation (2). Therefore, the captured image O by the reference camera 441 in equation (2) is affected by PSF1 of the camera itself, which cannot be controlled by the measuring person, and PSF2 representing an image influence factor such as the measurement environment, but can be arbitrarily controlled by controlling the image I of the chart 14. In a case where it is illustrated in FIGS. 48A and 48B and the boundary width of the reference image degradation amount is larger than the boundary width $P_O$ of the specified image degradation amount, like $C_O$, the boundary width on the image I side of the chart 14 may be narrowed from $C_I$ to $P_I$. In a case where the boundary width of the reference image degradation amount is narrower than the boundary width $P_O$ of the specified image degradation amount as in $B_O$, the boundary width on the image I side of the chart 14 may be narrowed from $B_I$ to $P_I$. From the above, this embodiment makes constant the image degradation amount obtained from the image O captured by the reference camera 441 by controlling the image I of the chart 14, that is, the boundary width, cancels out the influence of the measurement environment on the image, and provides an always stable image degradation amount.

In step S475 in FIG. 47A, the chart 14 is imaged by the measurement camera 11, and the measurement camera reference image degradation amount is obtained by the image evaluating unit 446. Next, in step S476, the measurement camera reference image degradation amount obtained in step S475 is recorded in a storage unit 445 by exposure time (first $\frac{1}{100}$ seconds in this example).

Steps S477 to S479 are similar to steps S472 to S474. Here, it is confirmed whether or not the reference camera reference image degradation amount shifts from the specified image degradation amount in measuring the measurement camera reference image degradation amount in steps S475 and S476, and the boundary width of the chart 14 is adjusted, as necessary.

In step S4710, it is determined whether measurement of the measurement camera reference image degradation amount has been completed. In a case where the measurement camera reference image degradation amount has already been recorded in step S476, the flow proceeds to step S4711. On the other hand, in a case where the measurement camera reference image degradation amount has not yet been recorded, the flow returns to step S477.

In step S4711, the flow returns to step s471 until the exposure time measured by the measurement camera 11 is completed. In a case where the measurement for all exposure times is completed, the flow proceeds to step S4712. In step S4712, the measurement camera 11 is excited by driving the excitation table 12 with the excitation waveform data 13.

Next, in step S4713, the exposure time of the measurement camera 11 is set as in step S471.

Next, in step S4714, the measurement camera 11 images the chart 14, and the image evaluating unit 446 obtains the total image degradation amount. Here, the total image degradation amount is a handheld blur amount that occurs in a captured image in a case where the camera is excited. Next, in step S4715, the obtained total image degradation amount is recorded in the storage unit 445 by exposure time (in this example, $\frac{1}{100}$ seconds for the first time). Next, in step S4716, the control unit 443 determines whether or not the specified number of images have been completely captured in the same exposure time. For example, 100 images are to be captured, the flow returns to S4714 until all 100 images are captured, and after all of 100 images are completely captured, the flow proceeds to step S4721.

Steps S4717 to S4719 are similar to steps S472 to S474. Here, it is confirmed whether or not the reference camera reference image degradation amount shifts from the specified image degradation amount in measuring the measurement camera total image degradation amount in steps S4714 to S4716, and the boundary width of the chart 14 is adjusted, if necessary.

In step S4720, the control unit 443 determines whether or not the measurement of the measurement camera total image degradation amount is completed. In a case where the specified number of images in step S4716 has been completely captured, the flow proceeds to step s4721. On the other hand, in a case where the specified number of images has not been completely captured, the flow returns to step S4717.

In step S4721, the flow returns to step S4713 until the exposure time measured by the measurement camera 11 ends. In a case where the measurement for all exposure times is completed, the flow ends through step S4721. In evaluating camera handheld blur, a value obtained by subtracting the measurement camera reference image degradation amount by exposure time recorded in step S476 from the average total image degradation amount for each exposure time recorded in step S4715 is set as a measurement camera handheld blur amount.

Referring now to FIG. 49, a description will be given of an example in which the chart 14 is replaced with a paper chart 114 instead of a monitor. FIG. 49 is a schematic diagram of a handheld blur evaluating apparatus 100d2 in a case where the chart 114 is a paper chart.

A plurality of paper charts 114a to 114n are prepared, and the boundary width of each chart is increased in order. Any one of the paper charts 114a to 114n is attached to an unillustrated adsorption panel facing the measurement camera 11 and the reference camera 441. The reference camera reference image degradation amount is output to the image selecting unit (changing unit) 4410. The image selecting unit 4410 changes the boundary width of the chart by displaying a proper chart based on an image degradation amount ratio between the input reference camera reference image degradation amount and the specified image degradation amount. For example, in a case where the reference camera reference image degradation amount is larger than the specified image degradation amount by 10%, a chart number with a boundary width narrower than that of the chart currently in use is displayed according to the magnitude. Conversely, in a case where the reference camera reference image degradation amount is smaller than the specified image degradation amount by 10%, a chart number with a wider boundary width is displayed according to the magnitude. The measuring person selects one of the paper charts 114a to 114n according to the display, attaches it to the absorption panel, and confirms the reference camera reference image degradation amount again. In a case where there are a plurality of reference image degradation amount confirmation locations, the charts with partially different boundary widths are exchanged so that the reference camera reference image degradation amount coincides with the specified image degradation amount at all confirmation locations. Thus, the measurement camera reference image degradation amount, which changes due to the influence of the measurement environment, can be always stabilized by feeding it back to the chart 14 using the reference camera reference image degradation amount, and the camera handheld blur can be evaluated with higher accuracy.

Eighth Embodiment

A description will be given of an eighth embodiment according to the disclosure. The seventh embodiment stabilizes the measurement camera reference image degradation amount by feeding back the imaging result of the reference camera 441 to the chart 14 simultaneously with the reference image degradation amount measurement by the measurement camera 11. On the other hand, this embodiment separately performs the imaging by the reference camera 441 and the reference image degradation amount measurement by the measurement camera 11, feeds back the imaging result of the reference camera 441 to the chart 14, and then makes the measurement camera 11 perform the measurement, thereby stabilizing the measurement camera reference image degradation amount.

Referring now to FIGS. 50A and 50B, a description will be given of a configuration of a handheld blur evaluating method of the camera according to this embodiment. Since the configuration according to this embodiment is obtained by simply separating the measurement camera 11 and the reference camera 441 in the seventh embodiment into two, a detailed description of each block will be omitted.

FIG. 50A is a schematic diagram of a handheld blur evaluating apparatus 100e in measuring the reference camera reference image degradation amount with the reference camera 441 and adjusting the boundary width of the chart 14. The reference camera 441 is installed at a position facing the chart 14, and each component in the reference camera 441 and computer 442 is controlled by the control unit 443.

FIG. 50B is a schematic diagram of a handheld blur evaluating apparatus 100f in a case where the measurement camera 11 measures the measurement camera reference image degradation amount. The measurement camera 11 is installed at a position where the reference camera 441 measured the chart 14, and each component in the measurement camera 11 and the computer 442, and the excitation table 12 are controlled by the control unit 443.

Referring now to FIGS. 51A and 51B, a description will be given of the handheld blur evaluating method of the measurement camera 11. FIGS. 51A and 51B illustrate a simple flowchart of the handheld blur evaluating method of the measurement camera 11 in a case where imaging of the reference camera and imaging of the measurement camera are separately preformed. A description of the same block as that in the flow of FIGS. 47A and 47B will be omitted.

First, in step S511, the reference camera 441 is disposed at a position facing the chart 14. At this time, an imaging distance of the reference camera 441 is set such that a range within an imaging area marker of the chart 14 appears almost entirely on the screen. After the reference camera 441 can be installed at the position facing the chart 14, the flow proceeds to step S471.

In step S512, the measurement camera 11 is installed at the position facing the chart 14. At this time, an imaging distance of the measurement camera 11 is set such that a range within the imaging area marker of the chart 14 appears almost entirely on the screen, similarly to the reference camera 441 in step S511. After the measurement camera 11 is installed at the position facing the chart 14, the flow proceeds to step S471.

Thus, this embodiment can stabilize the measurement camera reference image degradation amount, which changes due to the influence of the measurement environment, etc., by feeding it back to the chart 14 using the reference camera reference image degradation amount, and evaluate camera handheld blur with higher accuracy.

Ninth Embodiment

A description will be given of a ninth embodiment according to the present disclosure. FIG. 52 is a schematic diagram of a handheld blur evaluating apparatus 100g according to this embodiment. As illustrated in FIG. 52, this embodiment performs measurement with the measurement camera 11 by setting a state similar to that of the fourth embodiment. That is, the measurement camera 11 is installed on the excitation table (excitation unit) 12. The excitation table 12 excites the measurement camera 11 about the arrow 12aP based on the excitation waveform data 13. The excitation table 12 can be switched between an excitation state and a stationary state by control. The measurement camera 11 faces the chart 14 as an object, and a chart image captured by the measurement camera 11 that is being excited by the excitation table is input to a resolution calculator 500. The chart image can be acquired while the luminance of the object (imaging environment) is changed by illumination 14k. The chart to be imaged at this time can use that illustrated in FIG. 32 of the fourth embodiment. Another chart that can be used to measure so-called resolution may also be used.

In this embodiment, the resolution may be defined based on a luminance change width. More specifically, in a case where a luminance change width 332 in FIGS. 33A, 33B, 33C, and 33D is narrow, the resolution is considered to be high, and in a case where the luminance change width 332 is wide, the resolution is considered to be low. The resolution calculator 500 obtains the resolution from the imaging magnification at the time of imaging, chart information, the luminance change width 332 described above, and the like.

In the description of this embodiment, the output of the resolution calculator 500 is expressed using the term "resolution" as described above. As apparent from the measuring method of FIG. 52, a factor that governs the resolution is so-called image handheld blur, so it may be assumed that high resolution means less handheld blur, and low resolution means more handheld blur. That is, a vertical axis in FIGS. 53A to 56B, which will be described below, represents the resolution, but it may be considered to be a handheld blur amount (although a smaller handheld blur amount is located high). Also, in FIGS. 53A to 56B, a horizontal axis represents the luminance of the object, but it may be considered to be exposure time. In FIG. 52, an image is acquired while the luminance of the object is changed using the illumination 14k, and at this time, the darker the luminance is, the longer the exposure time is. That is, the luminance and exposure time are associated with each other. In a case where it is bright, the exposure time is short, and in a case where it is dark, the exposure time is long. Although the horizontal axis in FIGS. 53A to 56B, which will be described below, represents luminance, it may be considered to be exposure time (a longer exposure time is located rightward). Actually, FIGS. 57A, 57B, 57C, and 57D illustrate an example in which a horizontal axis represents exposure time. The hand-held blur evaluating method described below may be performed using each of a relationship between the luminance and the resolving power and a relationship between the exposure time and the resolving power, and may again perform the evaluation in a case where a difference between their values is higher than a threshold, or may perform final handheld blur evaluation using both results.

FIGS. 53A to 56B explain the handheld blur evaluating method illustrating a relationship between the luminance and the resolution. In the graphs illustrated in FIGS. 53A to 56B, a horizontal axis represents the luminance, and a vertical axis represents the resolution. As illustrated in FIG. 52, the measurement camera 11 is installed in the excitation table 12, and a result of an image processed by the resolution calculator 500 is graphed while the luminance is changed by the illumination 14k. The horizontal axes of FIGS. 53A to 56B become darker as the position moves to the right. In a case where it becomes dark, the resolution drops due to the influence of the handheld blur. Therefore, the graph becomes a decreasing graph.

In FIGS. 53A to 56B, each of FIGS. 53A, 54A, 55A, and 56A illustrates the result of the measurement camera 11 determined to have high performance in the handheld blur evaluation, and each of FIGS. 53B, 54B, 55B, and 56B illustrates the result of the measurement camera 11 determined to have low performance in the handheld blur evaluation. The following description illustrates some handheld blur evaluating methods based on a relationship between luminance or exposure time and resolution.

Referring to FIGS. 53A and 53B, a description will be given of a method of evaluating image stabilizing performance by linearly approximating the resolution of a constant luminance range (or a constant exposure time range) by the resolution calculator (slope calculator and image stabilization evaluating unit) 500. In FIGS. 53A and 53B, reference numerals 501a and 501b denote resolutions, and reference numerals 511a and 511b denote straight lines linearly approximating the resolutions. Assume that data is measured at seven points indicated by black dots in a luminance range illustrated in FIGS. 53A and 53B. A and B represent slopes of the straight lines 511a and 511b obtained by linearly approximating this range, respectively. As apparent from FIGS. 53A and 53B, the slope A in FIG. 53A, which is determined to have high performance in the handheld blur evaluation, is smaller than the slope B in FIG. 53B, which is determined to have low performance in the handheld blur evaluation. In other words, the smaller the slope is, the better the performance is.

Referring now to FIGS. 54A and 54B, a description will be given of a method in which the resolution calculator (slope calculator and image stabilization evaluating unit) 500 obtains a slope of a straight line connecting two resolutions with different luminances (or exposure times) and evaluates the image stabilizing performance. Those elements in FIGS. 54A and 54B, which are corresponding elements in FIGS. 53A and 53B, will be designated by the same reference numerals. In FIGS. 54A and 54B, reference numerals 504a and 504b denote predetermined luminances defining straight lines, and reference numerals 505a and 505b denote other luminances different from the luminances 504a and 504b defining straight lines. Reference numeral

508a denotes a straight line passing through the resolutions corresponding to the luminances 504a and 505a, and reference numeral 508b denotes a straight line passing through the resolutions corresponding to the luminances 504b and 505b. A and B represent slopes of the straight lines 508a and 508b, respectively. As apparent from FIGS. 54A and 54B, the slope A in FIG. 54A, which is determined to have high performance in the handheld blur evaluation, is smaller than the slope B in FIG. 54B, which is determined to have low performance in the handheld blur evaluation. That is, the smaller the slope is, the better the performance is.

Referring now to FIGS. 55A and 55B, a description will be given of a method of evaluating the image stabilizing performance from an intersection between resolution with given luminance (or exposure time) and a straight line obtained in a constant luminance range. Those elements in FIGS. 55A and 55B, which are corresponding elements in FIGS. 53A, 53B, 54A, and 54B, will be designated by the same reference numerals. In FIGS. 55A and 55B, reference numerals 506a, 507a, 506b, and 507b denote predetermined luminances that are used to calculate a slope. Reference numeral 521a denotes a straight line passing through the resolutions 506a and 507a, and reference numeral 521b denotes a straight line passing through the resolutions 506b and 507b. Reference numerals 522a and 522b denote resolutions corresponding to the luminances 504a and 504b, and reference numeral 523a denotes luminance corresponding to an intersection between the straight lines 521a and 522a, and reference numeral 523b denotes luminance corresponding to an intersection between the straight lines 521b and 522b. A is synonymous with 523a and B is synonymous with 523b. As apparent from FIGS. 55A and 55B, the luminance A in FIG. 55A, which is determined to have high performance in the handheld blur evaluation, is located at a position darker than that of (on the right side in FIGS. 55A and 55B of) the luminance B in FIG. 55B, which is determined to have low performance in the handheld blur evaluation. That is, it is determined that the performance with darker (lower) luminance corresponding to this intersection is better.

Referring now to FIGS. 56A and 56B, a description will be given of a method of evaluating image stabilizing performance based on an intersection between straight lines obtained in two different ranges. Those elements in FIGS. 56A and 56B, which are corresponding elements in FIGS. 53A to 55B, will be designated by the same reference numerals. Similarly to FIGS. 54A and 54B, reference numeral 508a denotes a straight line passing through the resolutions corresponding to the luminances 504a and 505a, and reference numeral 508b denotes a straight line passing through the resolutions corresponding to the luminances 504b and 505b. Similarly to FIGS. 55A and 55B, reference numeral 521a denotes a straight line passing through the resolutions 506a and 507a, and reference numeral 521b denotes a straight line passing through the resolutions 506b and 507b. Reference numeral 531a denotes luminance corresponding to the straight lines 508a and 521a, and reference numeral 531b denotes the luminance corresponding to the straight lines 508b and 521b. A is synonymous with 531a and B is synonymous with 531b. As apparent from FIGS. 56A and 56B, the luminance A in FIG. 56A, which is determined to have high performance in the handheld blur evaluation, is located at a position darker than that of (on the right side in FIGS. 56A and 56B of) the luminance B in FIG. 56B, which is determined to have low performance in the handheld blur evaluation. That is, it is determined that the performance with darker (lower) luminance corresponding to this intersection is better.

In the examples of FIGS. 53A to 56B, handheld blur evaluation is performed using predetermined luminances 504, 505, 506, and 507. Another method for determining a data range to be referred to by the slope calculator will be described with reference to FIGS. 57A, 57B, 57C, and 57D.

In FIGS. 57A, 57B, 57C, and 57D, a horizontal axis represents exposure time and a vertical axis represents resolution. Those elements in FIGS. 57A, 57B, 57C, and 57D, which are corresponding elements in FIGS. 53A to 56B, will be designated by the same reference numerals. In FIGS. 57A, 57B, 57C, and 57D, f written as 1/f is a converted focal length of an imaging lens for the measurement camera 11 (a converted focal length for the 35 mm version). The exposure time of 1/f is exposure time at which handheld blur becomes noticeable in a case where a camera is conventionally hand-held. That is, in a case where the converted focal length (f) is 100 mm, 1/f is ¹⁄₁₀₀ [s] of the exposure time. Reference numeral 554 denotes exposure time that is not affected by handheld blur, and reference numeral 555 denotes exposure time of 1/f. Other symbols will be described in the description of each figure.

Referring now to FIG. 57A, a description will be given of a method of determining data or a data range to be referred to, based on 1/f. In FIG. 57A, the exposure time of 1/f is set to a first reference (=exposure time 555). Next, a point where the exposure time is longer by an amount indicated by an arrow 560 is set to a second reference (=exposure time 561). The length of the arrow 560 may be previously determined. For example, the exposure time may become longer 16-fold (=4 steps). A straight line is determined using these two points or a data range sandwiched between these two points. In FIG. 57A, reference numeral 562 denotes a straight line passing through these two points.

Referring now to FIG. 57B, a description will be given of a method of determining data or a data range to be referred to by using resolution drop. In FIG. 57B, first, resolution 570 of the exposure time 554 which is sufficiently bright and is not affected by handheld blur is obtained. From this, resolution 572 that is lower by a specified amount 571 is obtained. The specified amount 571 may be set to a value suitable for measurement. In a case where the amount is too small, the measurement becomes unstable, and in a case where the amount is too large, the evaluation is made in a range in which handheld blur influence is too large. Exposure time 573 at which the resolution 572 and the measurement data 501 intersect each other is set as a first reference. Next, a point where the exposure time is longer by an amount indicated by an arrow 574 is set as a second reference (=exposure time 561). The length of the arrow 574 may be previously determined. For example, the exposure time may become longer quadruple (=two stages). A straight line may be determined by using these two points or a data range sandwiched between the two points. In FIG. 57B, reference numeral 576 denotes a straight line passing through the two points.

Referring now to FIG. 57C, a description will be given of a method of determining data or a data range to be referred to by using resolution drop similarly to FIG. 57B. In FIG. 57C, permissible resolution 580 is previously determined. Exposure time 581 at which the resolution 580 intersects the measurement data 501 is set as a first reference. Next, a point where the exposure time is longer by an amount indicated by an arrow 582 is set as a second reference (=exposure time 583). The length of the arrow 582 may be previously determined. For example, the exposure time may be longer quadrupled (=two stages). A straight line is determined using these two points or a data range sandwiched between the two points. In FIG. 57C, reference numeral 584 denotes a straight line passing through the two points.

Referring now to FIG. 57D, a description will be given of a method of determining data or a data range to be referred to by using the performance without image stabilization. Reference numeral 590 in FIG. 57D denotes resolution 591 at the exposure time 555 (1/f) in a case where the image stabilizing function of the measurement camera 11 is turned off. Exposure time 592 at which the resolution 591 and the measurement data 501 intersect each other is set as a first reference. Next, a point where the exposure time is longer by an amount indicated by an arrow 593 is set as a second reference (=exposure time 594). The length of the arrow 593 may be previously determined. For example, the exposure time may be longer quadrupled (=two stages). A straight line is determined using these two points or a data range sandwiched between the two points. In FIG. 57D, reference numeral 595 denotes a straight line passing through the two points.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Handheld bluray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each embodiment can provide a handheld blur evaluating apparatus, a handheld blur evaluating method, and a storage medium, each of which can highly accurately evaluate the handheld blur in an imaging unit. Each embodiment can provide a method for manufacturing an imaging unit that can provide highly accurate image stabilization.

What is claimed is:

1. A handheld blur evaluating apparatus configured to evaluate a handheld blur of an imaging unit, the handheld blur evaluating apparatus comprising:

a vibrator configured to excite the imaging unit configured to image an object;

a detector configured to detect disturbance in a change amount in measurement data of an image imaged by changing an imaging condition relating to exposure time or luminance, and a driving state indicating that the vibrator is in a stationary state or in an excitation state; and a corrector configured to obtain a correction change amount based on a sequence of change amounts for each different imaging condition, and correct the disturbance.

2. The handheld blur evaluating apparatus according to claim 1, wherein the detector detects the disturbance in a case where a change rate of the change amount calculated for each imaging condition is equal to or larger than a threshold.

3. The handheld blur evaluating apparatus according to claim 1, wherein the change amount includes:

a stationary-state change amount calculated from the measurement data measured in a case where the driving state indicates the stationary state, and an excitation-state change amount calculated from the measurement data measured in a case where the driving state indicates the excitation state.

4. The handheld blur evaluating apparatus according to claim 1, wherein the corrector obtains the correction change amount by averaging ratios of adjacent change amounts for each different imaging condition in continuously changed imaging conditions.

5. The handheld blur evaluating apparatus according to claim 1, wherein the corrector calculate a specific imaging condition that generates a singular change amount based on a ratio of adjacent change amounts in continuously changed imaging conditions, and replaces the singular change amount in a calculated imaging condition with the correction change amount obtained using the adjacent change amounts.

6. The handheld blur evaluating apparatus according to claim 1, wherein the object is a chart, and wherein measurement is made using a measurement camera as the imaging unit and a width of a boundary determined based on an image obtained as a result of that a reference camera images the chart.

7. The handheld blur evaluating apparatus according to claim 1, wherein the corrector is configured to obtain the correction change amount based on a ratio of change amounts for each different imaging condition.

8. The handheld blur evaluating apparatus according to claim 2, wherein among first data determined by the detector to have the disturbance and second data determined by the detector not to have the disturbance, the corrector corrects the first data.

9. The handheld blur evaluating apparatus according to claim 3, wherein the change amount is handheld blur amount data calculated by comparing the stationary-state change amount and the excitation-state change amount.

10. The handheld blur evaluating apparatus according to claim 9, wherein the corrector corrects the handheld blur amount data in which the disturbance is detected by the detector.

11. The handheld blur evaluating apparatus according to claim 5, wherein the corrector calculates the correction change amount by linearly approximating the change amount for each imaging condition or the correction change amount.

12. The handheld blur evaluating apparatus according to claim 5, wherein the corrector calculates the correction amount change by averaging the change amount for each imaging condition or the correction amount change.

13. The handheld blur evaluating apparatus according to claim 6, wherein the boundary changes from a first color to a second color, and wherein the chart is configured to change a distance from the first color to the second color.

14. The handheld blur evaluating apparatus according to claim 6, further comprising:

an image degradation amount calculator configured to calculate an image degradation amount from an image obtained from the reference camera;

a detector configured to detect the width of the boundary in a case where the image degradation amount of the reference camera becomes a predetermined value; and a changing unit configured to change the width of the boundary of the chart based on a detection result by the detector, and wherein measurement using the measurement camera is made using the chart changed by the changing unit.

15. The handheld blur evaluating apparatus according to claim 6, wherein the reference camera and measurement camera simultaneously image the chart.

16. The handheld blur evaluating apparatus according to claim 6, wherein the reference camera and measurement camera image the chart at different timings.

17. The handheld blur evaluating apparatus according to claim 6, wherein the chart is configured to change the width of the boundary at an arbitrary location on the chart.

18. A handheld blur evaluating apparatus configured to evaluate a handheld blur of an imaging unit configured to image an object, the handheld blur evaluating apparatus comprising:

a memory storing instructions; and a processor configured to execute the instructions to:

calculate a plurality of image degradation amounts or a plurality of resolutions from images imaged by changing luminance using the imaging unit;

calculate a slope of an image degradation amount or resolution relative to a change in at least one of the luminance and exposure time; and evaluate image stabilizing performance based on the slope.

19. The handheld blur evaluating apparatus according to claim 18, wherein the processor is configured to obtain a slope of a straight line obtained by linearly approximating the plurality of image degradation amounts or the plurality of resolutions at a constant luminance or exposure time range.

20. The handheld blur evaluating apparatus according to claim 18, wherein the processor is configured to obtain a slope of a straight line connecting two image degradation amounts or resolutions at different luminances or exposure times.

21. The handheld blur evaluating apparatus according to claim 18, wherein the processor is configured to evaluate the image stabilizing performance based on the plurality of image degradation amounts or the plurality of resolutions and the slope at a predetermined luminance or exposure time.

22. A handheld blur evaluating method configured to evaluate a handheld blur of an imaging unit, the handheld blur evaluating method comprising the steps of:

imaging an object using the imaging unit, exciting the imaging unit, detecting disturbance in a change amount in measurement data of an image imaged by changing an imaging condition relating to exposure time or luminance, and a driving state indicating that the imaging unit is in a stationary state or in an excitation state, and obtaining a correction change amount based on a sequence of change amounts for each different imaging condition and correcting the disturbance.

23. A non-transitory computer-readable storage medium storing a program that causes a computer to execute the handheld blur evaluating method according to claim 22.

* * * * *